(12) United States Patent
Oh et al.

(10) Patent No.: US 11,778,964 B2
(45) Date of Patent: Oct. 10, 2023

(54) APPARATUS FOR CULTIVATING PLANTS

(71) Applicant: LG ELECTRONICS INC., Seoul (KR)

(72) Inventors: Jongmin Oh, Seoul (KR); Taeyang Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 706 days.

(21) Appl. No.: 16/447,088

(22) Filed: Jun. 20, 2019

(65) Prior Publication Data
US 2020/0260667 A1   Aug. 20, 2020

(30) Foreign Application Priority Data

Feb. 18, 2019   (KR) ........................ 10-2019-0018866

(51) Int. Cl.
*A01G 31/02* (2006.01)
*F25D 17/06* (2006.01)
(Continued)

(52) U.S. Cl.
CPC ............. *A01G 31/02* (2013.01); *A01G 9/246* (2013.01); *A01G 9/249* (2019.05); *F25D 17/06* (2013.01);
(Continued)

(58) Field of Classification Search
CPC ................................ A01G 9/246; A01G 31/02
See application file for complete search history.

(56) References Cited

U.S. PATENT DOCUMENTS

| 1,124,844 A | 1/1915 | Boyer |
| 3,199,250 A | 8/1965 | Sawyer |

(Continued)

FOREIGN PATENT DOCUMENTS

| CN | 201541516 | 8/2010 |
| CN | 102046001 | 5/2011 |

(Continued)

OTHER PUBLICATIONS

European Search Report dated Jan. 17, 2020 issued in Application No. 19181659.4.
(Continued)

*Primary Examiner* — Magdalena Topolski
*Assistant Examiner* — Katherine Anne Kloecker
(74) *Attorney, Agent, or Firm* — KED & ASSOCIATES

(57) ABSTRACT

An apparatus for cultivating plants may include a cabinet having a cultivation space; a door that opens and closes the cultivation space; at least one bed disposed in the cultivation space and on which plants are cultivated; at least one light assembly that radiates light for photosynthesis toward the at least one bed; a water tank that stores water to be supplied to the at least one bed; a machine compartment separated from the cultivation space at a lower portion in the cabinet, that communicates with an outside of the apparatus, and that accommodates a compressor and a condenser forming a cooling cycle for controlling a temperature of the cultivation space; an air duct that connects the machine compartment and the cultivation space and guides air in the machine compartment to the cultivation space; and a return duct that connects the cultivation space and the machine compartment and guides air in the cultivation space to the machine compartment.

17 Claims, 50 Drawing Sheets

(51) Int. Cl.
  *F25D 23/00*  (2006.01)
  *F25D 23/06*  (2006.01)
  *A01G 9/24*  (2006.01)

(52) U.S. Cl.
  CPC ......... *F25D 23/003* (2013.01); *F25D 23/006* (2013.01); *F25D 23/062* (2013.01)

(56) References Cited

U.S. PATENT DOCUMENTS

| | | | |
|---|---|---|---|
| 3,260,304 | A | 7/1966 | Rabechault |
| 3,458,951 | A | 8/1969 | Martin |
| 3,903,641 | A | 9/1975 | Hoffman |
| 3,961,442 | A | 6/1976 | Carter |
| 4,196,544 | A * | 4/1980 | Davis .................. A01G 7/045 165/47 |
| 4,219,967 | A | 9/1980 | Hickerson |
| 4,584,791 | A | 4/1986 | Wolf |
| 4,982,527 | A | 1/1991 | Sprung |
| 5,117,581 | A | 6/1992 | Green et al. |
| 5,252,108 | A | 10/1993 | Banks |
| 6,105,309 | A | 8/2000 | Takayanagi |
| 6,357,179 | B1 | 3/2002 | Buss |
| 6,385,899 | B1 | 5/2002 | Treganza |
| 6,588,371 | B2 | 7/2003 | Hallock |
| 7,278,237 | B2 | 10/2007 | Okabe et al. |
| 8,021,007 | B2 | 9/2011 | Rapenua et al. |
| 8,181,387 | B2 | 5/2012 | Loebl et al. |
| 8,910,419 | B1 | 12/2014 | Oberst |
| 9,028,089 | B2 | 5/2015 | Kotera et al. |
| 9,718,605 | B2 | 8/2017 | Snelten |
| 10,202,574 | B2 | 2/2019 | Eberle |
| 10,317,123 | B1 * | 6/2019 | Wohlers .................. F25D 29/00 |
| 10,342,188 | B2 | 7/2019 | Nelson |
| 10,462,978 | B2 | 11/2019 | Lin et al. |
| 10,842,095 | B2 | 11/2020 | Ivanescu et al. |
| 10,973,186 | B2 | 4/2021 | Blackburn et al. |
| 11,058,070 | B2 | 7/2021 | Loessl et al. |
| 11,337,382 | B2 | 5/2022 | Frison |
| 11,457,574 | B2 | 10/2022 | Parapatits |
| 2003/0162288 | A1 | 8/2003 | Everett |
| 2006/0162246 | A1 | 7/2006 | Okabe et al. |
| 2006/0260351 | A1 * | 11/2006 | Coulter .................. F25D 23/00 62/340 |
| 2008/0078118 | A1 | 4/2008 | Bissonnette et al. |
| 2010/0031564 | A1 | 2/2010 | Loebl et al. |
| 2012/0036773 | A1 | 2/2012 | Khoo |
| 2012/0297677 | A1 | 11/2012 | Hashimoto |
| 2014/0069009 | A1 | 3/2014 | Lin |
| 2014/0318012 | A1 * | 10/2014 | Fujiyama .................. A01G 9/16 47/62 R |
| 2015/0000190 | A1 | 1/2015 | Gibbons |
| 2015/0136241 | A1 | 5/2015 | Nguyen |
| 2015/0223407 | A1 | 8/2015 | Carroll et al. |
| 2016/0000020 | A1 * | 1/2016 | Sugimoto .................. A01G 9/02 709/219 |
| 2016/0029574 | A1 | 2/2016 | He |
| 2016/0120139 | A1 | 5/2016 | Lee et al. |
| 2016/0130542 | A1 | 5/2016 | Wilson |
| 2016/0178178 | A1 | 6/2016 | Brumm |
| 2016/0356465 | A1 | 12/2016 | Polete |
| 2016/0360712 | A1 | 12/2016 | Yorio |
| 2017/0094914 | A1 | 4/2017 | Paquette |
| 2017/0094920 | A1 | 4/2017 | Ellins et al. |
| 2017/0121662 | A1 | 5/2017 | Eberle |
| 2017/0280642 | A1 | 10/2017 | Ende, Van Den |
| 2017/0284724 | A1 | 10/2017 | Lee et al. |
| 2017/0343269 | A1 * | 11/2017 | Kim .................. F25D 11/02 |
| 2017/0347547 | A1 | 12/2017 | Lu et al. |
| 2018/0042191 | A1 | 2/2018 | Blackburn et al. |
| 2018/0276818 | A1 | 9/2018 | Vander Velden |
| 2018/0359946 | A1 | 12/2018 | Rossi |
| 2018/0359971 | A1 | 12/2018 | Millar |
| 2018/0363884 | A1 | 12/2018 | Prison |
| 2019/0082620 | A1 | 3/2019 | Griffin |
| 2019/0183062 | A1 | 6/2019 | Pham et al. |
| 2019/0200542 | A1 | 7/2019 | Hall et al. |
| 2019/0223391 | A1 | 7/2019 | Loessl et al. |
| 2019/0223396 | A1 | 7/2019 | Loessl et al. |
| 2019/0230868 | A1 | 8/2019 | Tao |
| 2019/0261589 | A1 | 8/2019 | Pham |
| 2019/0335691 | A1 | 11/2019 | Krakover |
| 2020/0037514 | A1 | 2/2020 | Massey |
| 2020/0163283 | A1 | 5/2020 | Aminpour |
| 2020/0221646 | A1 | 7/2020 | Bacolas |
| 2020/0323151 | A1 | 10/2020 | Spiro |
| 2021/0100173 | A1 | 4/2021 | Khwaja |
| 2021/0144942 | A1 * | 5/2021 | Ofir .................. A01G 9/247 |
| 2021/0289716 | A1 * | 9/2021 | Lokdarshi .................. A01G 9/249 |
| 2021/0396168 | A1 * | 12/2021 | Williams .................. A01G 7/02 |
| 2022/0304251 | A1 | 9/2022 | Rearden et al. |

FOREIGN PATENT DOCUMENTS

| | | | |
|---|---|---|---|
| CN | 201967457 | | 9/2011 |
| CN | 102378572 | | 3/2012 |
| CN | 103947476 | | 4/2013 |
| CN | 103416292 | | 12/2013 |
| CN | 103733971 | | 4/2014 |
| CN | 203523423 | | 4/2014 |
| CN | 203575274 | | 5/2014 |
| CN | 104053355 | | 9/2014 |
| CN | 204104462 | | 1/2015 |
| CN | 204198673 | U * | 3/2015 |
| CN | 204311054 | | 5/2015 |
| CN | 105283068 | | 1/2016 |
| CN | 205005666 | | 2/2016 |
| CN | 105475027 | | 4/2016 |
| CN | 205196492 | | 5/2016 |
| CN | 105993897 | | 10/2016 |
| CN | 106069703 | | 11/2016 |
| CN | 205794370 | | 12/2016 |
| CN | 106413385 | | 2/2017 |
| CN | 206283934 | | 6/2017 |
| CN | 206629676 | | 11/2017 |
| CN | 208029823 | | 12/2017 |
| CN | 107683763 | | 2/2018 |
| CN | 107801532 | | 3/2018 |
| CN | 207201627 | | 4/2018 |
| CN | 108093986 | | 6/2018 |
| CN | 207531451 | | 6/2018 |
| CN | 207531574 | | 6/2018 |
| CN | 108289426 | | 7/2018 |
| CN | 207589648 | | 7/2018 |
| CN | 108419564 | | 8/2018 |
| CN | 108633546 | | 10/2018 |
| CN | 109156330 | | 1/2019 |
| CN | 109220336 | | 1/2019 |
| DE | 10 2014 103948 | | 9/2015 |
| DE | 10 2016 222 326 | | 1/2018 |
| EP | 1580504 | A2 * | 9/2005 .................. F25C 5/22 |
| EP | 2508063 | | 10/2012 |
| EP | 3 039 958 | | 7/2016 |
| JP | 59179019 | | 10/1983 |
| JP | S60-58021 | | 4/1985 |
| JP | 4-94624 | | 3/1992 |
| JP | H05-23056 | | 2/1993 |
| JP | H05260864 | | 10/1993 |
| JP | H06-319389 | | 11/1994 |
| JP | 2000-201538 | | 7/2000 |
| JP | 2003-235353 | | 8/2003 |
| JP | 2004-129621 | | 4/2004 |
| JP | 2010-267545 | | 11/2010 |
| JP | 2011-244804 | | 12/2011 |
| JP | 2013034402 | | 2/2013 |
| JP | 2013-162749 | | 8/2013 |
| KR | 10-2003-0084609 | | 11/2003 |
| KR | 10-0674737 | | 1/2007 |
| KR | 10-0864475 | | 10/2008 |
| KR | 10-2010-0074426 | | 7/2010 |
| KR | 10-2012-0025696 | | 3/2012 |
| KR | 10-2012-0028040 | | 3/2012 |
| KR | 10-2012-0059783 | | 6/2012 |
| KR | 20-2012-0008778 | | 12/2012 |

(56) References Cited

FOREIGN PATENT DOCUMENTS

| | | |
|---|---|---|
| KR | 2004-64892 | 1/2013 |
| KR | 10-1234587 | 2/2013 |
| KR | 10-1240375 | 2/2013 |
| KR | 20-0465385 | 2/2013 |
| KR | 10-1249478 | 4/2013 |
| KR | 10-1249985 | 4/2013 |
| KR | 20-0467246 | 5/2013 |
| KR | 10-2013-0089393 | 8/2013 |
| KR | 10-1342141 | 12/2013 |
| KR | 10-1348486 | 12/2013 |
| KR | 10-1422636 | 7/2014 |
| KR | 10-2014-0097689 | 8/2014 |
| KR | 20140097689 A * | 8/2014 |
| KR | 10- 2015-0042002 | 4/2015 |
| KR | 10-2016-0041477 | 4/2016 |
| KR | 10-2017-0085194 | 7/2017 |
| KR | 10-2018-0066072 | 6/2018 |
| KR | 102129058 | 8/2018 |
| KR | 10-2018-0114563 | 10/2018 |
| KR | 10-2018-0124391 | 11/2018 |
| KR | 100997722 B1 * | 12/2021 |
| TW | 200401605 | 2/2004 |
| TW | 1264273 | 10/2006 |
| TW | M447665 | 3/2013 |
| WO | WO 2004/026023 | 4/2004 |
| WO | WO 2008/047275 | 4/2008 |
| WO | WO 2011/013892 | 2/2011 |
| WO | WO 2011/062470 | 5/2011 |
| WO | WO 2015/140820 | 9/2015 |
| WO | WO-2015136926 A1 * 9/2015 ............. A01G 31/02 |
| WO | WO 2017/103874 | 6/2017 |
| WO | WO 2018/036844 | 3/2018 |
| WO | WO 2018/103651 | 6/2018 |

OTHER PUBLICATIONS

Australian Office Action dated Apr. 9, 2020.
United States Office Action dated Sep. 23, 2021 issued in co-pending related U.S. Appl. No. 16/505,845.
European Search Report dated Jan. 15, 2020 issued in Application No. 19181652.9.
European Search Report dated Jan. 14, 2020 issued in Application No. 19181650.3.
United States Office Action dated Sep. 15, 2021 issued in co-pending related U.S. Appl. No. 16/445,590.
U.S. Office Action dated Mar. 31, 2021 issued in U.S. Appl. No. 16/445,590.
U.S. Office Action dated Mar. 22, 2021 issued in U.S. Appl. No. 16/505,845.
India Office Action dated Dec. 16, 2020 issued in IN Application No. 201914025429.
Australian Examination Report dated May 20, 2020 issued in Application No. 2019203805.
European Search Report dated Jan. 21, 2020 issued in Application No. 19181657.8.
European Search Report dated Jan. 21, 2020 issued in Application No. 19181673.5.
United States Office Action dated May 26, 2021 issued in co-pending related U.S. Appl. No. 16/445,467.
Australian Examination Report dated Aug. 26, 2020 issued in Application No. 2019204552.
European Office Action issued in Application No. 19 181 657.8 dated Oct. 29, 2021.
Chinese Office Action issued in Application No. 201911408413.2 dated Jul. 30, 2021.
Chinese Office Action issued in Application No. 201911396197.4 dated Jul. 30, 2021.
Chinese Office Action issued in Application No. 201911400142.6 dated Jul. 30, 2021.
Chinese Office Action issued in Application No. 201911415752.3 dated Aug. 4, 2021.
U.S. Office Action issued in U.S. Appl. No. 16/445,467 dated Oct. 25, 2021.
U.S. Office Action issued in U.S. Appl. No. 16/511,265 dated Apr. 16, 2021.
European Notice of Allowance issued in Application No. 19 188 089.7 dated Apr. 6, 2021.
European Search Report dated Dec. 20, 2019 issued in Application No. 19188089.7.
Australian Examination Report dated May 26, 2021 issued in Application No. 2019204552.
Chinese Office Action dated Jun. 22, 2021 issued in CN Application No. 201910575522.7.
Chinese Office Action dated Jul. 27, 2021 issued in CN Application No. 201911408460.7.
U.S. Appl. No. 16/447,124, filed Jun. 20, 2019.
U.S. Appl. No. 16/511,265, filed Jul. 15, 2019.
U.S. Appl. No. 16/505,845, filed Jul. 9, 2019.
U.S. Office Action dated May 10, 2022 issued in U.S. Appl. No. 16/445,590.
European Search Report issued in Application No. 21194710.6 dated Jan. 19, 2022.
Chinese Notice of Allowance issued in Application No. 201910575522.7 dated Jan. 21, 2022.
United States Office Action dated Jan. 11, 2023 issued in co-pending related U.S. Appl. No. 17/829,797.
Chinese Notice of Allowance dated Sep. 15, 2022 issued in CN Application No. 201911408460.7.
U.S. Appl. No. 16/445,590, filed Jun. 19, 2019.
European Search Report issued in Application No. 22175088.8 dated Sep. 30, 2022.
U.S. Office Action dated Feb. 2, 2023 issued in U.S. Appl. No. 16/445,467.
U.S. Office Action issued in U.S. Appl. No. 17/972,835 dated Apr. 11, 2023.
Chinese Office Action issued in Application No. 202211103574.2 dated Mar. 10, 2023.
U.S. Appl. No. 16/445,467, filed Jun. 19, 2019.
U.S. Appl. No. 16/447,088, filed Jun. 20, 2019.
U.S. Appl. No. 17/972,835, filed Oct. 25, 2022.
U.S. Appl. No. 17/525,158, filed Nov. 12, 2021.
U.S. Appl. No. 17/829,797, filed Jun. 1, 2022.
U.S. Office Action dated Jun. 1, 2023 issued in U.S. Appl. No. 17/829,797.
U.S. Office Action issued in U.S. Appl. No. 17/525,158 dated Jun. 6, 2023.

* cited by examiner

FIG. 17
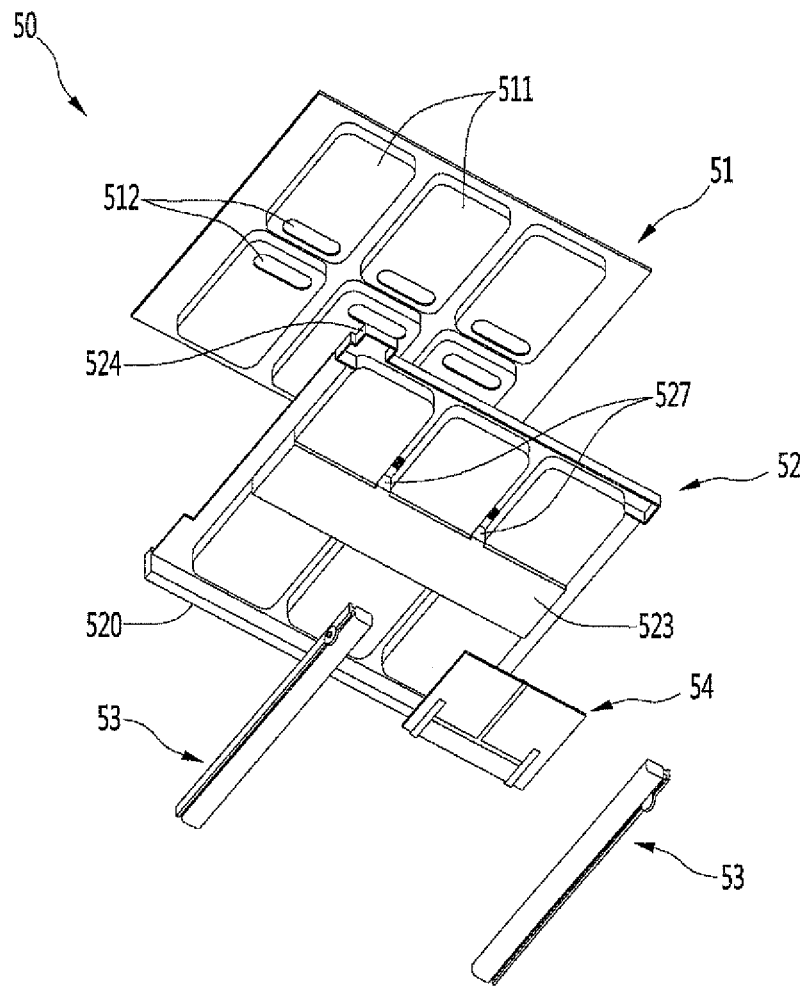
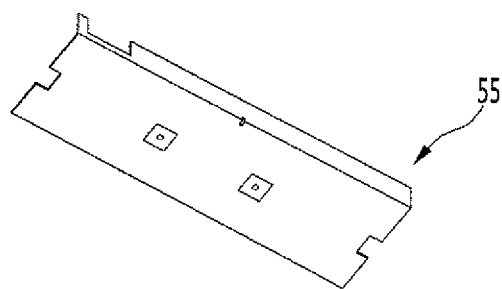

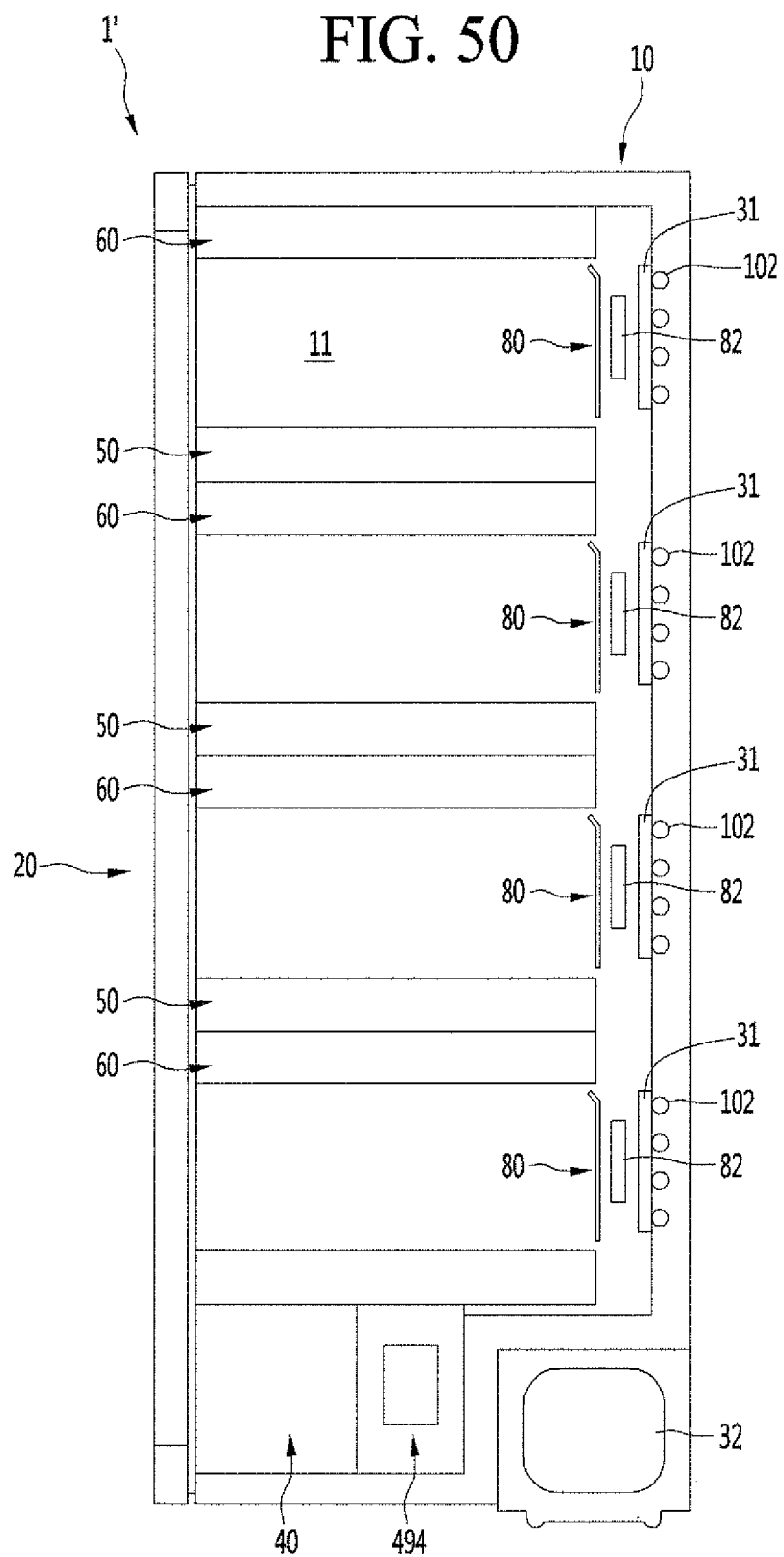

APPARATUS FOR CULTIVATING PLANTS

CROSS-REFERENCE TO RELATED APPLICATION(S)

This application claims priority to Korean Patent Application No. 10-2019-0018866, filed on Feb. 18, 2019 in Korea, the entire contents of which is hereby incorporated by reference in its entirety.

BACKGROUND

1. Field

An apparatus for cultivating Eukaryote cells, for example, plants is disclosed herein.

2. Background

In general, an apparatus for cultivating plants includes a predetermined cultivating chamber having an environment appropriate to grow the plants, and the plants are stored in the predetermined cultivating chamber. The apparatus for cultivating plants has components to supply nutrients and light energy required for plant growth, and the plants are grown by the supplied nutrients and light energy.

An apparatus for cultivating plants according to the related art is disclosed in Korean Patent Registration No. 10-1240375, which is hereby incorporated by reference. The related art discloses structure in which a multi-stage tray is disposed inside a cabinet, light is irradiated from a light irradiation unit to the tray, a nutrient solution is supplied to the tray through a nutrient solution recovery container, and an inner portion of the cabinet is maintained at a set or predetermined temperature by an air conditioning cycle and an air circulation fan. However, in the related art, there is no configuration for supplying carbon dioxide for photosynthesis of plants, so growth of plants is slow in a closed space.

A refrigerator type vegetable cultivation system for home use has been disclosed in Korean Patent Application Publication No. 2013-0089393, which is hereby incorporated by reference, in which a shelf on which plants are cultivated is disposed in a body, and which includes a nutrient solution supplier that supplies nutrient solution to the shelf, an LED unit, and a carbon dioxide supplier that supplies carbon dioxide. However, in this structure, a separate device for supplying carbon dioxide is installed. The device for supplying carbon dioxide has a tank structure, so there is a very dangerous problem with respect to safety, such as explosions. Further, as a configuration for separately supplying carbon dioxide and a complicated channel structure are necessarily required, there is a problem in that the structure is complicated and manufacturing costs are increased.

BRIEF DESCRIPTION OF THE DRAWINGS

Embodiments will be described in detail with reference to the following drawings in which like reference numerals refer to like elements and, wherein;

FIG. 17 is an exploded perspective view of the bed when the bed is viewed from the bottom;

FIG. 50 is a view illustrating an internal structure of an apparatus for cultivating plants according to another embodiment.

DETAILED DESCRIPTION

Hereinafter, embodiments will be described with reference to accompanying drawings. However, embodiments are not limited to the disclosed embodiments suggesting the spirit. In addition, another embodiment falling within the scope may be easily suggested by adding, modifying, or deleting components.

Figure 1:
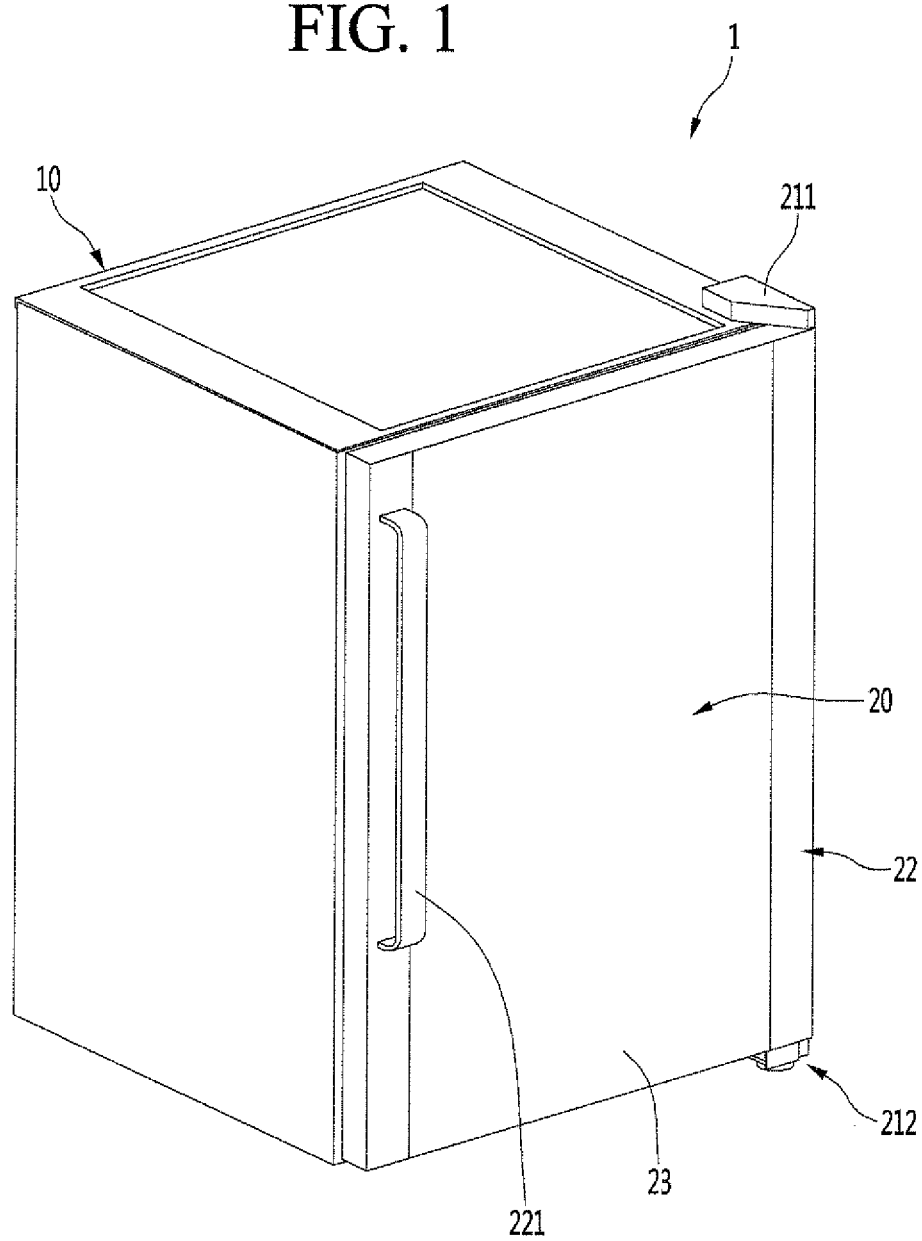
FIG. 1 is a perspective view of an apparatus for cultivating plants according to an embodiment.
Figure 2:
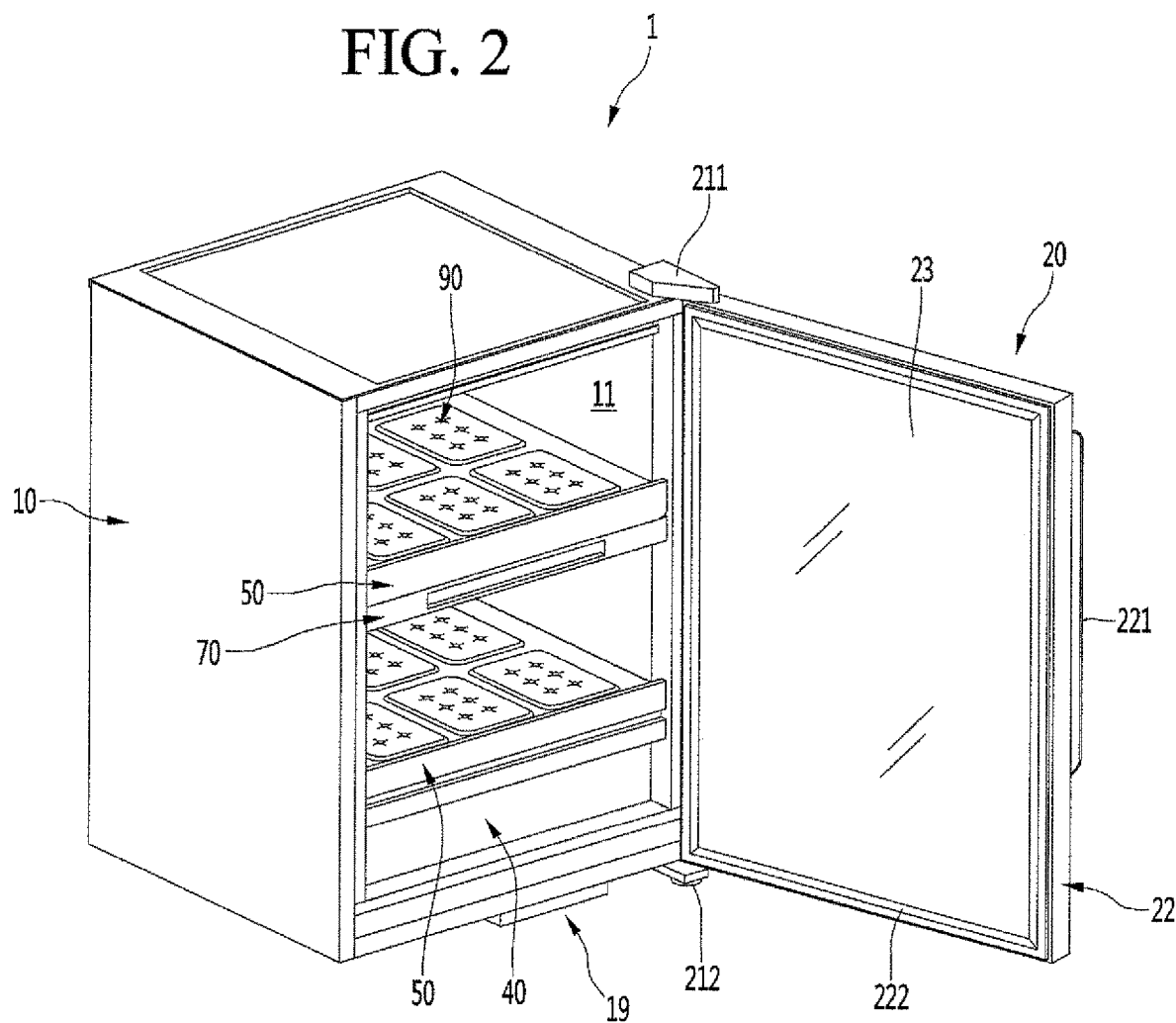
FIG. 2 is a perspective view of the apparatus for cultivating plants of FIG. 1, the door of which is open.
Figure 3:
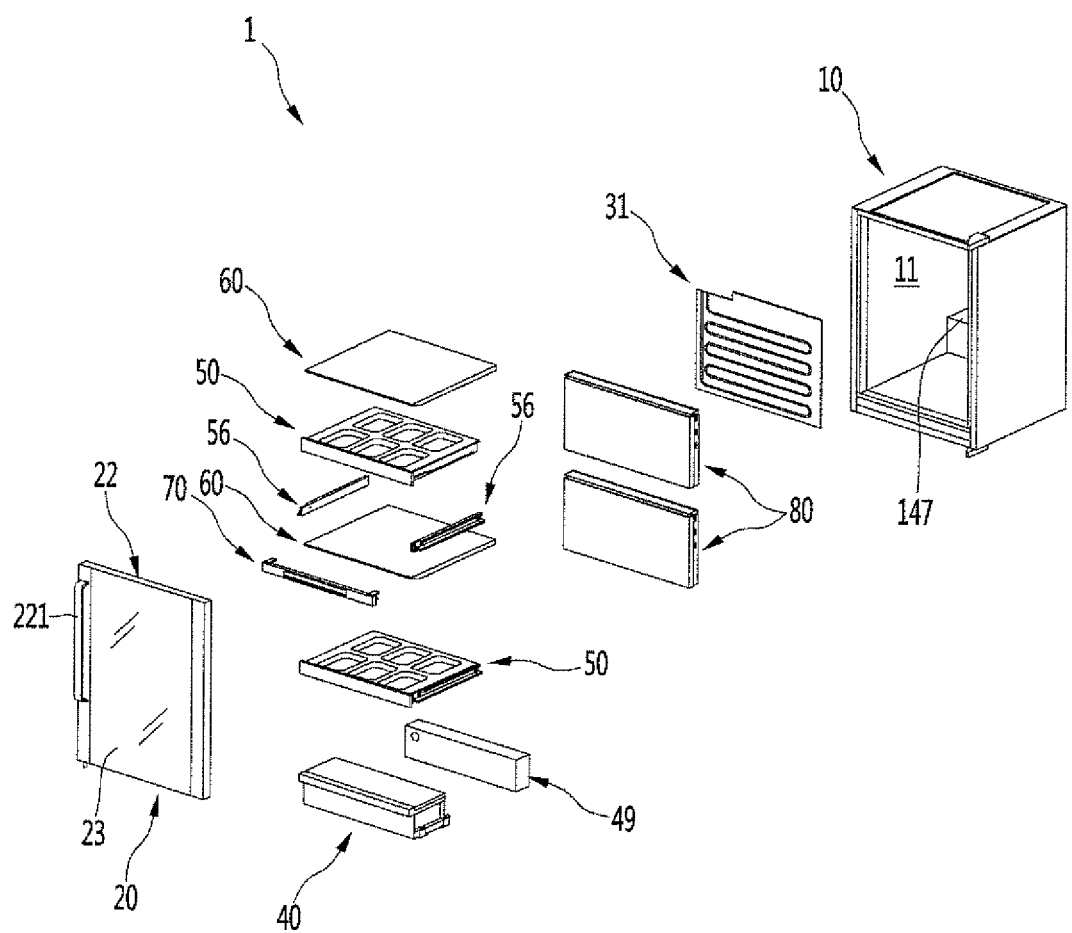
FIG. 3 is an exploded perspective view of the apparatus for cultivating plants of FIG. 1.

FIG. 1 is a perspective view of an apparatus for cultivating Eukaryote cells, for example, plants according to an embodiment. FIG. 2 is a perspective view of the apparatus for cultivating plants of FIG. 1, the door of which is open. FIG. 3 is an exploded perspective view of the apparatus for cultivating plants of FIG. 1.

As illustrated in the drawings, the apparatus 1 for cultivating Eukaryote cells, for example, plants according to an embodiment may have an outer appearance formed by a cabinet 10 having an internal space in which plants may be cultivated and a door 20 to open/close the cabinet 10. The cultivated plants may be plants, such as leaves or herbs that are usually used for wrapping or salad, for example, that a user can eat and easily cultivate, and that do not occupy a lot of space.

The cabinet 10 may have a front surface which is open and may be provided therein with an interior or cultivating space 11. The cabinet 10 may be insulated. Accordingly, the cultivating space may maintain a set or predetermined temperature.

A plurality of beds 50 may be vertically arranged inside the cabinet 10. According to one embodiment, two beds 50 may be vertically provided and may be referred to as an upper bed 50 and a lower bed 50, respectively, for convenience of explanation. In addition, at least two beds 50 may be further included depending on a size of the cabinet 10.

Each bed 50 may have a structure in which a plurality of seed packages 90 having seeds of plants and necessary food is seated. The bed 50 may be referred to as a shelf or a tray. The seed package 90 may include a suitable combination of various types of seeds and food appropriate to the seeds, and may be selected as a product that a user wants to cultivate. In addition, the bed 50 may have structure to seat the seed package 90 and maintain a seated state.

The bed 50 may have a fluid passage allowing water supplied from a water tank 40 to flow therethrough. The bed 50 may maintain a proper water level to always supply water to the seed package 90.

An introduction/withdrawal guide 56 may be provided at opposite side surfaces of the cabinet 10. Opposite ends of the bed 50 may be supported by the introduction/withdrawal guide 56 in a state in which the bed 50 is seated on the introduction/withdrawal guide 56. The bed 50 may be introduced/withdrawn into and from the cabinet 10 by the introduction/withdrawal guide 56. The bed 50 may be introduced into or withdrawn from the cultivating space 11. In the state in which the bed 50 is withdrawn, the seed package 90 may be easily seated on the bed 50 and managed.

The cabinet 10 may have a cooling cycle including a compressor 32, a condenser 33, and an evaporator 31. The internal temperature of the cultivating space 11 may be adjusted through the cooling cycle. In this case, the evaporator 31 may be disposed on an inner rear wall surface of the cabinet, and remaining components, such as the compressor 32 and the condenser 33, may be disposed in a machine compartment 12 provided at a rear lower portion of the cabinet 10. The machine compartment 12 may be separated from the cultivating space 11, thereby preventing noise from being introduced, maintaining insulating of the cultivating space 11, and ensuring safety of a user.

The evaporator 31 may include a roll-bond type evaporator, which is called a heat exchanger. The evaporator 31 may have a plate structure which is easily attached to an inner rear wall surface of the cabinet 10. In addition, the plate structure of the evaporator 31 may minimize loss of the cultivating space 11. The evaporator 31 may be close to the cultivating space 11 to effectively adjust the temperature of the cultivating space 11.

In addition, a blower assembly 80 may be provided in front of the evaporator 31. A plurality of blower assemblies 80 may be provided vertically arranged and having a same structure and shape except for mounting positions thereof. The blower assemblies 80 may be provided in number corresponding to the number of beds 50 and may blow air forward from a rear portion of the beds 50. Accordingly, air circulation may be independently performed in each of internal spaces of the cultivating space 11 partitioned by the beds 50.

The internal air of the cultivating space 11 may be circulated by the blower assembly 80 and the circulated air may pass through the evaporator 31, so the cultivating space 11 may have a uniform temperature throughout an inner entire portion thereof, and the temperature may be rapidly adjusted. The air circulated by the blower assembly 80 may flow while passing through and along a top surface of the bed 50 and a bottom surface of the light assembly 60.

The air flowing by the blower assembly 80 may allow the plants grown from the bed 50 to more smoothly breathe and to be properly shaken by passing through the top surface of the bed 50, thereby adjusting stress. Accordingly, the blower assembly 80 may provide air flow optimized to the growth of the plants. In addition, the air flowing by the blower assembly 80 may prevent the light assembly 60 from being overheated by passing through and along the bottom surface of the light assembly 60.

The light assembly 60 may be provided above the bed 50. The light assembly 60 may irradiate the bed 50 with light to provide light necessary for the plants. An amount of light irradiated from the light assembly 60 may be set to be similar to sunlight. The light assembly 60 may be set with an amount of light and light irradiation time optimized to plant cultivation.

The water tank 40 may be provided on an inner bottom surface of the cabinet 10. The water tank 40 may store water to be supplied to the bed 50. The water tank 40 may be positioned under a bed 50 positioned at a lowest portion of a plurality of beds 50 and a front surface of the water tank 40 may be positioned at a position corresponding to a front end of the bed 50.

A widthwise length of the water tank 40 may correspond to a width of the inner space of the cabinet 10. A vertical-direction length of the water tank 40 may be formed to correspond to a distance between the bed 50 positioned at the lowest portion and a 11. In other words, the water tank 40 may occupy a space under the bed 50 positioned at the lowest portion and a space in front of the water tank 40 may be covered by the water tank 40.

A water supply case 49 may be provided in the space covered by the water tank 40. The water supply case 49 may be provided therein with a pump 494, a flow meter 495, and a water supply valve 496 described hereinafter. The water supply case 49, internal components of the water supply case 49, and pipes linked to components may be referred to as a water supply unit or a water supply assembly.

The water tank 40 may be mounted inside the cabinet 10 to be introduced or withdrawn in a frontward-backward direction and may have a separable structure. Accordingly, the water tank 40 may have a structure to easily supply water, be cleaned, and maintained.

A display assembly 70 may be provided at an open first half portion of the cabinet 10. The display assembly 70 may output an operating state of the apparatus 1 for cultivating plants to the outside. In addition, the display assembly 70 may include an input unit to receive input by a user such that a whole operation of the apparatus 1 for cultivating plants may be set and input. For example, the display assembly 70 may include a touchscreen and may include structure, such as a button, or a switch, for example.

The display assembly 70 may be positioned on a same front plane as the front end of the bed 50. The display assembly 70 may be positioned at a front end of the open front surface of the cabinet 10. The display assembly 70 may be disposed significantly closely to a rear surface of the door 20, when the door 20 is closed.

The door 20 may be formed in a size to cover the open front surface of the cabinet 10. An upper hinge 211 and a lower hinge 212 may be shaft-coupled to an upper end and a lower end of one side of opposite left and right or lateral sides of the door 20. The door 20 may be rotatably coupled to the cabinet 10 by the upper hinge 211 and the lower hinge 212 and the cultivating space 11 may be open/closed due to rotation of the door 20.

The door 20 may have a see-through structure in at least a portion thereof. Even when the door 20 is closed, the cultivating space 11 may be viewed and checked.

The door 20 may include a door frame 22 to form a circumference of the door 20 with an opening formed at a center thereof, and a door panel 23 to cover the opening of the door frame 22. The door panel 23 may be formed of glass or a transparent plastic material, for example, such that an inner portion of the apparatus 1 for cultivating plants is viewable therethrough. The door panel 23 may be colored, color-coated, or deposited with metal, or have a film attached thereto, for example, such that the cultivating space 11 may be selectively viewed or not viewed.

For example, when the light assembly 60 is turned on in a state in which the door 20 is closed, the inner portion of the cultivating space 11 may be brightened such that the inner portion of the cultivating space 11 is viewed through the door panel 23. In contrast, when the light assembly 60 is turned off in the state in which the door 20 is closed, the inner portion of the cultivating space 11 may be darkened such that the cultivating space 11 is not viewable due to the color or optical characteristic of the door panel 23. Due to the above structure, the inner portion of the cultivating space 11 may be easily recognized even in the state in which the door 20 is closed. Accordingly, a growing state of the plants may be checked. In addition, an interior effect may be exhibited. In addition, when it is unnecessary to view the inner portion of the cultivating space 11, a neat outer appearance may be maintained.

When the light assembly 60 is turned on, the display assembly 70 may be viewed through the door panel 23. Accordingly, a user may recognize information through the display assembly 70 in the state in which the door 20 is closed. In addition, even if the light assembly 60 is turned off, when the display assembly 70 is turned on to emit light, only the display assembly 70 may be viewed through the door 20.

A plurality of door panels 23 may be disposed back and forth, and an insulating space may be formed between the plurality of door panels 23. In addition, if necessary, the door panel 23 may include insulation glass. Accordingly, the inner portion of the cabinet 10 may be insulated from the outside.

The door frame 22 may be provided at one side of a front surface thereof with a door handle 221 to rotate the door 20. In addition, the door frame 22 may be provided on a circumference of a rear surface thereof with a gasket 222 to make air tightness between the cabinet 10 and the door 20. In addition, although not illustrated, the door 20 may have a door heater to prevent dew from being condensed on the surface of the door 20.

The bottom surface of the cabinet 10 may be slightly spaced apart from a ground surface on which the apparatus 1 for cultivating plants is installed. The cabinet 10 may be provided on the bottom surface thereof with a bottom case 19. Electrical components, such as a door switch 195, an external temperature sensor 194, an external humidity sensor 184, and a communication unit 185 described hereinafter, which are disposed outside the cabinet 10, may be received in the bottom case 19. The bottom case 19 may be provided on the bottom surface of the cabinet 10 and may be configured not to be exposed to the outside when the door 20 is closed.

Hereinafter, structure of the cabinet 10 will be described with reference to accompanying drawings.

Figure 4:
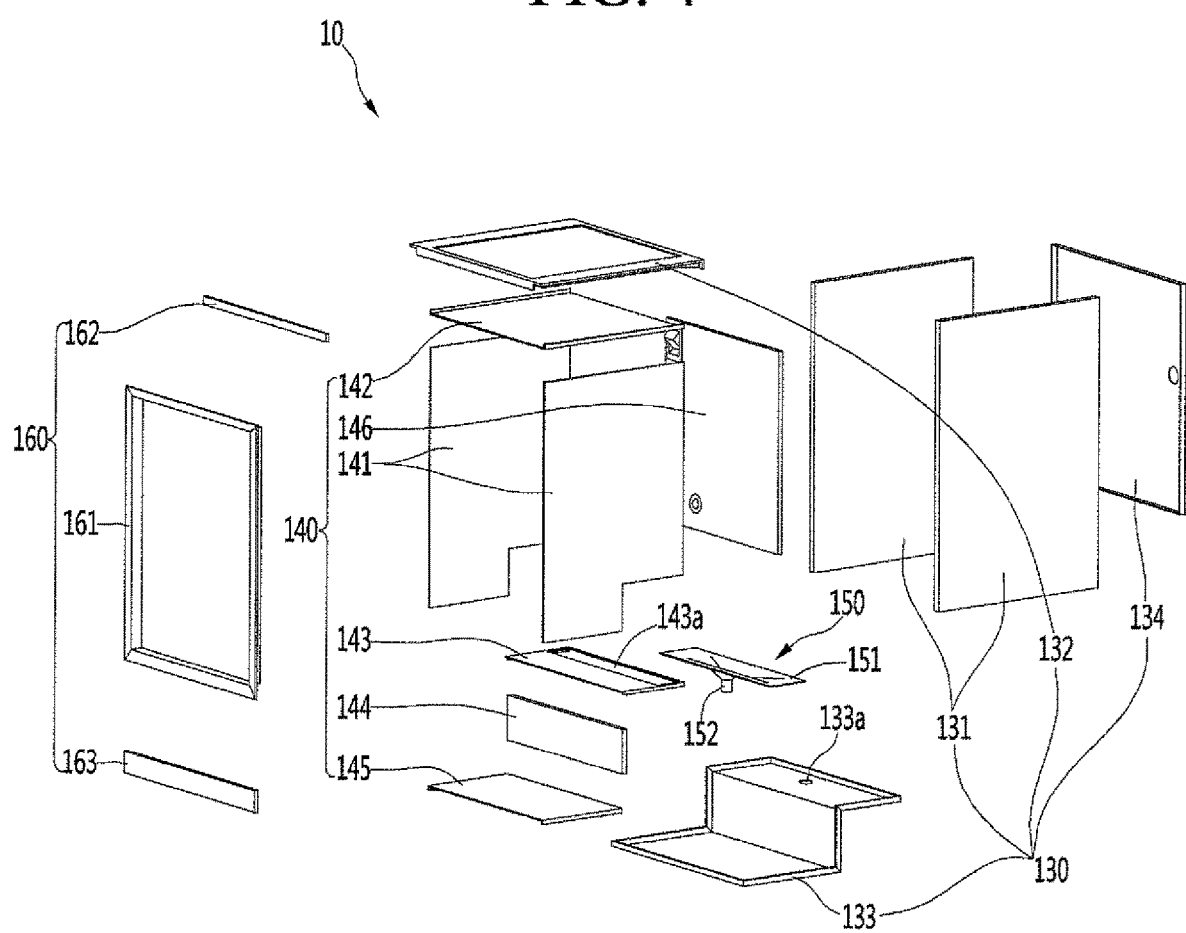
FIG. 4 is an exploded perspective view of the cabinet which is one component of the apparatus for cultivating plants according to an embodiment.
Figure 5:
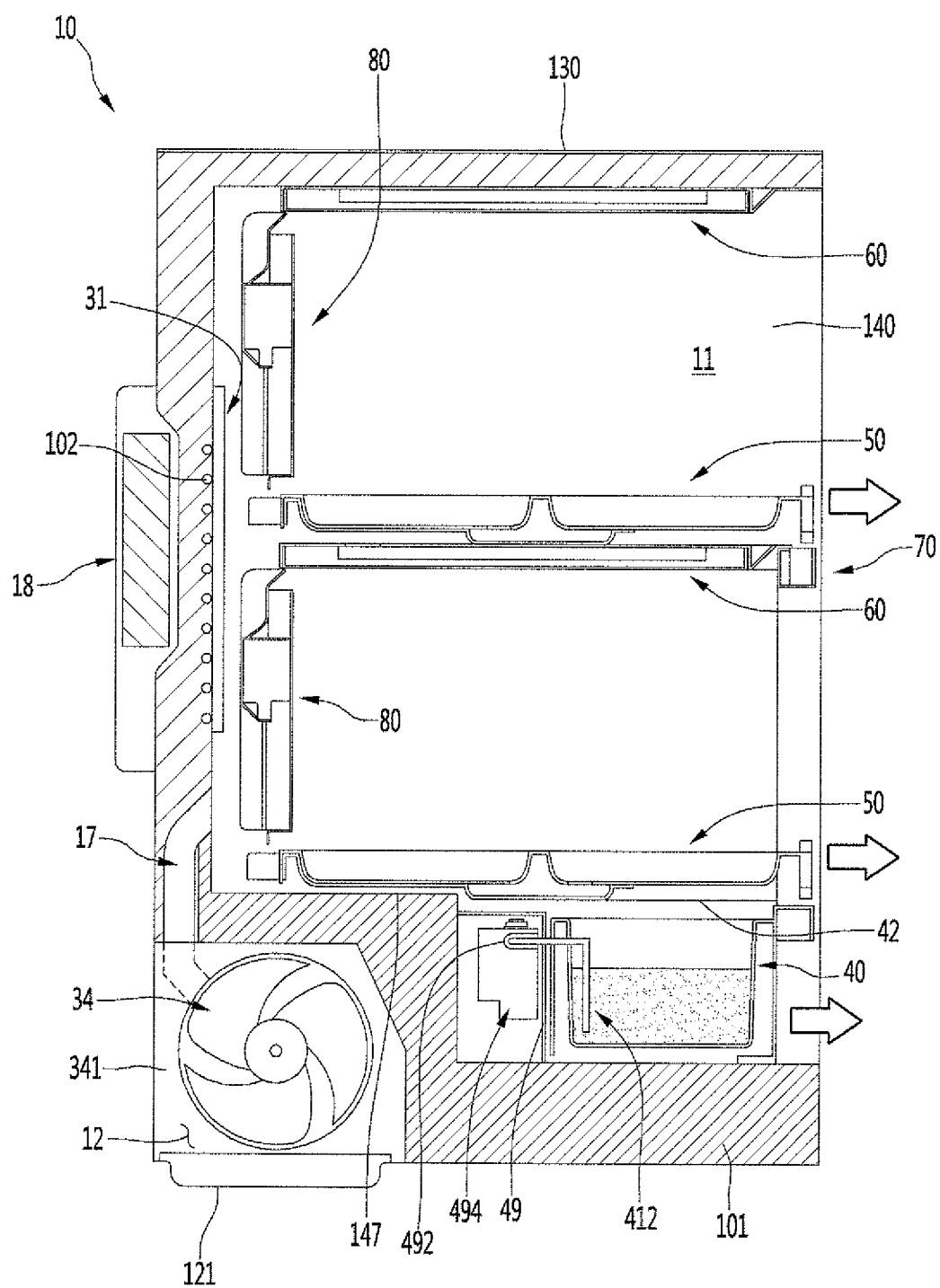
FIG. 5 is a longitudinal sectional view of the cabinet according to an embodiment.

FIG. 4 is an exploded perspective view illustrating the cabinet which is one component of the apparatus for cultivating plants according to an embodiment. FIG. 5 is a longitudinal sectional view of the cabinet according to an embodiment.

As illustrated, the cabinet 10 may include an outer case 130 to form an outer appearance thereof and an inner case 140 to form the cultivating space 11. An insulating material 101 may be interposed between the outer case 130 and the inner case 140 to insulate the inner portion of the cabinet 10 from the outside.

The outer case 130 may be formed of a metal material, for example, and may include at least one plate to form an outer surface of the cabinet 10. For example, the outer case 130 may include outer side plates 131 forming left and right or lateral side surfaces, an outer upper plate 132 forming a top surface, an outer rear plate 134 forming a rear surface, and an outer bottom plate 133 forming a bottom surface.

The outer bottom plate 133 may be bent such that the machine compartment 12 is provided at a corner portion of a rear lower end of the cabinet 10. Accordingly, the machine compartment 12 including the compressor 32, the condenser 33, a condenser fan 34, or a fan guide 341 may be provided in a space separate from the cultivating space 11. In addition, the bottom surface of the machine compartment 12 may be formed by a machine compartment base 121. A rear surface of the machine compartment 12 may be covered by a machine compartment grill (not illustrated).

A controller 18 may be provided on a rear surface of the cabinet 10, that is, a rear surface of the outer rear plate 134. The controller 18 may be configured to control the overall operation of the apparatus 1 for cultivating plants. The controller 18 may include a compressor printed circuit board 181 additionally provided to control the compressor 32.

The inner case 140 may include a metal material, for example, and may include a plurality of plates defining the inside of the cabinet 10, that is, the cultivating space 11. In this case, at least a portion of the inner case 140 may be formed a plastic material, for example.

The inner case 140 may be formed of a metal material having excellent thermal conductivity performance similarly to aluminum. The inner case 140 formed of the metal material may have excellent heat transfer performance such that the inner portion of the cultivating space 11 has a more uniform temperature distribution when the cultivating space 11 is heated or cooled. In addition, the inner case 140 may be configured to reflect light irradiated from the light assembly 60. The light irradiated from the light assembly 60 may be reflected from the surface of the inner case 140 of the metal material and uniformly irradiated to plants in the entire area of the bed 50, thereby resolving the problem of a shadow area to which the light is not irradiated. To this end, surface treatment, coating, or attachment of a film may be further performed with respect to surfaces of the inner case 140 to improve reflective performance.

For example, the inner case 140 may include inner side plates 141 forming opposite side surfaces, an inner upper plate 142 forming a top surface, an inner rear plate 146 forming a rear surface, and an outer bottom plate 143, 144, 145 forming a bottom surface. The evaporator 31 may be disposed on a front surface of the inner rear plate 146 and a heater 102 may be disposed on a rear surface of the inner rear plate 146. Therefore, heating and cooling may be performed in the rear region of the cultivation space.

The evaporator 31 may be interposed between the inner rear plate 146 and the blower assembly 80 and may be cooled by refrigerant flowing due the driving of the compressor 32. The cooled air may be circulated in the cultivating space 11 by the blower assembly 80 to uniformly cool the cultivating space 11.

The heater 102 may be disposed on the rear surface of the inner rear plate 146 and may be filled with the insulating material 101. The heater 102 may be disposed in an area corresponding to the evaporator 31. A humid environment may be created inside the cultivating space 11 due to continuous moisture supply and the breathing of plants. The heater 102 may be disposed on the rear surface of the inner rear plate 146 not to be exposed to the inside of the cultivating space 11, for safety and durability.

An area of the inner rear plate 146 may be heated by the driving of the heater 102. The heated air may be circulated inside the cultivating space 11 by the blower assembly 80 to uniformly heat the cultivating space 11. As the heater 102 is positioned in an area corresponding to the evaporator 31, the heater 102 may be operated when the evaporator 31 is frozen and used to defrost the evaporator 31.

The inner portion of the cultivating space 11 may be maintained at a temperature appropriate for growing plants (for example, 18° C.-28° C.) by the evaporator 31 and the heater 102. The internal temperature of the cultivating space 11 may be sensed by an internal temperature sensor 182 and may be uniformly maintained regardless of the external temperature of the cabinet 10.

The inner bottom plates 143, 144, and 145 may be formed in a shape corresponding to the shape in which the outer bottom plate 133 is bent, and may be formed with the first bottom plate 143, the second bottom plate 144, and the third bottom plate 145 coupled to each other.

The first bottom plate 143 may have a return duct hole 143a formed therein for mounting a return duct 150. The return duct 150 may communicate with the machine compartment 12 to discharge the internal air of the cultivating space 11 to the machine compartment 12.

The return duct 150 may include a duct mount 151 mounted in the return duct hole 143a and a discharge pipe 152 that extends from a center of the duct mount 151 into the machine compartment 12 through an opening 133a of the outer bottom plate 133.

The duct mount 151 may be inclined toward the discharge pipe 152. The duct mount 151 may be disposed adjacent to a lower portion of the inner rear plate 146 and a lower portion of the evaporator 31 to discharge water to the machine compartment 12 when dew condenses inside the cultivating space 11. In this case, the machine compartment 12 may be provided therein with a dry fan (not shown) to collect water discharged through the return duct 150.

The machine compartment 12 may communicate with the cultivating space 11 through a supply duct 17. Accordingly, carbon dioxide ($CO_2$) required for plant growth may be supplied from the machine compartment 12 to the cultivating space 11. In addition, the internal air in the cultivating space 11 may be discharged through the return duct 150. At least one side of the supply duct 17 and the return duct 150 may have a structure capable of opening and closing, and may be opened when carbon dioxide ($CO_2$) is supplied.

A decoration member 160 may be provided on the front surface of the cabinet 10. The decoration member 160 may connect a front end of the inner case 140 to a front end of the outer case 130 to form a front outer appearance of the cabinet 10. The decoration member 160 may include a decoration frame 161 formed along a circumference of an open front surface of the cabinet 10 and an upper decoration portion 162 and a lower decoration portion 163 forming an upper end and a lower end of the front surface of the cabinet 10.

Regarding the arrangement in an inner lower space of the cabinet 10, as the machine compartment 12 is disposed, a step 147 may be formed to protrude inward from the bottom surface of the cultivating space 11. In other words, the step 147 may protrude from a rear end portion of the bottom surface of the cultivating space 11. The step 147 may be formed higher than a first half of the cultivating space 11 as the machine compartment 12 is formed.

The rear portion of the bed 50 positioned at the lowest portion may be seated on a top surface of the step 147. The water tank 40 and the water supply case 49 may be arranged in the frontward-rearward direction in a space between the bottom surface of the bed 50 and the front portion of the step 147. In this case, heights of the water tank 40 and the water supply case 49 may correspond to a height of the step 147. Therefore, when the bed 50 is seated, a stable mounting structure may be provided such that the bed 50 is in a horizontal state without interfering with not only the step 147, but the water tank 40 and the water supply case 49 in front of the step 147.

The bed 50 may be seated on the step 147 at the bottom surface of the cultivating space 11 and the water tank 40 and the water supply case 49 may be positioned in the space provided between the bottom surface of the cultivating space 11 in front of the step 147 and the bed 50. A height for disposing the beds 50 in multiple stages may be ensured through the above space structure, and the water tank 40 having a sufficient capacity and a water supply assembly may be effectively disposed without loss of space.

A lower structure of the cabinet 10 will be described again with reference to FIG. 5. The machine compartment 12 may be separated from the cultivating space 11 and the step 147 formed inside the cultivating space 11. The cabinet 10 may have the lower structure in which the water tank 40 and the water supply case 49 are subsequently disposed in front of the step 147. Accordingly, the machine compartment 12, the water tank 40, and the water supply assembly may be disposed and fully filled in the space under the bed 50 positioned at the lowest portion, thereby preventing loss of the cultivating space 11. In addition, the water tank 40 may be disposed adjacent to the open front surface of the cabinet 10 to facilitate access by the user.

The water tank 40 may be disposed inside the cabinet 10 such that the water tank 40 may be introduced or withdrawn by sliding for water supply and service. In addition, as the water supply case 49 may be maintained in a fixed state inside the cabinet 10, a connection pipe 492 provided in the water case 49 and a suction pipe 412 provided inside the water tank 40 may be selectively connected to or disconnected from each other.

Hereinafter, structure of the water supply assembly will be described with reference to drawings.

Figure 6:
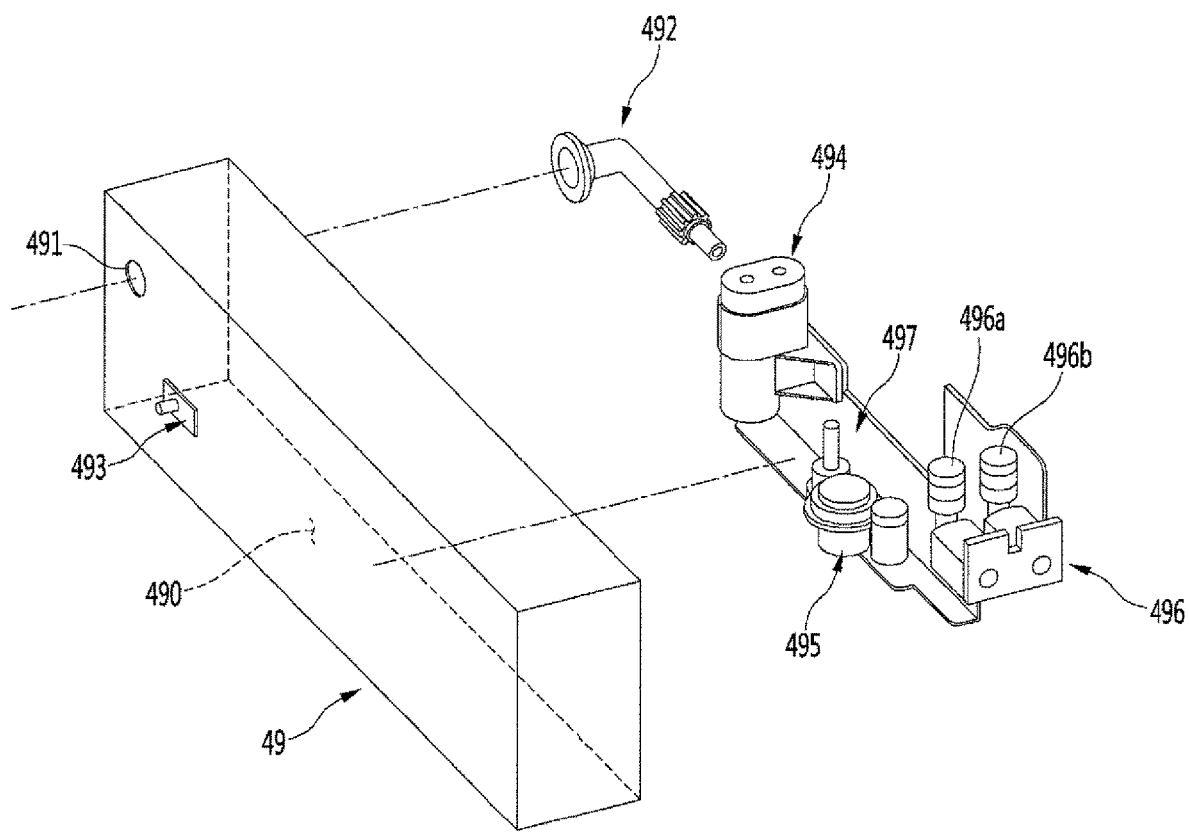
FIG. 6 is an exploded perspective view of a water supply assembly which is one component of the apparatus for cultivating plants according to an embodiment.
Figure 7:
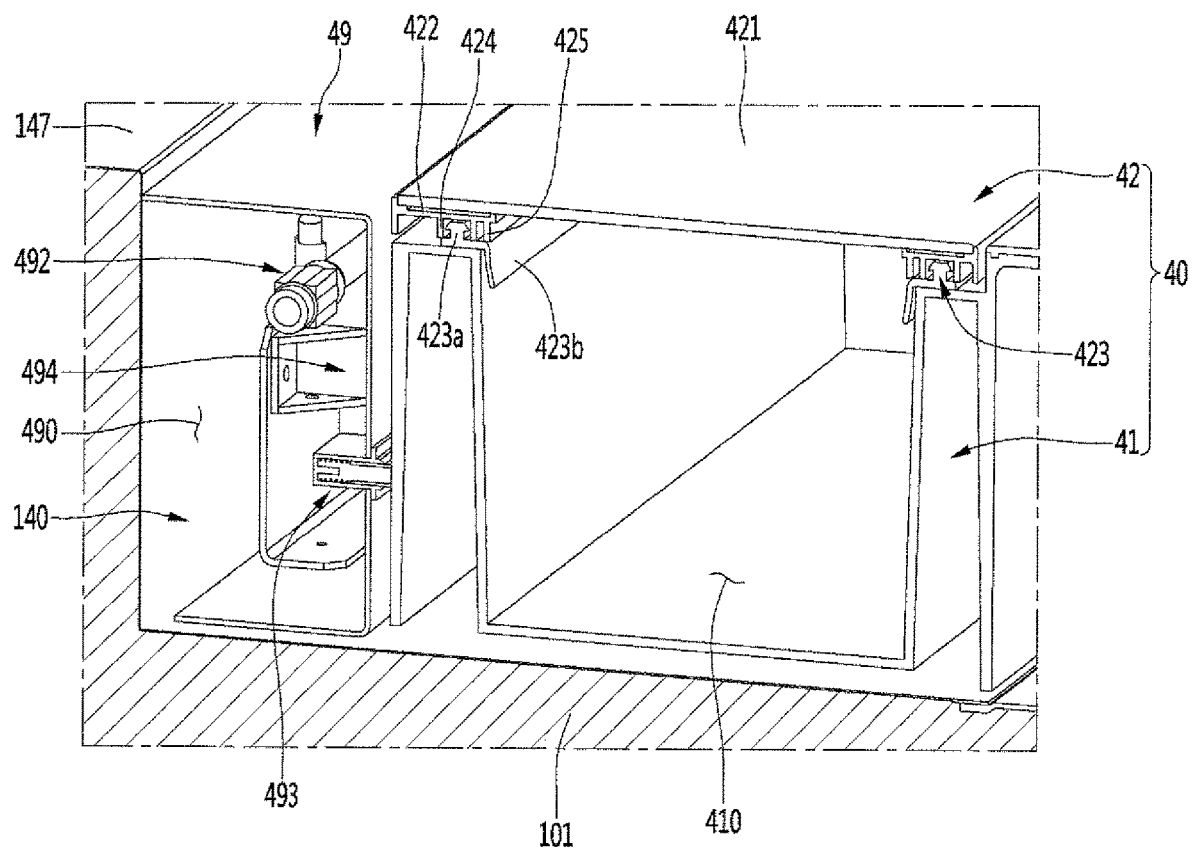
FIG. 7 is a cut-out perspective view of the apparatus for cultivating plants having a water tank serving as one component.

FIG. 6 is an exploded perspective of a water supply assembly which is one component of the apparatus for cultivating plants according to an embodiment. FIG. 7 is a cut-out perspective view of the apparatus for cultivating plants having the water tank serving as one component.

As illustrated in the drawings, the water supply case 49 may be formed in the shape of a box having an open rear surface. In addition, an inner space 490 of the water supply case 49 may be provided to receive the connection pipe 492, the pump 494, the flow meter 495, and the water supply valve 496 therein.

A height of the water supply case 49 may be formed higher than or slightly lower than the height of the step 147 in a state in which the water supply case 49 is mounted inside the cultivating space 11. In addition, the open rear surface of the water supply case 49 may be covered by the front surface of the step 147.

The water supply case 49 may include at a first side of a front surface thereof a case hole 491 that communicates with the connection pipe 492. The case hole 491 may be formed at a position corresponding to an inlet of the connection pipe 492. In addition, when the water tank 40 is mounted, the suction pipe 412 may be connected with the connection pipe 492 through the case hole 491.

A tank switch 493 may be mounted on the first side of the front surface of the water supply case 49. The tank switch 493 may protrude toward the water tank 40. As illustrated in FIG. 7, when the water tank 40 is mounted, the tank switch 493 may be configured to be pressed by a rear surface of the water tank 40.

Accordingly, the tank switch 493 may sense whether the water tank 40 is normally mounted to supply water and may transmit the sensed result to the controller 18. When the mounting signal of the water tank 40 is not input by the tank switch 493, the pump 494 may not be operated. In addition, information on the water tank 40, which is not mounted, may be displayed on the display assembly 70 such that the user recognizes the information on the water tank 40.

A bracket 497 may be provided inside the water supply case 49. The bracket 497 may allow the mounting of the pump 494, the flow meter 495, and the water supply valve 496.

The connection pipe 492 may be sequentially connected to the pump 494, the flow meter 495, and the water supply valve 496 through a pipe. The water in the water tank 40 may be supplied to the bed 50 through the flow meter 495 and the water supply valve 496, due to operation of the pump 494.

The flow meter 495 may sense a flow rate of water to be supplied, and prevent water from being excessively supplied to the bed 50 to overflow. A constant amount of water may be supplied by the flow meter 495 to adjust an amount of water to be supplied to the bed 50. Accordingly, an optimized amount of water may be supplied to the bed 50 according to a growing step of plants to prevent water from being excessively stored in the bed 50. Accordingly, the bed 50 may be always maintained in a clean state and humidity in the bed 50 and the cultivating space 11 may be properly maintained.

The water supply valve 496 may be opened when the pump 494 is driven such that water may be supplied to the bed 50. A plurality of water supply valves 496 may be provided depending on the number of beds 50, or water may be supplied to a plurality of beds 50 through a branch from one water supply valve 496.

According to one embodiment, one water supply valve 496 may be branched into an upper fitting 496*a* and a lower fitting 496*b*, and an upper water supply pipe 498 and a lower water supply pipe 497 may be connected to the upper fitting 496*a* and the lower fitting 496*b*, respectively, to supply water independently to the beds 50 (upper bed 50 and lower bed 50) at upper and lower positions. Accordingly, mutually different water supply environments may be provided to the beds 50 at the upper and lower positions, and an appropriate amount of water may be supplied to the beds 50, respectively.

The water tank 40 may be disposed in front of the water supply case 49, and the tank switch 493 may be pressed in a state in which the water tank 40 is completely introduced. A top surface of the water tank 40 and a top surface of the water supply case 49 may have heights equal to or slightly lower than the top surface of the step 147.

Accordingly, when viewed from the front, a lower area of the lower bed 50 may be completely covered by the water tank 40. In addition, the lower bed 50 and the top surface of the water tank 40 may be positioned significantly close to each other. Accordingly, a volume of the water tank 40 may be ensured and the water tank 40 and the lower bed 50 may produce a sense of unity. That is, as the front surface of the water tank 40 may be positioned on the same plane as the front surface of the lower bed 50, and may be vertically disposed adjacent to each other, the water tank 40 and the lower bed 50 may produce a sense of unity.

Hereinafter, structure of the water tank 40 will be described with reference to accompanying drawings.

Figure 8:
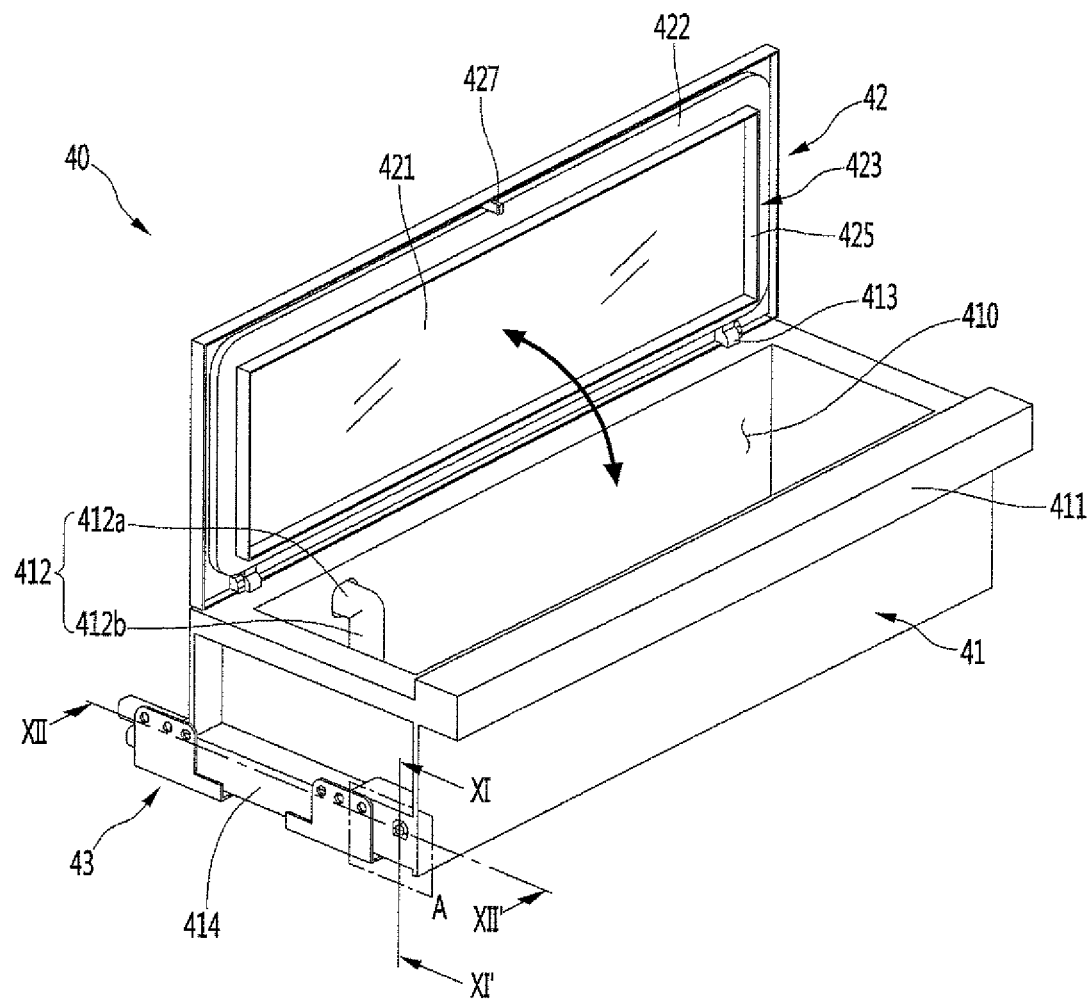
FIG. 8 is a perspective view of the water tank, the cover of which is open.
Figure 9:
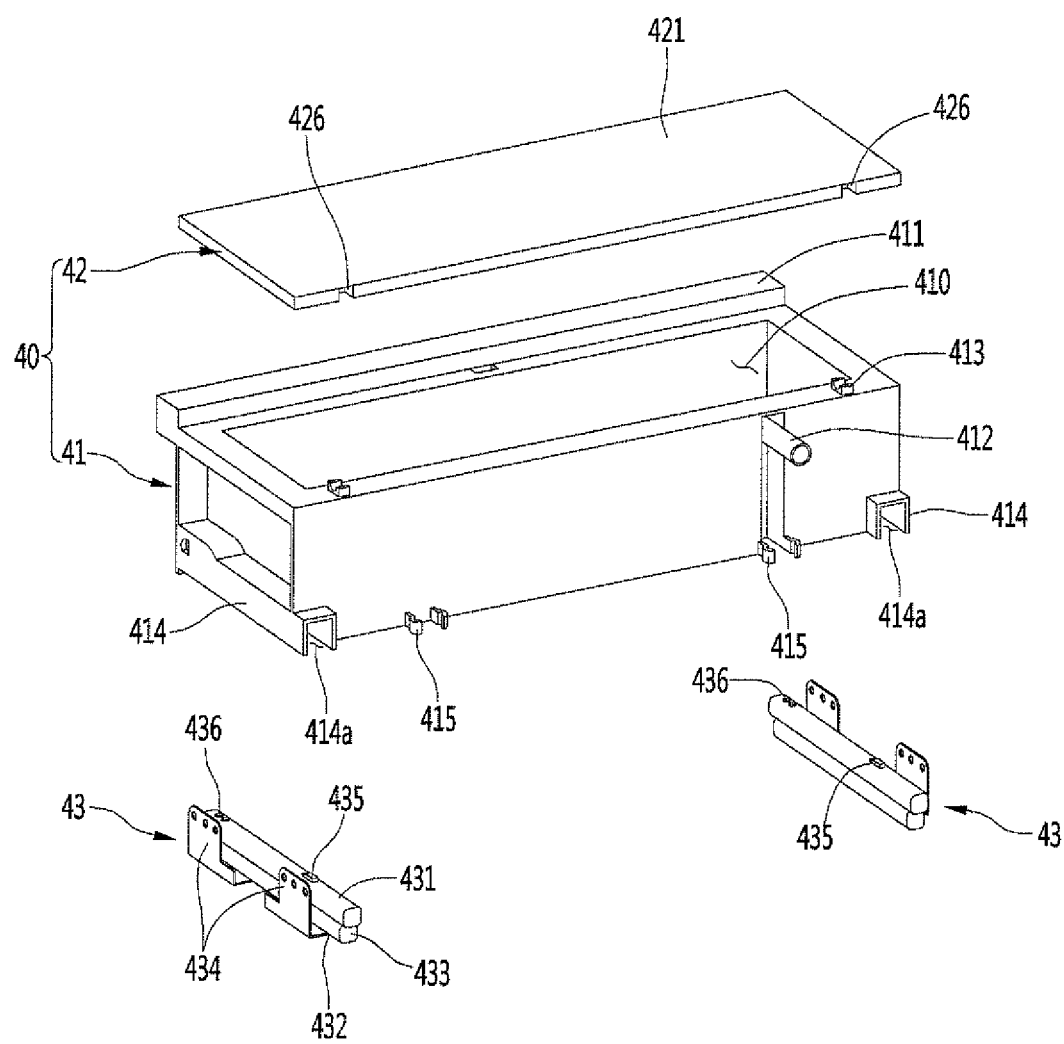
FIG. 9 is an exploded perspective view of the water tank according to an embodiment.

FIG. 8 is a perspective view of the water tank, the cover of which is open. In addition, FIG. 9 is an exploded perspective view of the water tank according to an embodiment.

The water tank 40 may include a tank body 41 having a top surface open to receive water and a tank cover 42 to open and close the top surface of the tank body 41. The tank cover 42 may be pivotably coupled to the tank body 41 and the tank body 41 may be opened or closed by the pivoting of the tank cover 42. A cover engaging groove 426 and a cover engaging protrusion 413 may be formed at an upper end of the tank body 41 and a first end of the tank cover 41.

At least a portion of the tank cover 42 may be transparent such that an inner portion 410 of the tank cover 42 may be viewed even when the tank cover 42 is closed. The tank cover 42 may include a cover frame 422 having an opening at a center thereof and a cover plate 421 to cover the opening from a top surface of the cover frame 422. The cover plate 421 may be transparent such that a water level inside the tank body 41 may be viewed.

The cover engaging groove 426 may be formed in the first end of the cover frame 422, and a restricting protrusion 427 may be further formed on an opposite second side to the cover engaging groove 426 to maintain the tank cover 42 to be closed. When the tank cover 42 is closed, the restricting protrusion 427 may be inserted into a restricting groove (not shown), which is formed in the upper end of the tank body 41, to be restricted.

A gasket groove 424 formed of rubber or silicon, for example, may be formed along a circumference of a bottom surface of the cover frame 422. A cover gasket 423 may be mounted in the gasket groove 424. The cover gasket 423 may contact the upper end of the tank body 41 in a state in which the tank cover 42 is closed so that the water tank 40 is airtight.

The cover gasket 423 may be formed along the circumference of the cover frame 422. The cover gasket 423 may include a gasket mount 423a inserted and fixed in the gasket groove 424 and an airtightness portion 423b extending downward from one side of the gasket mount 423a. The airtightness portion 423b may be inserted into the open top surface of the tank body 41 and may closely contact an inner surface of the tank body 41 to completely seal the inner portion of the tank body 41 with air tightness.

A frame rib 425 may be further formed on a bottom surface of the cover frame 422 to press the airtightness portion 423b. The frame rib 425 may extend downward from the bottom surface of the cover frame 422 corresponding to the airtightness portion 423b and may contact an upper end of the airtightness portion 423b. Accordingly, in a state in which the tank cover 42 is closed, the frame rib 425 may press the airtightness portion 423b to maintain the airtightness portion 423b in close contact with the tank body 41.

The suction pipe 412 may be provided inside the tank body 41. The suction pipe 412 may be provided at a position corresponding to the connection pipe 492 and may extend to the inner portion 410 of the tank body 41 by passing through a rear surface of the tank body 41.

The suction pipe 412 may include a horizontal portion 412a and a vertical portion 412b. One end of the horizontal portion 412a may extend rearward through the rear surface of the tank body 41, that is, the surface facing a front surface of the water supply case 49. The horizontal portion 412a may be formed in a size to be press-fitted into the connection pipe 492.

The vertical portion 412b may be positioned inside the tank body 41 and may extend vertically downward from an end of the horizontal portion 412a passing through the rear surface of the tank body 41. The vertical portion 412b may extend to a position adjacent to the bottom surface of the tank body 41. Therefore, the water contained inside of the tank body 41 may flow into the connection pipe 492 through the vertical portion 412b and the horizontal portion 412a.

A tank handle 411 may be provided to protrude forward from an upper end of the front surface of the tank body 41. The tank handle 411 may extend from a first lateral end portion of the tank body 41 to a second lateral end portion of the tank body 41, and have a bottom surface open such that a user may insert his or her hand into the bottom surface to pull out or push in the water tank 40, thereby withdrawing or introducing the water tank 40. A front surface of the tank handle 411 may be positioned on a same plane as the front surface of the bed 50 and may be formed of a material the same as or similar to a material of the bed 50 such that the tank handle 411 and the bed 50 produce a sense of unity.

A tank fixing portion 415 may be formed at a lower end of the rear surface of the tank body 41. A pair of tank fixing portions 415 may be provided at lateral sides, and the tank fixing portion 415 may be configured to be coupled to a protrusion provided on one side of the inner portion of the cabinet 10 when the water tank 40 is completely introduced.

The tank fixing portion 415 may include a pair of ribs rearwardly extending, a distance between end portions of the ribs may be slightly narrower than a distance between protrusions, and a distance between intermediate portions of the ribs may have a size corresponding to the protrusions. When the water tank 40 is completely introduced, an entrance of the tank fixing portion 415 may be elastically deformed while expanding. The protrusion may be press-fitted into the recessed intermediate portion of the tank fixing portion 415. When the water tank 40 is completely introduced as described above, the press-fitting of the protrusion into the tank fixing portion 415 may be recognized through a sound or press-fitting feeling.

Therefore, a connection state of the suction pipe 412 and the connection pipe 492, which is not viewed when the water tank 40 is introduced as the water tank 40 is disposed at a rear portion, may be recognized through coupling of the tank fixing portion 415. In addition, the water tank 40 may be maintained in an exact and firm introduction state by the tank fixing portion 415.

Rail mounts 414 may be formed at lower end portions of lateral side surfaces of the tank body 41. The rail mount 414 may extend from a front end portion to a rear end portion of the tank body 41 and provide a space 414a for mounting a tank rail 43 to withdraw or introduce the water tank 40.

The rail mount 414 may be open downward. Accordingly, the tank body 41 may have a structure of being seated from an upper portion to a lower portion of the tank rails 43 disposed at opposite sides of the tank body 41 and may be coupled to the tank rails 43.

The tank rail 43, which has a rail structure for multi-stage withdrawal and introduction, may have a compact structure. The tank rail 43 may include an upper rail 431, a lower rail 432, and a middle rail 433 connecting the upper rail 431 and the lower rail 432. The upper rail 431 may be inserted into the rail mount 414 and fixed to the rail mount 414. Rail brackets 434, which are provided at the lower rail 432, may be fixedly mounted on opposite sidewalls of the cultivating space 11. The middle rail 433 may be slidably coupled to the upper rail 431 and the lower rail 432 to connect the upper rail 431 to the lower rail 432. Accordingly, when a user holds the tank handle 411 and pulls forward or pushes the water tank 40, the tank rail 43 may slide to withdraw or introduce the water tank 40. Thus, the tank body 41 may be configured to be easily mounted and separated from the tank rail 43 without additional tools or assembling or disassembling coupling members for cleaning or managing the tank body 41.

Figure 10:
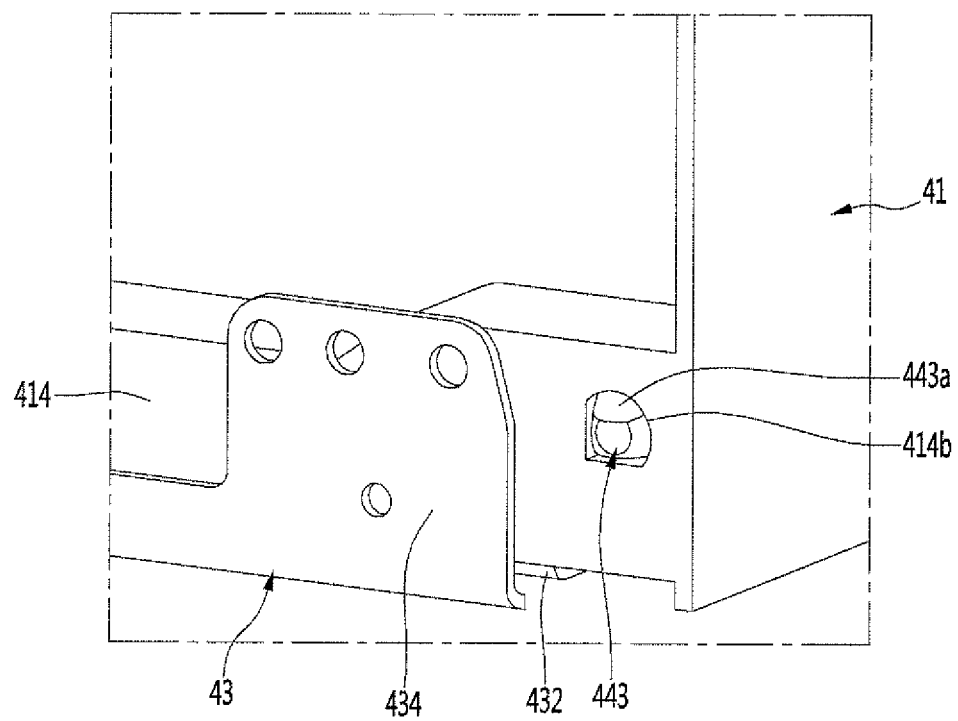
FIG. 10 is an enlarged view of portion A of FIG. 8.
Figure 11:
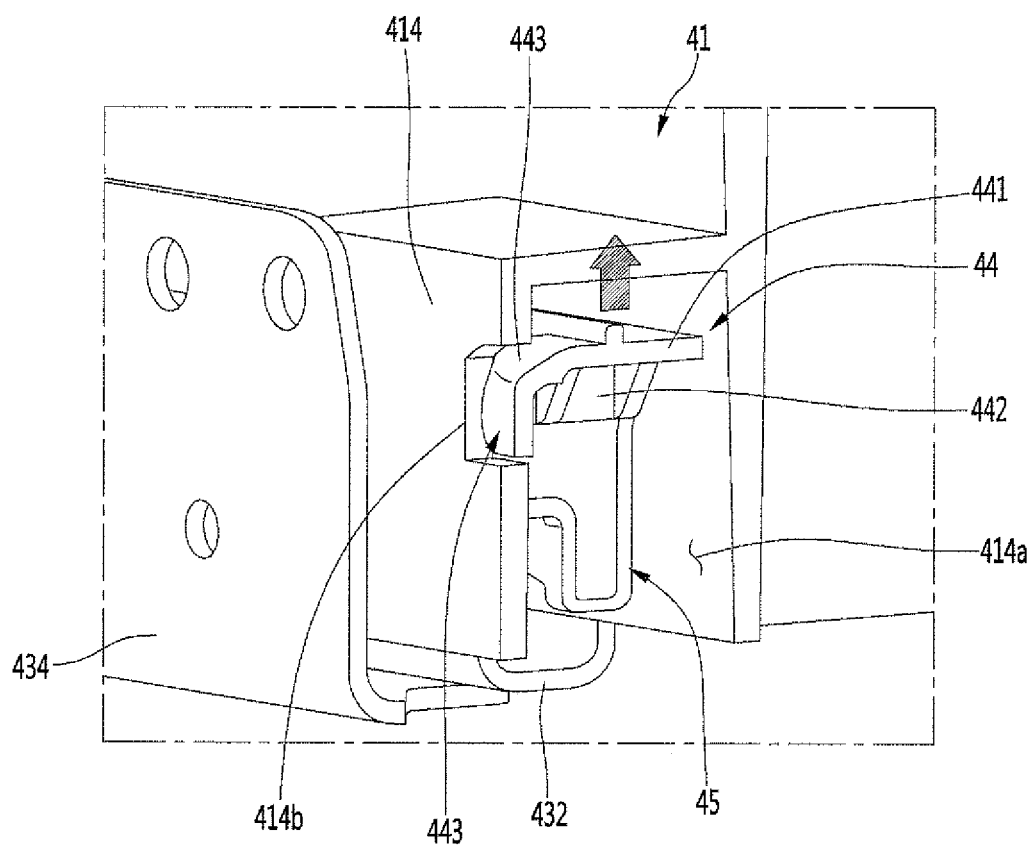
FIG. 11 is a cut-out perspective view of a portion of FIG. 8, taken along line XI-XI.
Figure 12:
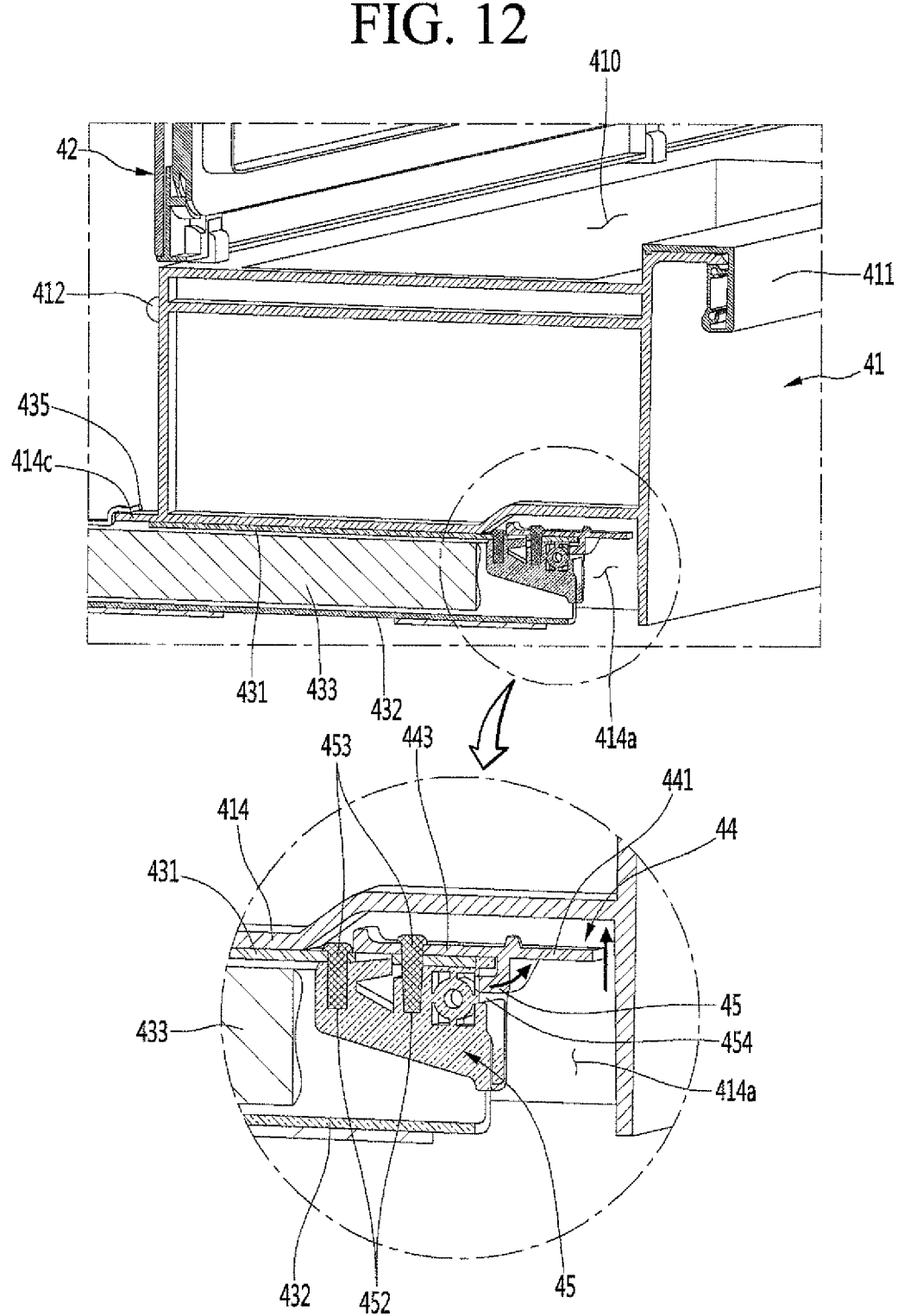
FIG. 12 is a cut-out perspective view of a portion of FIG. 8, taken along line XII-XII.

FIG. 10 is an enlarged view of portion A of FIG. 8. FIG. 11 is a cut-out perspective view of a portion of FIG. 8, taken along line XI-XI. FIG. 12 is a cut-out perspective view of a portion of FIG. 8, taken along line XII-XII.

As illustrated in the drawings, the tank rail 43 may be inserted into the rail mount 414. A rear end portion of the rail mount 414 may be inserted into a rail restricting portion 435 protruding from a top surface of the upper rail 431 such that the of the tank body 41 may be fixed to the tank rail 43.

The rail restricting portion 435 may be formed by cutting out a portion of the upper rail 431. In addition, when the rear end portion of the rail mount 414 is moved back and inserted as upper and front portions are bent, a second half of the tank rail 43 and the rail mount 414 may be restricted with respect to each other.

The tank rail 43 may be provided at a front end portion thereof with a rail locker 44 to restrict a front end portion of the tank rail 43 in the rail mount 414 and a locker fixing member 45 to mount the rail locker 44. The rail locker 44 may be coupled to the tank rail 43 and selectively coupled to or decoupled from the tank body 41 through handling of the user. Accordingly, the user may couple or decouple the tank body 41 to or from the tank rail 43 through the handling of the rail locker 44.

The lock fixing member 45 may be inserted and mounted into the open front end portion of the upper rail 431. In addition, a screw 453 passing through a screw hole 436 formed in a top surface of the upper rail 431 may be coupled to the locker fixing member 45 such that the locking fixing member 45 is fixed into the upper rail 431.

The locker fixing member 45 may include a plurality of coupling grooves 452 for coupling the screw 453. A pair of screws 453 may not only couple the locker fixing member 45, but couple the rail locker 44 to the top surface of the upper rail 431.

As illustrated in FIG. 12, the screw 453 at a rear portion may pass through the screw hole 436 at the rear portion to be coupled to the coupling groove 452 formed in the rear portion of the locker fixing member 45, thereby coupling the upper rail 431 with the locker fixing member 45. In addition, the screw 453 at a front portion may pass through the rail locker 44 and the screw hole 436 at the front portion of the upper rail 431 and then be coupled to the coupling groove 452 formed in the front portion of the locker fixing member 45, thereby maintaining a coupling state of the rail rocker 44, the upper rail 431, and the locker fixing member 45.

The rail locker 44, which extends forward from the top surface of the upper rail 431, may extend forward beyond the front end portion of the upper rail 431. In addition, a locker restricting portion 442 may protrude from the bottom surface of the rail locker 44 at the front portion of the upper rail 431. The locker restricting portion 442 may extend downward and protrude toward the front surface of the locker fixing member 45.

The front end portion of the locker fixing member 45 may be exposed through the open front surface of the upper rail 431. In addition, a locker restricting groove 454 may be formed in the front surface of the locker fixing member 45, and the locker restricting portion 442 may be selectively inserted into the locker restricting groove 454 to fix the rail locker 44.

A locker restricting protrusion 443 may be formed to protrude in a sideways direction from a side portion of the locker restricting portion 442. In addition, the locker restricting protrusion 443 may be inserted into a mount opening 414b open in a side surface of the rail mount 414. In other words, in a state in which the locker restricting protrusion 443 is inserted into the mount opening 414b, a front end portion of the tank rail 43, that is, the front end portion of the upper rail 431 may be fixed inside of the rail mount 414. As described above, the rear end portion and the front end portion of the tank rail 43 may be restricted by the rail mount 414 and fixed. In particular, in the state in which the locker restricting protrusion 443 is inserted into the mount opening 414b, the locker restricting portion 442 is locked and restricted by the locker restricting groove 454, so the tank rail 43 may be prevented from being easily separated from the rail mount 414.

The rail locker 44 may be formed of a plastic material, for example, and may be formed with predetermined elasticity. In addition, the locker restricting protrusion 443 may be formed at an upper portion thereof with an inclined surface 443a. Accordingly, when the user lifts a handle 441 of the rail locker 44, the locker restricting protrusion 443 may be out of the mount opening 414b by the inclined surface 443a, and the tank rail 43 may be separated from the rail mount 414. In such a state, when the tank body 41 is drawn forward, the rear portion of the tank rail 43 may be separated from the tank body 41.

As described above, as the water tank 40 is separated from the tank rail 43, cleaning and service are possible and management is more easily performed. In addition, the tank rail 43 may be coupled to the rail mount 414 again, and the water tank 40 may be introduced or withdrawn in the state in which the tank rail 43 is coupled to the rail mount 414.

The water in the water tank 40 may be supplied to the bed 50 through the pump 494 and the water supply valve 496.

Figure 13:
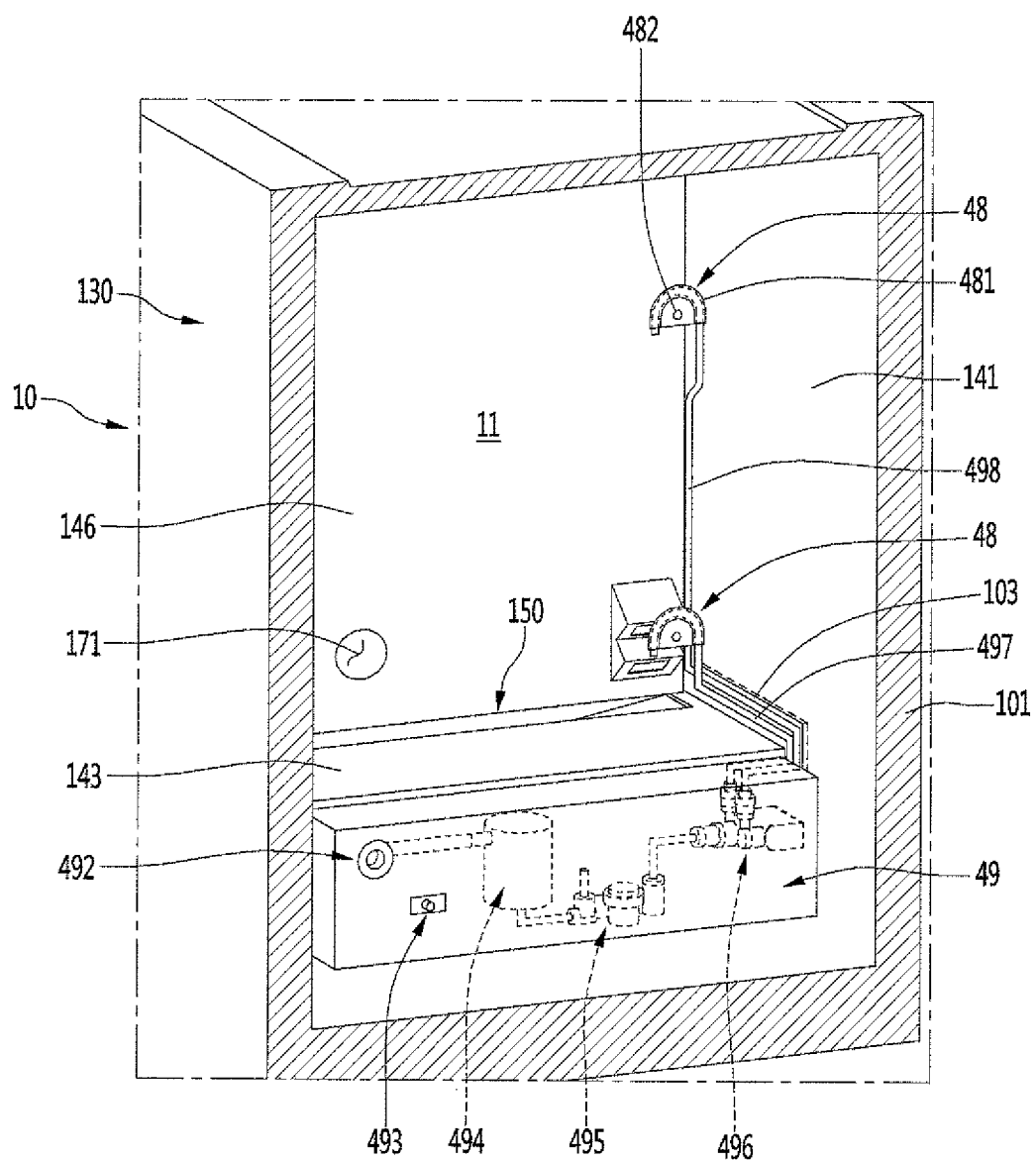
FIG. 13 is a view illustrating a layout of water supply pipes inside the cabinet according to an embodiment.
Figure 14:
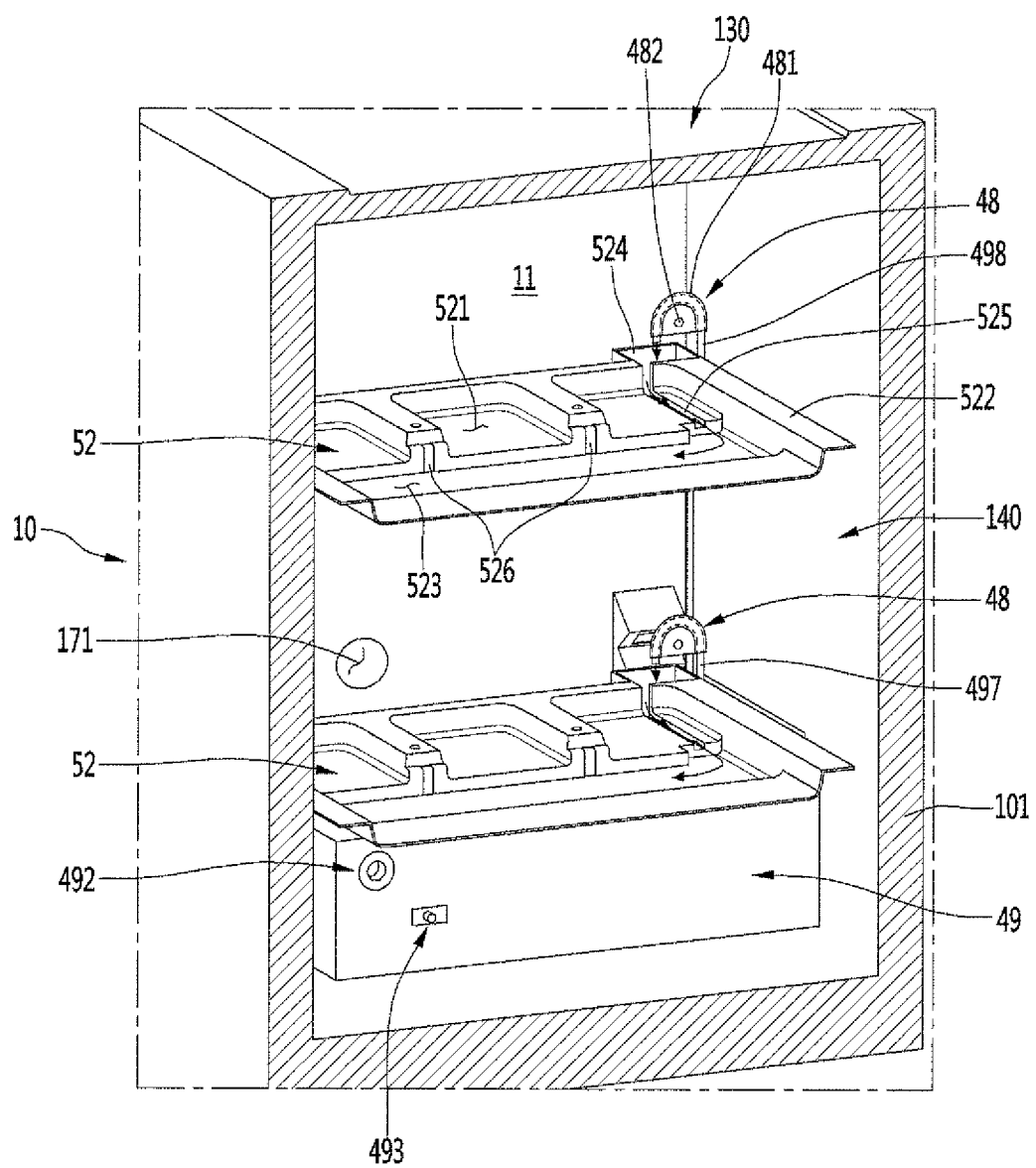
FIG. 14 is a view illustrating that a bottom bed is mounted in FIG. 13.

FIG. 13 is a view illustrating a layout of water supply pipes inside the cabinet according to an embodiment. FIG. 14 is a view illustrating that a bottom bed is mounted in FIG. 13.

As illustrated in FIG. 14, the upper water supply pipe 498 and the lower water supply pipe 497 may be connected to the water supply valve 496 to supply water to the upper bed 50 and the lower bed 50, respectively. The upper water supply pipe 498 and the lower water supply pipe 497 may be provided independently from each other and may extend toward the rear end portion of the bed 50, thereby supplying water necessary for the growth of plants.

End portions of the upper water supply pipe 498 and the lower water supply pipe 497 may be connected to the water supply valve 496 provided in the water supply case 49. The water supply valve 496 may include the upper fitting 496a and the lower fitting 496b independently configured. The upper water supply pipe 498 may be connected to the upper fitting 496a, and the lower water supply pipe 497 may be connected to the lower fitting 496b.

To ensure the space of the water tank 10 and facilitate the fluid passage arrangement, the connection pipe 492, the pump 494, the flow meter 495, and the water supply valve 496 may be subsequently arranged in a widthwise direction. The water supply valve 496 may be positioned at an outermost portion of the water supply case 49, and the upper water supply pipe 498 and the lower water supply pipe 497 may be arranged to pass through sidewall surfaces of the water supply case 49.

A water supply pipe guide 103 may be formed on an inner sidewall surface of the cabinet 10 adjacent to the water supply valve 496. The water supply pipe guide 103 may be formed as one sidewall of opposite lateral sidewalls of the storage space, that is, the inner side plate 141 is recessed or open.

The water supply pipe guide 103 may extend upward from one side adjacent to the water supply valve 496 and then may extend rearward along the upper end portion of the step 147. Accordingly, the upper water supply pipe 498 and the lower water supply pipe 497 connected to the water supply valve 496 may be guided to a rear wall surface of the cultivating space 11, that is, a position of the inner rear plate 146 along a sidewall of the cultivating space 11.

In order to mount the lower bed 50, the introduction/withdrawal guides 56, which may be mounted on opposite side surfaces of the cultivating space 11, may be configured to cover a section, which is the water supply pipe guide 103, extending in the frontward-rearward direction. Therefore, in the state in which the lower bed 50 is mounted, the water supply pipe guide 103 is not exposed to the outside, thereby making a more neat outer appearance.

The upper water supply pipe 498 and the lower water supply pipe 497 may be positioned in corner areas of the rear and side surfaces of the cultivating space 11. That is, the upper water supply pipe 498 and the lower water supply pipe 497 may be bent upward in a corner area in which the inner rear plate 146 and the inner side plate 141 are adjacent to each other and may extend. The upper water supply pipe 498 may extend to a water supply portion 524 of the upper bed 50 and the lower water supply pipe 497 may extend to a water supply portion 524 of the lower bed 50, thereby supplying water to the upper bed 50 and the lower bed 50.

The water supply pipes 497 and 498 are guided along the inner portion of the cultivating space 11 and easily placed. The water supply pipes 497 and 498 extend upward along an edge area of the cultivating space 11 to minimize interference between internal components.

As the water supply pipes 497 and 498 are disposed at a position apart from a side of the evaporator 31 so as not to interfere with the evaporator 31 mounted on the front surface of the inner rear plate 146, water flowing along the water supply pipes 497 and 498 may be prevented from being frozen or excessively lowered in temperature due to the cooled air of the evaporator 31. In addition, the water supply pipes 497 and 498 may have structures of being prevented from interfering with the internal component of the cabinet 10, such as the evaporator 31, and of facilitating placement work.

The water supply pipes 497 and 498 may be formed of a metal pipe, such as stainless steel, for example. Therefore, the water supply pipe 497 and 498 may be sanitarily managed and may be maintained firmly in shape, thereby preventing the fluid passage from being deformed or bent and clogged. Accordingly, a reliable water supply is possible.

The water supply pipes 497 and 498 may extend upward through the water supply portion 524 and then be bent toward the water supply portion 524. The outlets of the water supply pipes 497 and 498 may be formed to be directed toward an inside of the water supply portion 524 from an upper portion adjacent to the water supply portion 524.

A water supply pipe holder 48 may be provided at a position corresponding to the water supply portion 524. The water supply pipe holder 48 may be formed of a plastic or rubber material, for example, and may be fixedly mounted on the inner rear plate 146. Water supply pipe holders 48 may fix the water supply pipes 497 and 498 such that outlets of the water supply pipes 497 and 498 are always directed toward the inside of the water supply portion 524 at a set or predetermined height thereof.

The water supply pipe holder 48 may be formed in a semicircular shape, and may include a rounded portion 481 allowing the water supply pipes 497 and 498 to pass therethrough along a rounded circumference of the water supply pipe holder 48, The rounded portion 481 may correspond to a bended shape of the water supply pipes 497 and 498, and a rear surface of the rounded portion 481 may be formed in an open or recessed shape to receive the bent portions of the water supply pipes 497 and 498. The outlets of the water supply pipes 497 and 498 may extend further downward through the rounded portion 481 to be closer to the water supply portion 524.

A holder fixing hole 482 may be formed at a center of the water supply pipe holder 48 to receive, for example, a screw. The screw may pass through the holder fixing hole 482 and may be fastened to the inner rear plate 146 such that the water supply pipe holder 48 may be maintained in a fixed state at a preset or predetermined position.

The water supply pipes 497 and 498 and the water supply pipe holder 48 may be covered when the blower assembly 80 is mounted on the inner rear plate 146, and may not be exposed to the outside when the apparatus 1 for cultivating plants is generally used.

The upper bed 50 and the lower bed 50 have the same water supplying structure except for vertical positions thereof. Water supplied to the water supply portion 524 may be stored in a water collecting portion 523 inside the bed 50 to provide moisture to the seed package 90 mounted on the bed 50.

Hereinafter, structure of bed 50 will be described with reference to the accompanying drawings. Although a plurality of beds 50 is provided, the beds 50 may have the same structure except for mounting positions thereof. Accordingly, the following description will be made with respect to only one bed 50.

Figure 15:
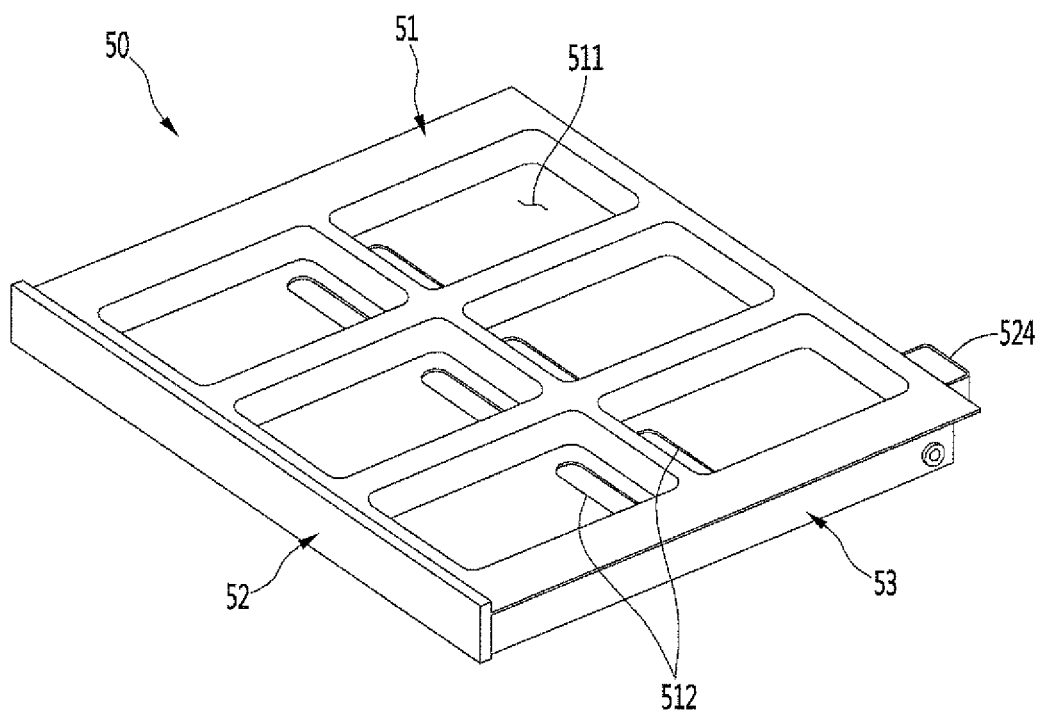
FIG. 15 is a perspective view of the bed which is one component of the apparatus for cultivating plants according to an embodiment.
Figure 16:
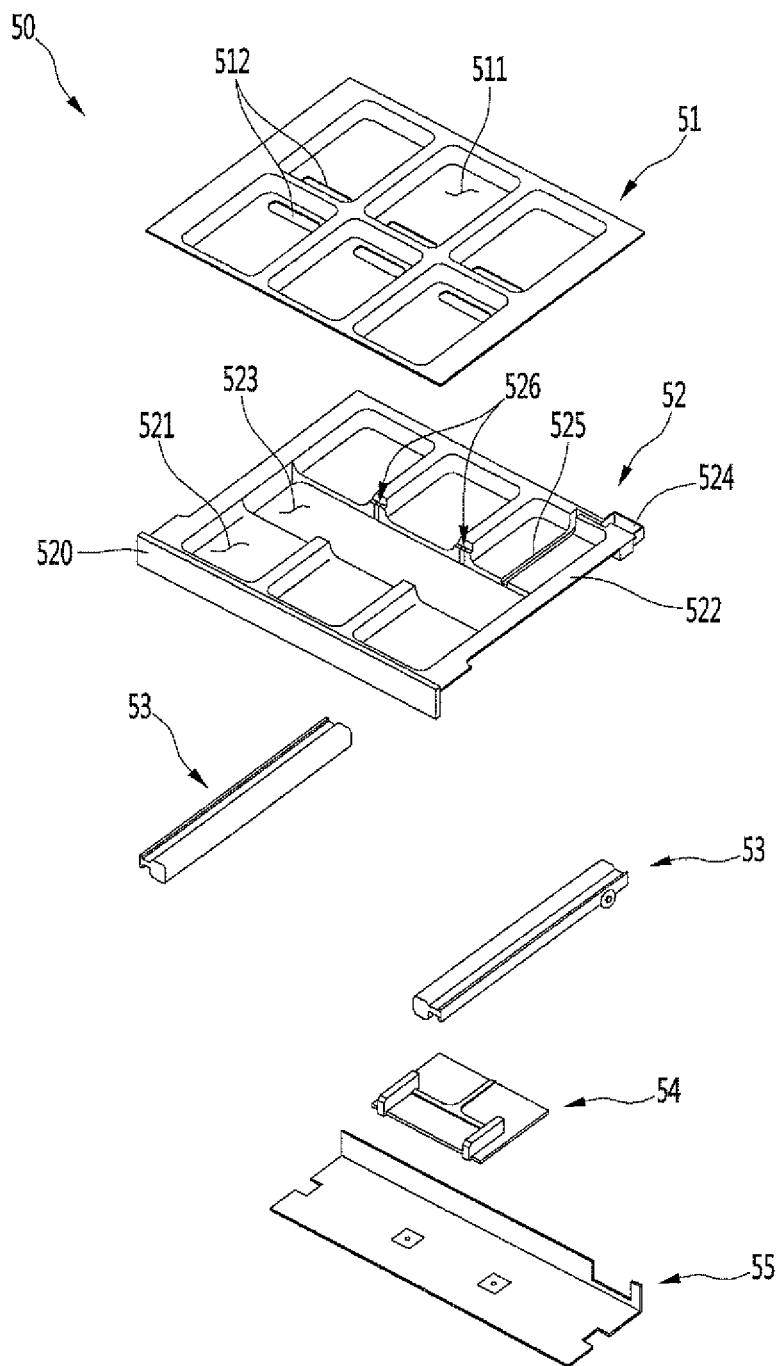
FIG. 16 is an exploded perspective view of the bed when the bed is viewed from the top.
Figure 18:
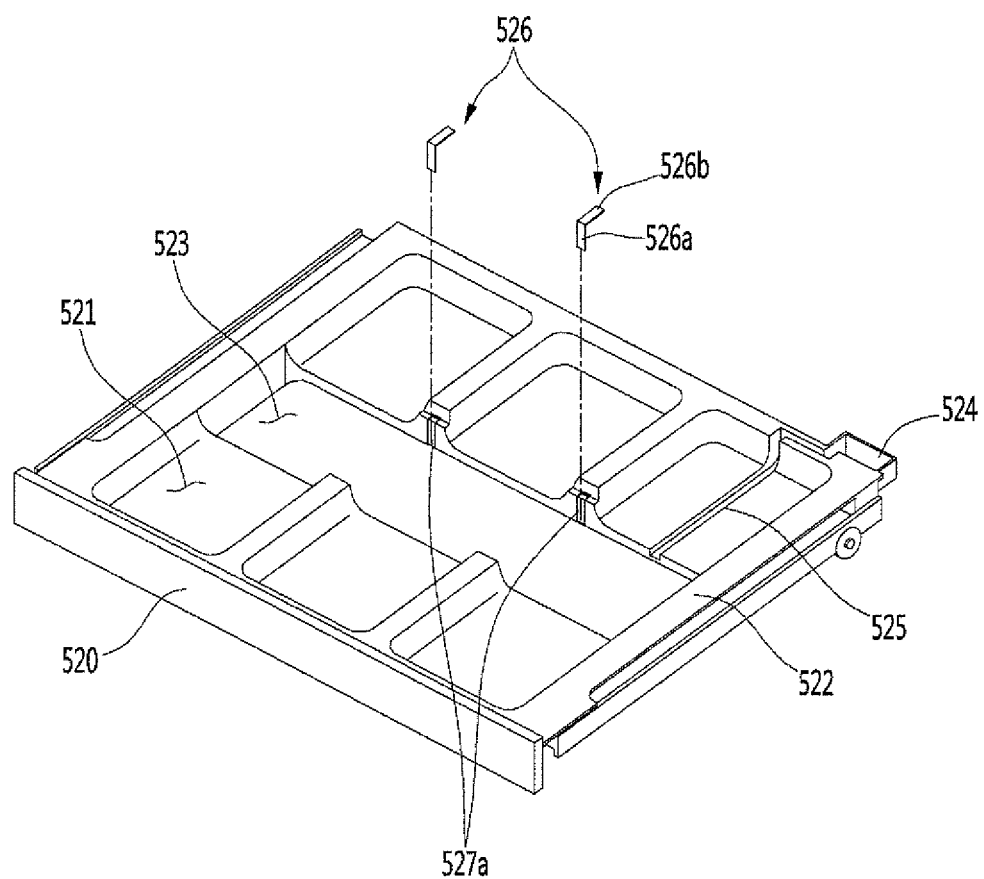
FIG. 18 is a perspective view of the bottom bed.

FIG. 15 is a perspective view illustrating the bed which is one component of the apparatus for cultivating plants according to an embodiment. FIG. 16 is an exploded perspective view of the bed when the bed is viewed from the top. FIG. 17 is an exploded perspective view of the bed when the bed is viewed from the bottom. FIG. 18 is a perspective view of the bottom bed.

As illustrated in the drawings, the bed 50 may be formed in a rectangular plate shape dividing the cabinet 10, and may be seated on guides 56 for withdrawal and introduction, which may be mounted on opposite side surfaces of the cabinet 10, such that the beds 50 are withdrawn or introduced.

The bed 50 may include a bottom bed 52 to form a lower structure for totally supplying water. The bottom bed 52 may form a whole shape of the bed 50 and may be formed of a plastic material, for example.

The bottom bed 52 may include bed flanges 522 that extend at a side portion from opposite side end portions of the bottom bed 52. A bed side 53 may be coupled to a bottom surface of the bed flange 522.

The bottom bed 52 may include a recess 521, and an upper bed 51 may be seated in the recess 521. The recess 521 may be provided in a shape corresponding to the shape of the upper bed 51. In other words, the recess 521 may be formed at a position corresponding to a package seat 511 formed in the upper bed 51, and may be recessed in the shape corresponding to the package seat 511 such that the package seat 511 is stacked up the recess 521.

In addition, the bottom bed 52 may include the water supply portion 524 and the water collecting portion 523 to store water supplied through the water supply portion 524. The water stored in the water collecting portion 523 may be constantly supplied to the seed package 90.

The water collecting portion 523, which is positioned at the center of the bottom bed 52, may extend from a left or first side end portion of the bottom bed 52 to a right or second side end portion of the bottom bed 52. In addition, the water collecting portion 523 may be recessed to a position lower than the recess 521 such that water may be stored only in the water collecting portion 523. The water collecting portion 523 may be formed to have a predetermined width in the frontward-rearward direction such that all seat openings 512 formed in the upper bed 51 are received in the water collecting portion 523.

The water supply portion 524 may be formed at a corner of a rear end portion of the bottom bed 52. The water supply portion 524 may have a shape of protruding slightly rearward from the bottom bed 52, an open top surface, and be recessed. Accordingly, the water supply portion 524 may receive water from the water supply pipes 497 and 498 positioned above. In addition, the water supply portion 524 may be positioned higher than the water collecting portion 523 such that the water naturally flows from the water supply portion 524 to the water collecting portion 523.

A water guide 525 may be recessed and formed between the water supply portion 524 and the water collecting portion 523. The water supply portion 524 may be connected with the water collecting portion 523 by the water guide 525. The water supplied to the water supply portion 524 may flow to the water collecting portion 523 along the water guide 525. The water guide 525 may have a slope that declines toward the water collecting portion 523 from the water supply portion 524. Accordingly, when water is supplied to the water supply portion 524, the water may be naturally supplied to the water collecting portion 523 along the water guide 525.

The water collecting portion 523 may include a water sensor 526 to sense a water level. Accordingly, when it is necessary to supply water to the plants being cultivated, the water level of the water collecting portion 523 or the existence of moisture may be identified through the water sensor 526 and then whether the water is supplied from the water tank 40 to the bed 50 may be determined.

A pair of water sensors 526 may be provided, for example, and may be spaced apart from each other. The water sensor 526 may be disposed at opposite sides of the water collecting portion 523 to facilitate sensing of moisture and placement of a wire 544 for supplying power to the water sensor 526.

Sensor mounts 527 may be formed to be recessed to mount the water sensors 526 at front end portions of lateral sides of the recess 521 formed at the center of the bottom bed 52. The sensor mounts 527 may be recessed in a same shape as a shape of the water sensor 526 and may longitudinally extend in a vertical direction. In addition, the sensor mount 527 may include in an upper end thereof a slot 527a through which the water sensor 526 may pass.

The water sensor 526 may be formed of a metal material having conductivity, for example, and may be formed in a bent plate shape such that the water sensor 526 may be mounted in the sensor mount 527 through the slot 527a. A vertically extending portion 526a, which extends in the vertical direction, in the water sensor 526 may have a lower end extending to a bottom surface of the water collecting portion 523. The water sensor 526 may be configured such that a rear end portion of a horizontally extending portion 526b horizontally extending to the bottom bed 52 is exposed to the bottom surface of the bottom bed 52 through the slot 527a. The horizontally extending portion 526b exposed to the bottom surface of the bottom bed 52 may be fixed and mounted to the bottom bed 52 by, for example, a screw.

Power may be supplied to a pair of water sensors 526. When water is present in the water collecting portion 523, electricity may be conducted between the pair of water sensors 526. In addition, when water is absent in the water collecting portion 523, electricity is not conducted between the pair of water sensors 526. In this case, the pump 494 may be driven to supply water to the water collecting portion 523. In other words, the pair of water sensors 526 may serve as electrodes inside the water collecting portion 523, and whether to supply water from the water tank 10 may be determined depending on conduction of electricity between the pair of water sensors 526.

The guides 56, which may be seated on lateral sides of the bottom bed 52, may include the bed sides 53 to guide the withdrawal and the introduction of the bed 50. The bed sides 53 may have a structure of being coupled to opposite end portions of the bottom bed 52 after separately being molded. Alternatively, the bed sides 53 may be formed integrally with the bottom bed 52 when the bottom bed 52 is molded.

A bed handle 520 may be formed on a front surface of the bottom bed 52. The bed handle 520 may have a structure in which a bottom surface thereof is recessed such that the user holds the bed 50 when the bed 50 is introduced or withdrawn. In addition, a front surface of the bed handle 520 may be formed of the same material as a material of the tank handle 411 or of a material having a same texture as the material of the tank handle 411 such that the bed handle 520 and the tank handle 411 produce a sense of unity.

The upper bed 51 may be seated on a top surface of the bottom bed 52 and may form an outer appearance of the top surface of the bed 50. The upper bed 51 may be formed of a metal pipe such as a stainless steel pipe, for example, to form a neat outer appearance and to be sanitarily managed.

The upper bed 51 may be formed in a size to cover the recess 521 of the bottom bed 52 and may be formed in a plate shape. In addition, a plurality of package seats 511 may be formed in the upper bed 51 to seat the seed package 920. The package seats 511 may be formed in a shape corresponding to a shape of the seed package 920, and a plurality of package seats 511 may be subsequently disposed. Accordingly, a plurality of seed packages 90 may be disposed in the upper bed 51.

A plurality of package seats 511 may be disposed at each of a first half and a second half of the center, and may be formed in equal size. In addition, a seat opening 512 may be formed in the package seat 511. The seat opening 512 allows a portion of the seed package 90 to pass through the seat opening and to make contact with water collected in the bottom bed 52.

At least one seat opening 512 may be formed in each package seat 511, One or more seat openings 512 may be formed depending on the structure of the seed package 90. In addition, the seat opening 512 may be positioned in an area corresponding to the water collecting portion 523. When the upper bed 51 is seated in the bottom bed 52, the seat opening 512 may be positioned on the water collecting portion 523 such that the water stored in the water collecting portion 523 may be supplied to the seed package 90 through the seat opening 512.

According to an embodiment, the water collecting portion 523 may be provided to extend in a widthwise direction at the center of the bottom bed 52. Accordingly, the seat openings 512 may be formed to be positioned closely to the center of the upper bed 51 such that the seat openings 512 are positioned at an upper portion corresponding to an inner portion of the water collecting portion 523. The seat openings 512 may be variously positioned depending on an arrangement and shape of the water collecting portion 523.

A bed bracket 54 may be provided on the bottom surface of the bottom bed 52. The bed bracket 54 may be positioned at a center of the second half of the bottom bed 52. The bed bracket 54 may be positioned to cover the water sensor 526 exposed to the bottom surface of the bottom bed 52 at a lower portion. In addition, the bed bracket 54 may be fixedly mounted on the bottom cover 55.

The bottom cover 55 may be formed in a plate shape, and may be bent to have a bottom surface and a rear surface to cover the second half of the bottom bed 52 from below. In addition, the bed bracket 54 may be mounted on the bottom case 19.

The bottom cover 55 may be fixedly mounted on the inner case 140. Accordingly, the bottom cover 55 may be maintained in a fixed state even when the bed 50 is withdrawn or introduced. In addition, when the bottom bed 52 is introduced, it is possible to supply power to the water sensor 526. In contrast, when the bottom bed 52 is withdrawn, it is impossible to supply power to the water sensor 526.

Figure 19:
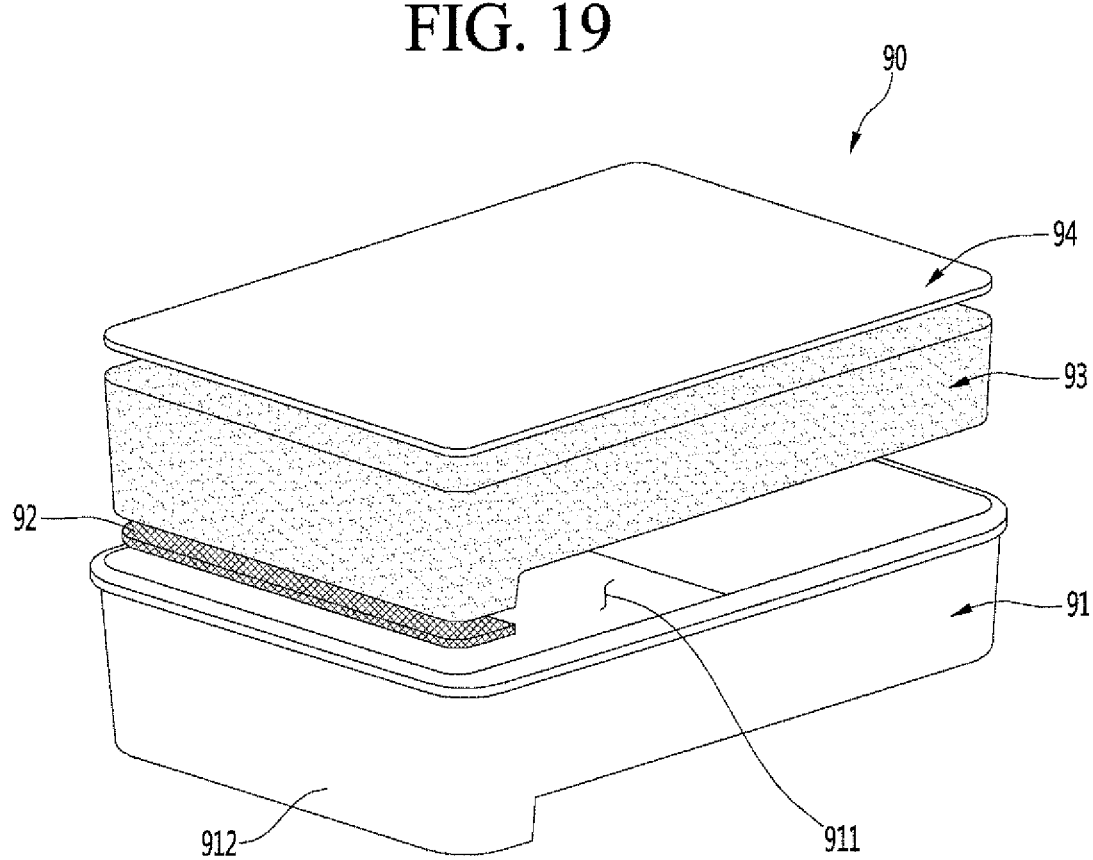
FIG. 19 is an exploded perspective view of a seed package seated on the bed according to an embodiment.
Figure 20:
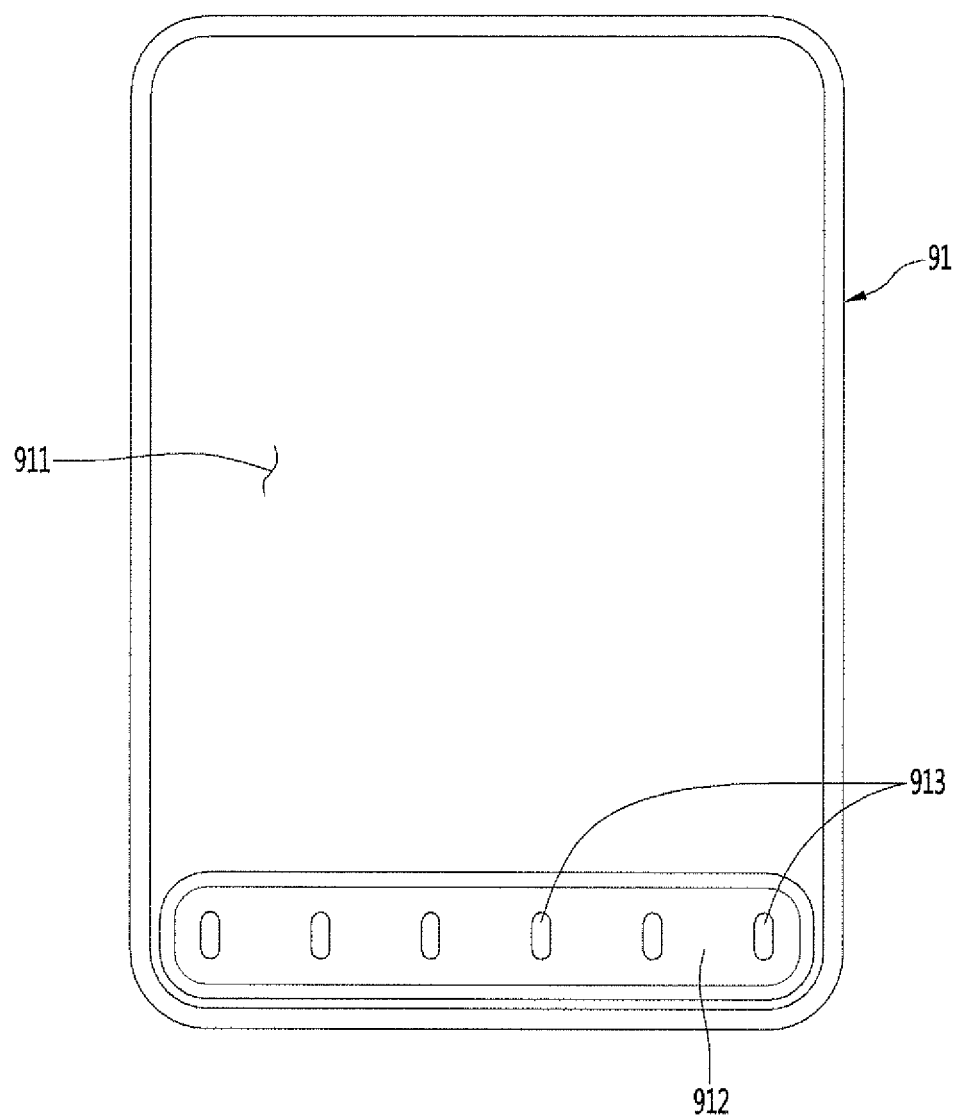
FIG. 20 is a plan view of a port which is one component of the seed package according to an embodiment.
Figure 21:
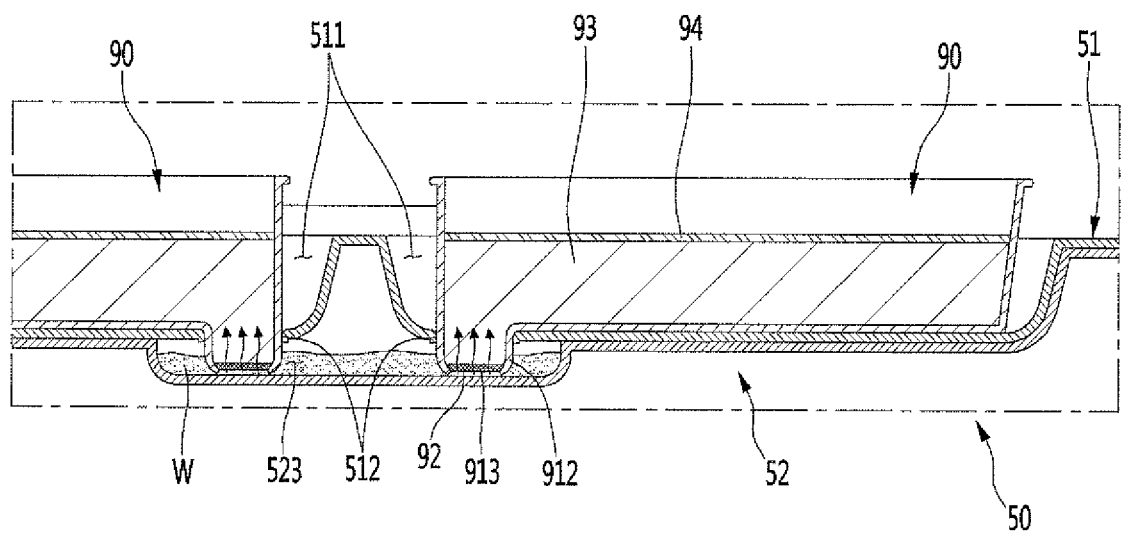
FIG. 21 is a cross sectional view illustrating the seed package seated on the bed.

FIG. 19 is an exploded perspective view of a seed package seated on the bed according to an embodiment. FIG. 20 is a plan view of a port which is one component of the seed package according to an embodiment. FIG. 21 is a cross sectional view illustrating the seed package seated on the bed.

As illustrated in the drawings, the seed package 90 seated on the upper bed 51 may include a medium 93 having a seed and a nutrient solution provided in a port 91 having a shape corresponding to the package seat 511. The seed package 90 may be configured to include a nutrient solution suitable for the plant being cultivated.

The seed package 90 may be configured according to types of plants that may be cultivated by the apparatus 1 for cultivating plants. In this case, the seed packages 90 having various types of plants have a same size and may have a size set to be received in the package seat 511. Accordingly, the user may select the seed package 90 of the plant to be cultivated and may seat the seed package 90 at a desired position on the bed 50 to start cultivating the plant.

The port 91 of the seed package 90, which is a container to form a space 911 receiving the seed and the medium, has an open top surface and has a size and shape corresponding to a size and shape of the package seat 511. In addition, a port protrusion 912 may be formed on a bottom surface of the port 91 to have a shape corresponding to the seat opening 512. The port protrusion 912 may pass through the seat opening 512 when the seed package 90 is seated in the package seat 511.

In addition, the port protrusion 912 may extend to the position in which a lower end of the port protrusion 912 makes contact with or is adjacent to the bottom surface of the water collecting portion 523. In addition, a water inlet 913 may be formed in the bottom surface of the port protrusion 912. An absorption sheet 92 may be provided inside the port protrusion 912 to absorb water. The absorption sheet 92 may be formed of various materials, such as non-woven fabric, felt, or sponge, for example, to absorb water.

Accordingly, as illustrated in FIG. 21, in a state in which the seed package 90 is seated in the package seat 511, the port protrusion 912 is positioned inside the water collecting portion 523 having water. In addition, the water in the water collecting portion 523 may be introduced through the water inlet 913 of the port protrusion 912 and may be supplied into the port 91 through the absorption sheet 92. The water supplied into the port 91 may be mixed with the nutrient solution of the medium 93, and may be supplied to the seed or the plants such that the seed or the plants are actively grown. In addition, package cover 94 may be provided on an inner top surface of the port 91, that is, a top surface of the medium 93 to protect the seed in the medium 93 and the port 91.

The medium 93 may include the nutrient solution necessary for grow the plants and may be configured such that the plants are grown at a proper speed only when water is supplied without supplying additional ingredients. In addition, the nutrient solution may be present only in a cartridge and only water supplied to the bed 50 inside the apparatus 1 for cultivating plants. Accordingly, the apparatus 1 for cultivating plants, especially, the water tank 40 and the water supply pipes 497 and 498 may be basically prevented from being contaminated due to the nutrient solution. The inner portion of the apparatus 1 for cultivating plants may be constantly maintained in a clean state due to the above structure. In addition, even under the environment that various types of plants are cultivated, proper nutrients may be supplied.

To easily seat the seed package 90 and facilitate management and harvest of the plants grown on the bed 50, the bed 50 may have a structure that the bed 50 may be introduced or withdrawn. In the procedure that the bed 50 is withdrawn, the water may be prevented from being supplied. The water has to be supplied after the water level is identified by the water sensor 526 in the state in which the bed 50 is introduced. The bed 50 may have a structure that power is selectively supplied to the water sensor 526 when the bed 50 is introduced or withdrawn.

Hereinafter, structure for supplying power to the water sensor 526 will be described in more detail with reference to accompanying drawings.

Figure 22:
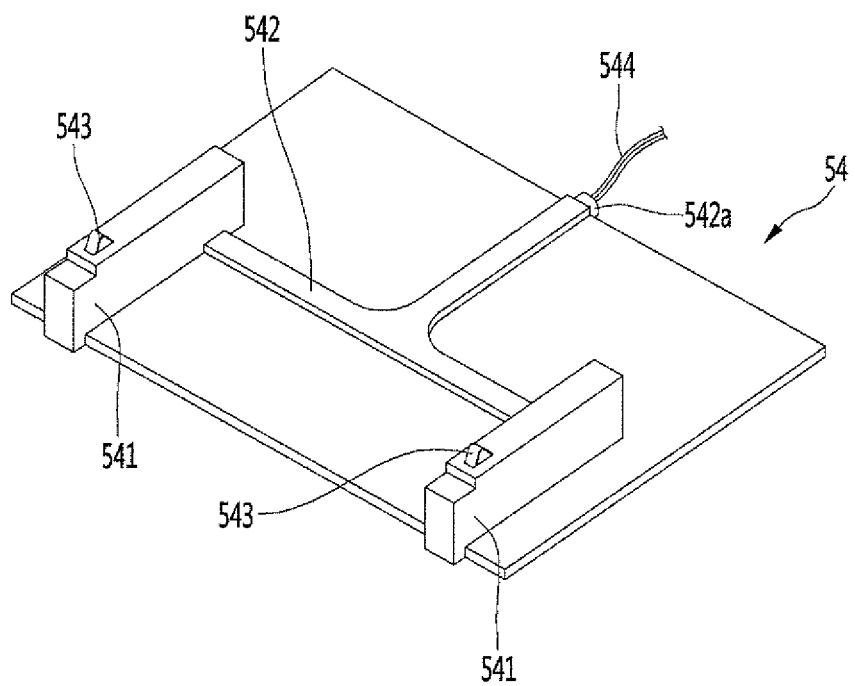
FIG. 22 is a perspective view illustrating a bed bracket which is one component of the bed according to an embodiment.
Figure 23:
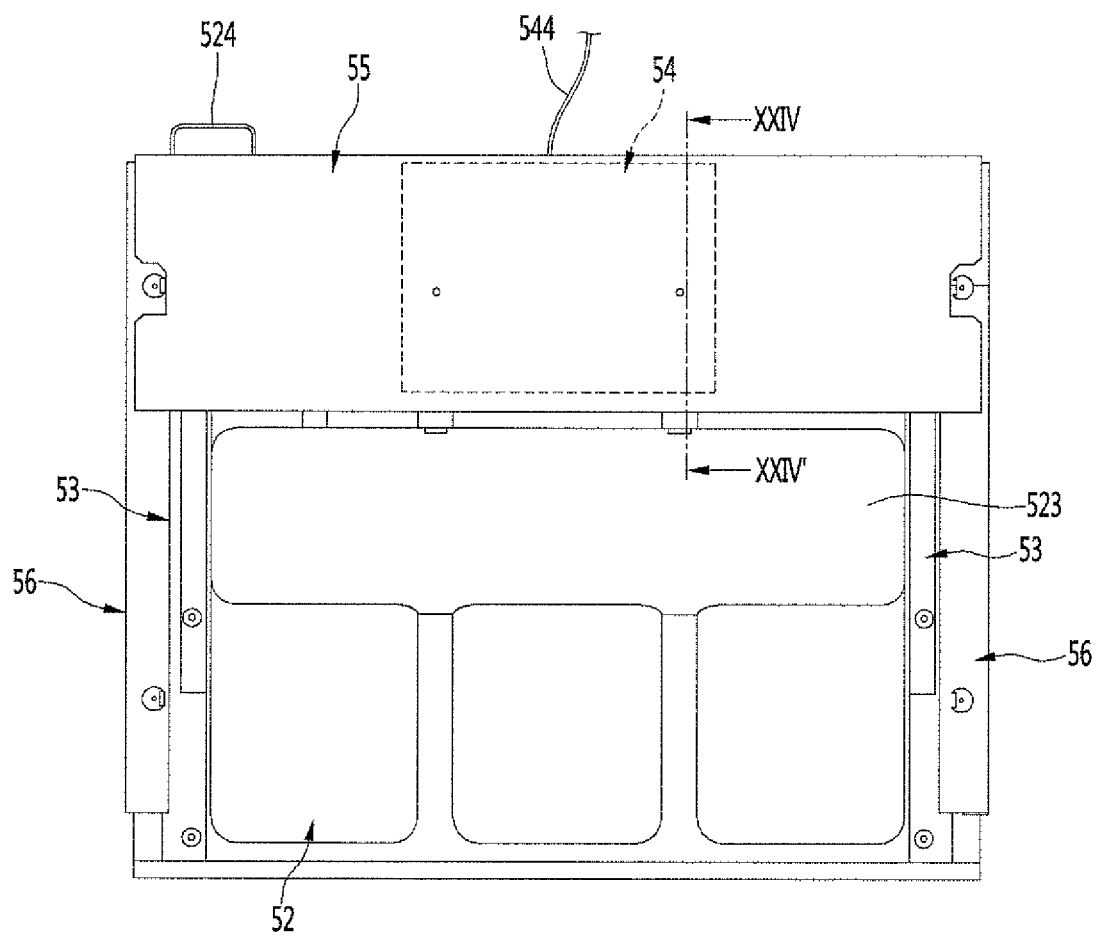
FIG. 23 is a bottom view of the bed when the bed is viewed from the bottom.
Figure 24:
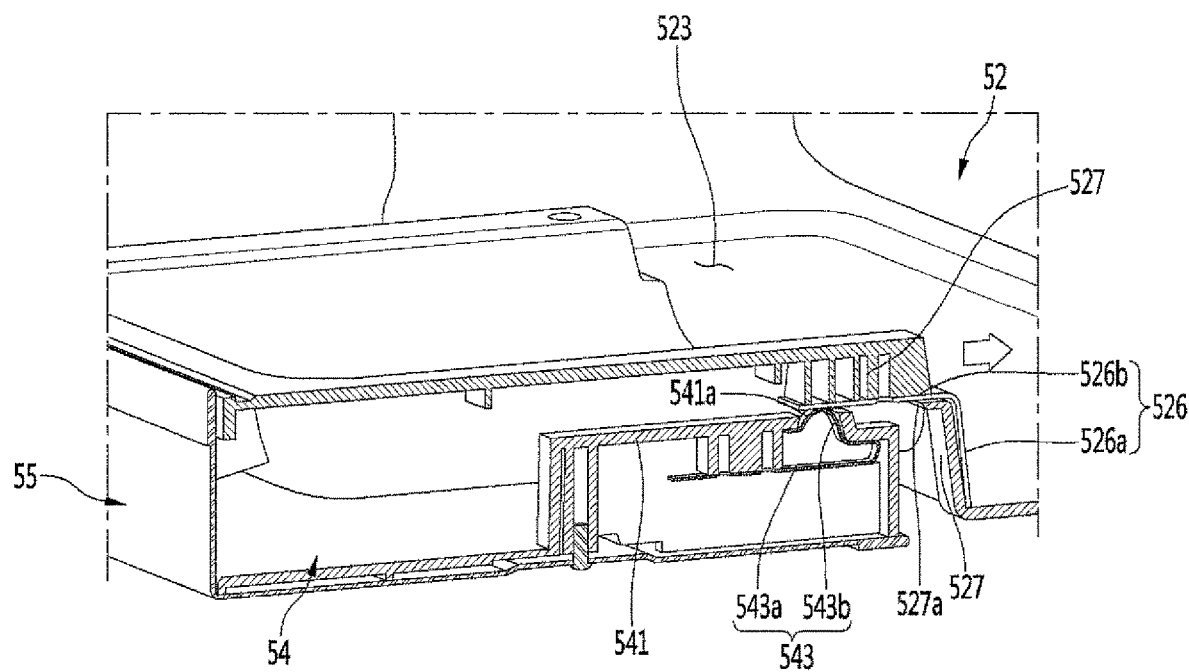
FIG. 24 is a cut-at perspective view of a portion of FIG. 23, taken along line XXIV-XXIV.
Figure 25:
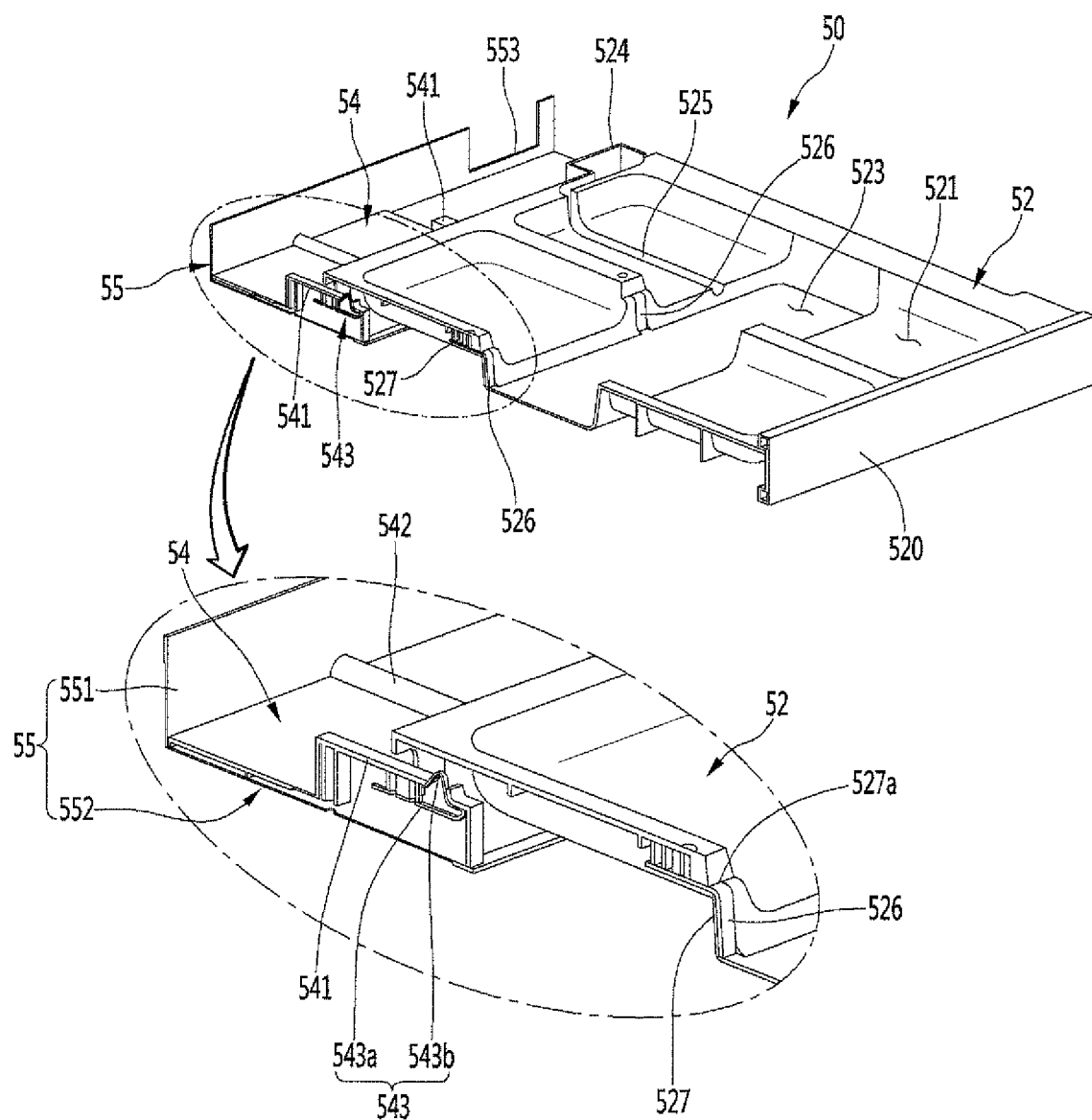
FIG. 25 is a cut-out perspective view illustrating the bottom bed is withdrawn.

FIG. 22 is a perspective view illustrating a bed bracket which is one component of the bed according to an embodiment. FIG. 23 is a bottom view of the bed when the bed is viewed from the bottom. FIG. 24 is a cut-out perspective view of a portion of FIG. 23, taken along line XXIV-XXIV. FIG. 25 is a cut-out perspective view illustrating the bottom bed is withdrawn.

As illustrated in the drawings, the bed 50 has the structure of being introduced or withdrawn through the introduction/withdrawal guide 56 disposed at opposite side portions of the bed 50, in a state in which the bed 50 is disposed in the apparatus 1 for cultivating plants. In this case, the bottom cover 55 which forms the bottom surface of the rear portion of the bed 50 and the bed bracket 54 coupled to the bottom cover 55 are maintained in a state of being fixedly mounted on the inside of the cultivating space 11, and the bottom bed 52 and the upper bed 51 seated in the bottom bed 52 are introduced or withdrawn.

When the bottom bed 52 moves back and forth, the water sensor 526 may be selectively connected to or disconnected from a power terminal 543 of the bed bracket 54. Accordingly, in a state in which the bottom bed 52 is completely introduced, power is supplied to the water sensor 526 such that sensing of water is activated. In contrast, in a state which the bottom bed 52 is withdrawn, it is impossible to supply power. As described above, water may be supplied to the bottom bed 52 depending on a state of the water sensor 526 and a sensing state of water by the water sensor 526.

The bottom cover 55 may be formed in a shape of a plate including a metal material, corresponding to a width of the bed 50, and opposite end portions of the bottom case 55 may be fixedly mounted on the inner case 140. In addition, the bottom cover 55 may cover a portion of the bottom surface and the rear surface of the bottom bed 52 in a state in which the bottom cover 55 is mounted. The bottom cover 55 may include a bottom surface 552 vertically bent and a rear surface 551. The bottom surface 552 may cover the rear portion of the bottom surface of the bottom bed 52 and the rear surface 551 may cover the rear surface of the bottom bed 52.

The rear surface 551, which extends bi-directionally, may extend to the lower end portion of the blower assembly 80 positioned at an upper portion thereof. The extending upper end portion of the rear surface 551 may be slightly spaced apart from a lower end portion of the blower assembly 80. Flowing air is directed toward an inside of the blower assembly 80 beyond the upper end portion of the rear surface 551 and the lower end portion of the blower assembly 80. In addition, the rear surface 551 may cover the evaporator 31 disposed at a rear portion thereof such that the evaporator 31 is not exposed to the outside in a state in which the bottom bed 52 is withdrawn. The rear surface 551 may be disposed adjacent to the lower end portion of the blower assembly 80 to prevent the evaporator 31 from being exposed to the outside. The rear surface 551 may cover the water supply pipes 497 and 498 provided on the rear surface of the cultivating space 11 and another component, such as the water supply pipe holder 48 provided in the inner rear plate 146 such that the components are not exposed to the outside.

A rear surface opening 553 may be formed in one side of the rear surface 551 corresponding to the water supply portion 524. The rear surface opening 553 may have a size corresponding to the water supply portion 524. When the bed 50 is introduced, the water supply portion 524 may be inserted to pass through the rear surface opening 553. The actual supplying of water to the water supply portion 524 may be performed in a rear space of the rear surface 551. Accordingly, the water supply pipes 497 and 498 may be prevented from being exposed and the water supplied to the bed 50 may be prevented from being scattered around the bed 50.

The bottom surface 552 may extend from the rear end portion of the bottom bed 52 to the water collecting portion 523 and may extend to a position to cover a portion of the water sensor 526. The bed bracket 54 may be provided on the bottom surface 552. The bed bracket 54 may be positioned between the bottom bed 52 and the bottom cover 55 and may have a power terminal selectively contacting the water sensor 526.

The bed bracket 54 may be formed, for example, by injection molding with a plastic material, may be formed in a plate shape, and may be mounted at a center of the bottom surface 552 of the bottom cover 55. A top surface of the bed bracket 54 may be disposed to face a bottom surface of the bottom bed 52.

A pair of terminal mounts 541 protruding upward from opposite sides of the top surface of the bed bracket 54 may be positioned at positions corresponding to horizontally extending portions 526*b*. That is, the terminal mount 541 may be positioned vertically below the horizontally extending portion 526*b* in a state which the bottom bed 52 is introduced. The terminal mount 541 may longitudinally extend in the frontward-backward direction.

A terminal hole 541*a* may be formed in a top surface of the terminal mount 541 and a portion of the power terminal 543 may be exposed through the terminal hole 541*a*. The power terminal 543 may be fixedly mounted in an internal space of the terminal mount 541. The power terminal 543 may include a contact 543*b* bent to be inclined forward and backward and a fixing portion 543*a* extending from one side of the contact 543*b* and fixed to the inside of the terminal mount 541. The fixing portion 543*a* may be fixed to the terminal mount 541 by, for example, a screw fastened at a lower portion thereof and the contact 543*b* may be configured to protrude to the outside through the terminal hole 541*a*. The end portion of the fixing portion 543*a* may be connected with electric wire 544 introduced into the terminal mount 541 to supply power.

A wire guide 542 may be interposed between a pair of the terminal mounts 541. The wire guide 542 may be recessed in the bottom surface of the bed bracket 54 and provides a space in which the electric wire 544 may be received when the bed bracket 54 is coupled to the bottom cover 55. In addition, the wire guide 542 may connect both terminal mounts 541 and be configured to extend from the center of the bed bracket 54 to the rear end portion of the bed bracket 54. Therefore, electric wires 544 connected to power terminals 543 disposed on both sides may extend to the rear end portion of the bed bracket 54 along the wire guide 542.

The rear end portion of the wire guide 542 may further protrude to form a wire outlet 542*a*. When the bed bracket 54 is mounted on the bottom cover 55, the wire outlet 42*a* may pass through the rear surface 551, and the electric wires 544 may be connected with connectors 111, 112, and 113 on a rear wall surface of the cultivating space 11 without being exposed to the outside.

In the state in which the bottom bed 52 is completely introduced, the water sensor 526 may be in contact with the power terminal 543 as illustrated in FIG. 24. In this case, the horizontally extending portion 526*b* of the water sensor 526 makes contact with the contact 543*b* of the power terminal 543. The contact 543*b* may be maintained in contact with the water sensor 526 in the state in which the contact 543*b* is pressed.

In this state, power may be supplied to the water sensor 526, and operation of the water sensor 526 may be activated. Accordingly, when the water is stored in the water collecting portion 523, the water sensors 526 at opposite sides may be electrically conducted to prevent the pump 494 from operating. In contrast, when the water is absent in the water collecting portion 523 in the state in which the power is supplied to the water sensor 526, the water sensors 526 at opposite sides are electrically not conducted, and thus, the pump 494 and the water supply valve 496 are driven, so water may be supplied to the bed 50.

In addition, as illustrated in FIG. 25, when a user withdraws the bed 50, the bottom bed 52 is withdrawn in the state in which the bed bracket 54 and the bottom cover 55 are fixed. At the moment when the bottom bed 52 is withdrawn, the power terminal 543 and the water sensor 526 are separated from each other, and power supply to the water sensor 526 is cut off. In other words, the power supply to the water sensor 526 is stopped from the moment when the bottom bed 52 is withdrawn. In this state, the pump 494 and the water supply valve 496 are forcibly stopped so as not to operate. When the pump 494 is driven or the water supply valve 496 is opened in the state in which the bed 50 is withdrawn, water supplied through the water supply pipes 497 and 498 may not be supplied to the bed 50, but spilled. As described above, operation of the pump 494 or the water supply valve 496 may be prevented by sensing the withdrawn state of the bed 50.

An additional electric wire is not placed in the bottom bed 52 in which the water sensor 526 is provided, but rather, the electric wire 544 is placed in the fixed bottom cover 55, thereby preventing the electric wires 544 from interfering with each other when the bottom bed 52 is introduced or withdrawn, and smoothly introducing or withdrawing the bottom bed 52.

Opposite end portions of the bed 50 may be supported by the introduction/withdrawal guides 56 provided on opposite side surfaces inside the cabinet 10, and the bottom bed 52 may slide along the introduction/withdrawal guides 56 such that the introduction or the withdrawal of the bottom bed 52 may be guided. Hereinafter, structure of the guide and the introduction and withdrawal structure of the bed 50 will be described with reference to the drawings.

Figure 26:
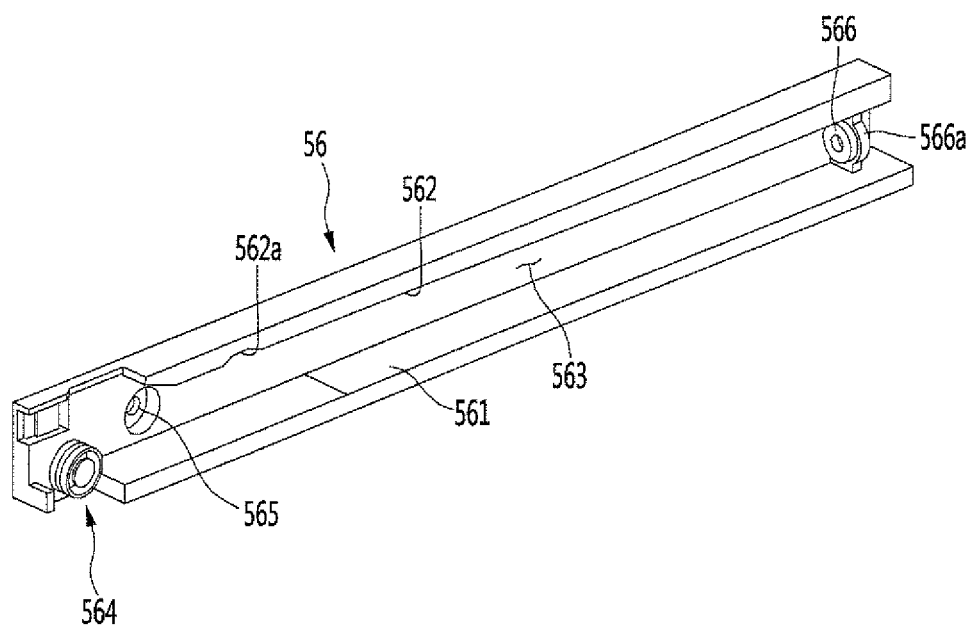
FIG. 26 is a perspective view of an introduction/withdrawal guide for introducing or withdrawing the bed according to an embodiment.
Figure 27:
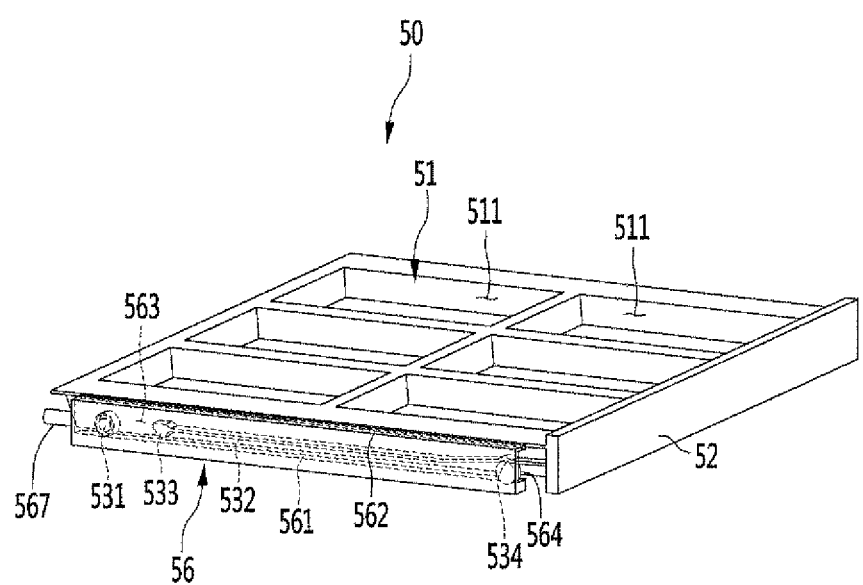
FIG. 27 is a view illustrating that the bed is introduced.
Figure 28:
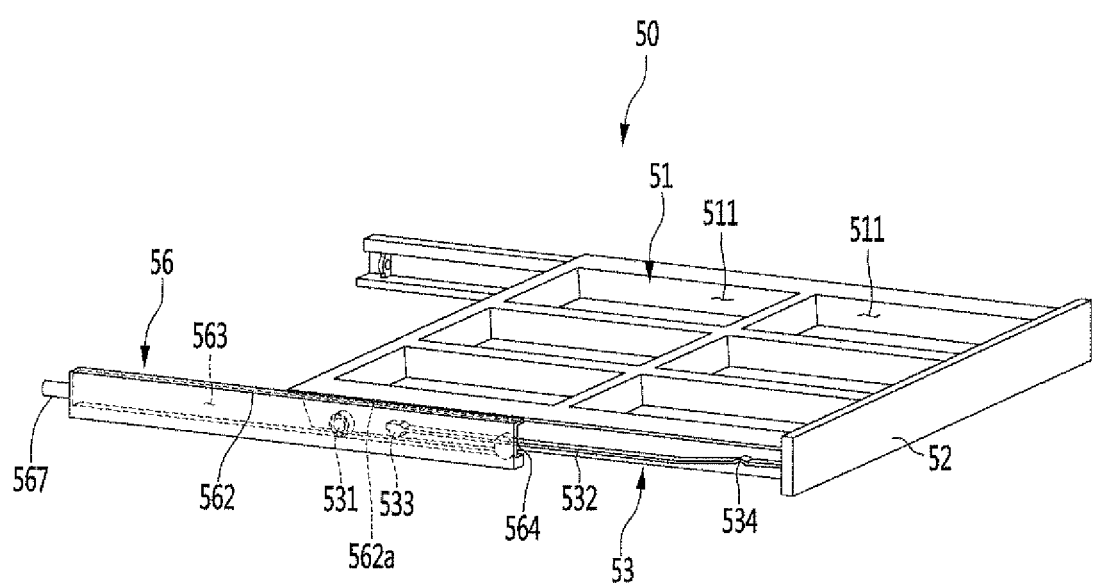
FIG. 28 is a view illustrating that the bed is withdrawn.

FIG. 26 is a perspective view of the introduction/withdrawal guide for introducing or withdrawing the bed according to an embodiment. FIG. 27 is a view illustrating that the bed is introduced. FIG. 28 is a view illustrating that the bed is withdrawn.

As illustrated in the drawings, a pair of introduction/withdrawal guides 56 may be provided at opposite side portions of the cabinet 10 to support opposite end portions of the bed 50. The introduction/withdrawal guides 56 may have the same structure and face each other. The introduction/withdrawal guide 56 may longitudinally extend in the frontward-rearward direction such that the bed 50 has a predetermined withdrawal distance.

A guide groove 563 may be recessed in the introduction/withdrawal guide 56 while extending in the frontward-rearward direction. The guide groove 563 may receive a bed roller 531 mounted on a rear end portion of the bed side 53. The guide groove 563 may extend from the front end portion to the rear end portion of the introduction/withdrawal guide 56 such that the bed roller 531 moves along the guide groove 563. In this case, the bed roller 531 may move by rotating while making contact with an inner top surface 562 of the guide groove 563 and an inner bottom surface 561 of the guide groove 563.

The top surface 562 of the front end portion of the guide groove 563 may be inclined downward. Accordingly, when the bottom bed 52 is separated and assembled, the bed roller 531 may be easily inserted. In addition, a withdrawal groove 562a may be formed in one side of the top surface 562 of the guide groove 563. The withdrawal groove 562a may receive a portion of the bed roller 531 when the bottom bed 52 is withdrawn by a set or predetermined distance. Accordingly, when the bottom bed 52 is withdrawn by the set or predetermined distance for facilitating work, the guide roller 564 may be received in the withdrawal groove 562a. In such a state, as the bottom bed 52 is not easily moved in the frontward-rearward direction, but maintained in the withdrawn state by the set distance, a user may easily carry out jobs such as seating the seed package 90 or harvesting the plants.

A rear stopper 566a may protrude from the rear end portion of the guide groove 563. When the bottom bed 52 is completely introduced, the rear stopper 566a supports the bed roller 531 such that the bed roller 531 does not move further rearward any more. A buffer 566, which may be formed of an elastic material, such as rubber or urethane, may be mounted on the rear stopper 566a to reduce impact when making contact with the bed roller 531.

The introduction/withdrawal guide 56 may be formed at the rear end portion thereof with a guide protrusion 567 to protrude rearward, be inserted into an inner wall surface of the cultivating space 11, and be restricted. In addition, the guide groove 563 may be formed in the inner side surface thereof with a screw hole 565 coupled to a screw to fix the introduction/withdrawal guide 56. Accordingly, the introduction/withdrawal guide 56 may be firmly fixed and mounted to the sidewall of the cultivating space 11 through the guide protrusion 567 and the coupling of the screw.

The guide roller 564 may be provided on the front end portion of the introduction/withdrawal guide 56. The guide roller 564 may be positioned at a slightly lower portion from a center of the introduction/withdrawal guide 56 in a vertical direction, and may make contact with side rib 532 formed on the bed side 53 such that the bottom bed 52 may be more smoothly introduced or withdrawn.

The bed rollers 531 and the side ribs 532 may be formed on both side surfaces of the bottom bed 52, that is, the bed side 53. The bed roller 531 may be rotatably mounted at the rear end portion of the bed side 53 and rotated in a state of being received in the guide groove 563 to smoothly withdraw the bottom bed 52.

The side ribs 532 may extend from a front of the bed roller 531 to a front end portion of the bed side 53. The side ribs 532 may protrude in a sideways or lateral direction from upper and lower central portions of the bed side 53 and allow the guide roller 564 to make contact with the bottom surface of the side ribs 532 to roll.

In other words, as illustrated in FIG. 28, the bed roller 531 may contact the guide groove 563 and the guide roller 564 may contact the side rib 532 when the bottom bed 52 is withdrawn. Therefore, the bottom bed 52 may be withdrawn while maintaining a stable supported state without sagging or vertical flowing when the bottom bed 52 is withdrawn.

A rear restricting portion 533 formed to be inclined downward may be formed at a rear end of the side rib 532. The rear restricting portion 533 may interfere with the guide roller 564 when the bottom bed 52 is completely withdrawn, such that the bottom bed 52 is not easily released.

An introduction groove 534 may be formed in the first half of the side rib 532. The introduction groove 534 may be formed at a position corresponding to the guide roller 564 in a state that the bottom bed 52 is completely introduced.

The introduction groove 534 may be formed to partially receive an upper portion of the guide roller 564. Accordingly, as illustrated in FIG. 27, the guide roller 564 is received in the introduction groove 534 in the state in which the bottom bed 52 is completely introduced. Accordingly, the bottom bed 52 may not be arbitrarily withdrawn, but maintained in the introduced state.

Through the above structure, the bottom bed 52 may stably maintain the introduction state and the withdrawal state, and may be prevented from moving due to external vibration or impact. In addition, when the user introduces or withdraws the bottom bed 52, the user may smoothly introduce or withdraw the bottom bed 52 by the bed roller 531 and the guide roller 564.

The light assembly 60 to irradiate light toward the bed 50 may be mounted above the bed 50. Hereinafter, structure and a mounting structure of the light assembly 60 will be described with reference to the drawings.

Figure 29:
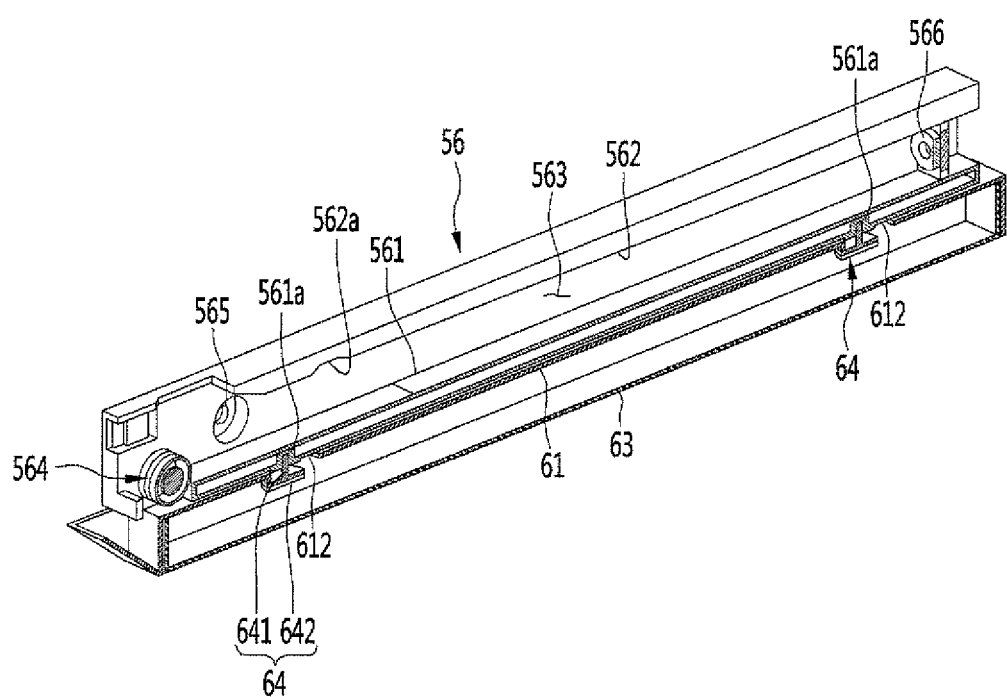
FIG. 29 is a sectional view illustrating a state in which a light assembly is mounted on the introduction/withdrawal guide.
Figure 30:
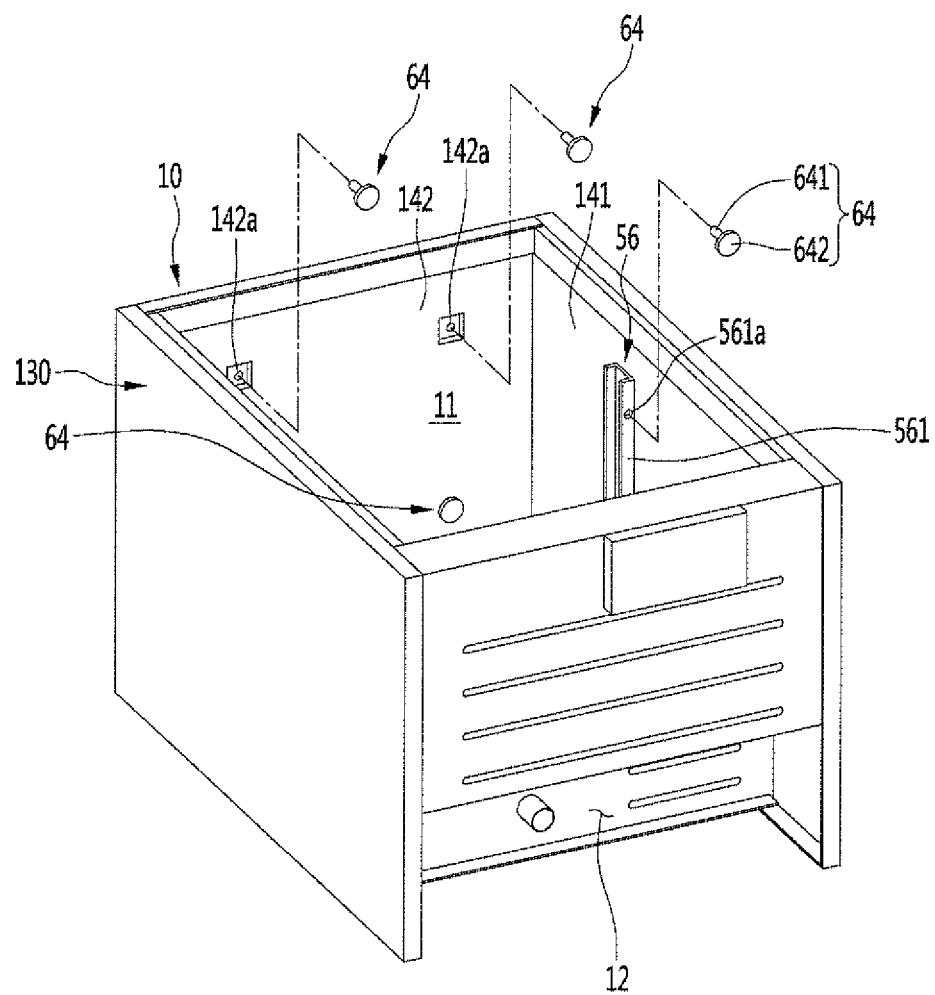
FIG. 30 is a view illustrating a coupling structure of a light mount to mount the light assembly according to an embodiment.

FIG. 29 is a sectional view illustrating a state in which a light assembly is mounted on the introduction/withdrawal guide. FIG. 30 is a view illustrating a coupling structure of a light mount to mount the light assembly according to an embodiment.

The light assembly 60 may be disposed above the bed 50 and may irradiate light upward from the bed 50. In addition, the light assembly 60 may minimize loss of the cultivating space 11 and may have an arrangement structure representing higher space utilization.

The light assembly 60 may be disposed at a top surface of the cultivating space 11 and a bottom surface of the bed 50 disposed above. In particular, the light assembly 60 may have the same structure regardless of a mounting position. Therefore, both the light assembly 60 disposed above the bed 50 and the light assembly 60 disposed below the bed 50 may have the same mounting structure.

Hereinafter, description will be made with reference to the drawings. The light assembly 60 may be mounted on the inner surface of the cabinet 10 and the introduction/withdrawal guide 56 by a light mount 64. In other words, light assemblies 60 may be mounted at various positions inside the cultivating space 11 using the same light mount 64.

The cabinet 10 may be formed in a top surface thereof with a cabinet coupling hole 142a to mount the light mount 64, and the introduction/withdrawal guide 56 may be formed therein with a guide coupling hole 561a. The cabinet coupling hole 142a and the guide coupling hole 561a may have a same shape except for the positions thereof, so the light mounts 64 having the same structure may be mounted in the cabinet coupling hole 142a and the guide coupling hole 561a.

The cabinet coupling hole 142a may be formed in the inner upper plate 142 defining the top surface of the cultivating space 11. The cabinet coupling holes 142a may be provided in a first half and a second half and left and right or lateral sides of the cultivating space 11, and four cabinet coupling holes 142a may be formed to stably fix four corners of a top surface of the light assembly 60.

The light mount 64 may include a mount coupling portion 641 engaged with the cabinet coupling hole 142a or the guide coupling hole 561a and a mount head 642 to restrict the light mount 64.

The mount coupling portion 641 may be formed in a shape of a thread and coupled to the cabinet coupling hole 142a or the guide coupling hole 561a in a screw scheme to firmly mount the light assembly 60. In addition, the mount coupling portion 641 may have a length longer than a depth of the cabinet coupling hole 142a or the guide coupling hole 561a.

The mount head 642 may be formed at a lower end portion of the mount coupling portion 641 and may be formed in a shape of a disc having a predetermined size. The mount head 642 may be formed corresponding to a size of an insertion portion 612a of a case restricting hole 612 formed in the top surface of the light assembly 60. Accordingly, the mount head 642 may be inserted into the case restricting hole 612 when the light assembly 60 is mounted.

In a state in which the light mount 64 is coupled to the inner surface of the cabinet 10 or the introduction/withdrawal guide 56, the mount head 642 may be spaced apart from the inner upper plate 142 and the introduction/withdrawal guide 56 by a set or predetermined distance. The set or predetermined distance may be formed corresponding to a thickness of the light case 61 forming a top surface of the light assembly 60.

The case restricting hole 612 formed in the top surface of the light case 61 may include the insertion portion 612a and a restriction portion 612b. The insertion portion 612a is formed in size equal to or slightly larger than the mount head 642 such that the light assembly 60 is inserted into the insertion portion 612a.

Figure 31:
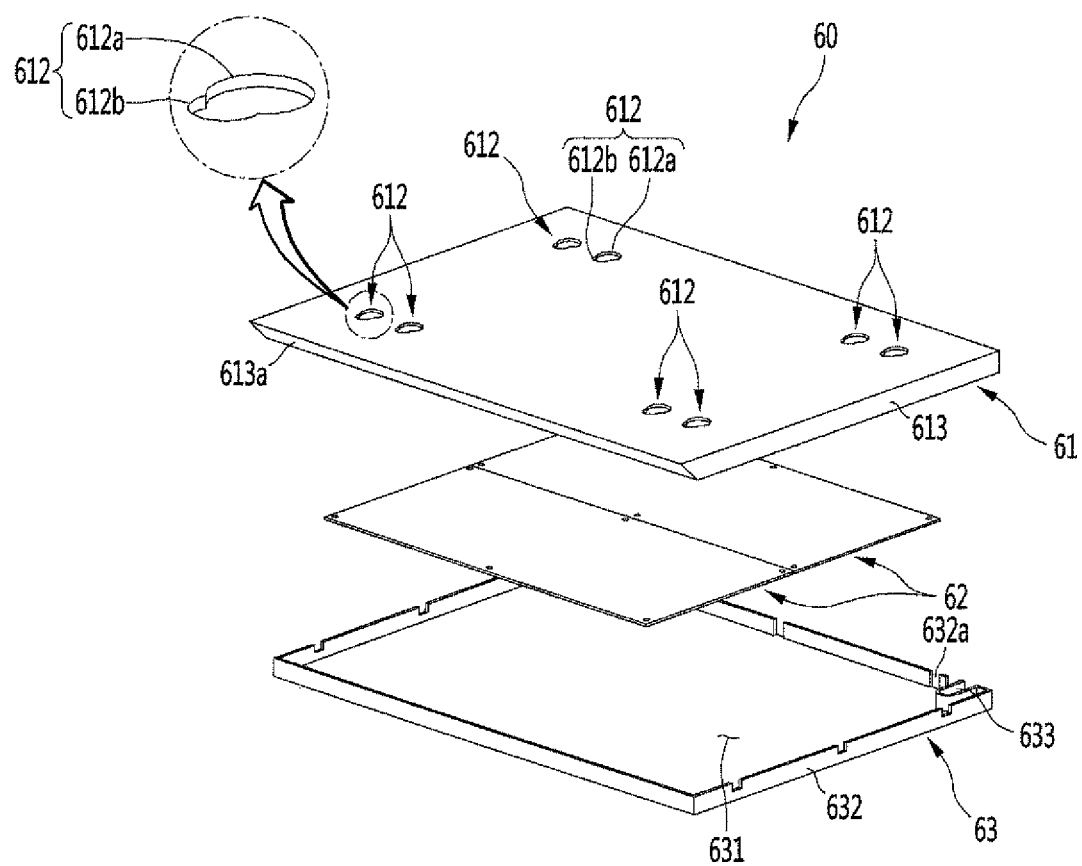
FIG. 31 is an exploded perspective view of the light assembly when viewed above.

The restriction portion 612b may be formed in the shape of more being further recessed forward from the front end portion of the insertion portion 612a as illustrated in FIG. 31. The restriction portion 612b may be formed in size slightly larger than a sectional surface of the mount coupling portion 641 and smaller than a size of the insertion portion 612a.

Accordingly, when the light case 61 is moved rearward in a state in which the mount head 642 is inserted into the insertion portion 612a, the mount coupling portion 641 may be inserted into the restriction portion 612b. In this case, the mount head 642 restricts a circumference of the restriction portion 612b. In other words, as illustrated in FIG. 29, the circumference of the restriction portion 612b may be inserted into the space between the mount head 642 and the introduction/withdrawal guide 56 and restricted. In contrast, when the light case 61 is moved forward in the state in which the light case 61 is mounted, the mount head 642 is moved toward the insertion portion 612a so it is possible to separate the light assembly 60.

The guide coupling holes 561a may be formed in a first half and a second half of the bottom surface of the introduction/withdrawal guide 56. As the introduction/withdrawal guides 56 are provided at the lateral sides of the cultivating space 11, four light mounts 64 may be provided to fix four corners of the top surface of the light assembly 60.

As described above, the light mounts 64 having the same structure are mounted on the inner upper plate 142 and the introduction/withdrawal guide 56, respectively, so the light assemblies 60 having the same structure may be mounted regardless of mounting positions thereof. In other words, the light assemblies 60 having a single structure may be mounted at various positions.

The introduction/withdrawal guide 56 may be further provided depending on the number of the beds 50 disposed in the cultivating space 11. Even if a plurality of introduction/withdrawal guides 56 is vertically disposed, the light mounts 64 are mounted in the respective introduction/withdrawal guides 56 such that the light assembly 60 is mounted.

The light assembly 60 may include the light case 61 formed therein with a receiving space 611 and fixedly mounted by the light mount 64, a light emitting device (LED) module 62 inside the light case 61, and a light cover 63 to cover the light case 61.

Hereinafter, structure of the light assembly 60 will be described with reference to accompanying drawings.

Figure 32:
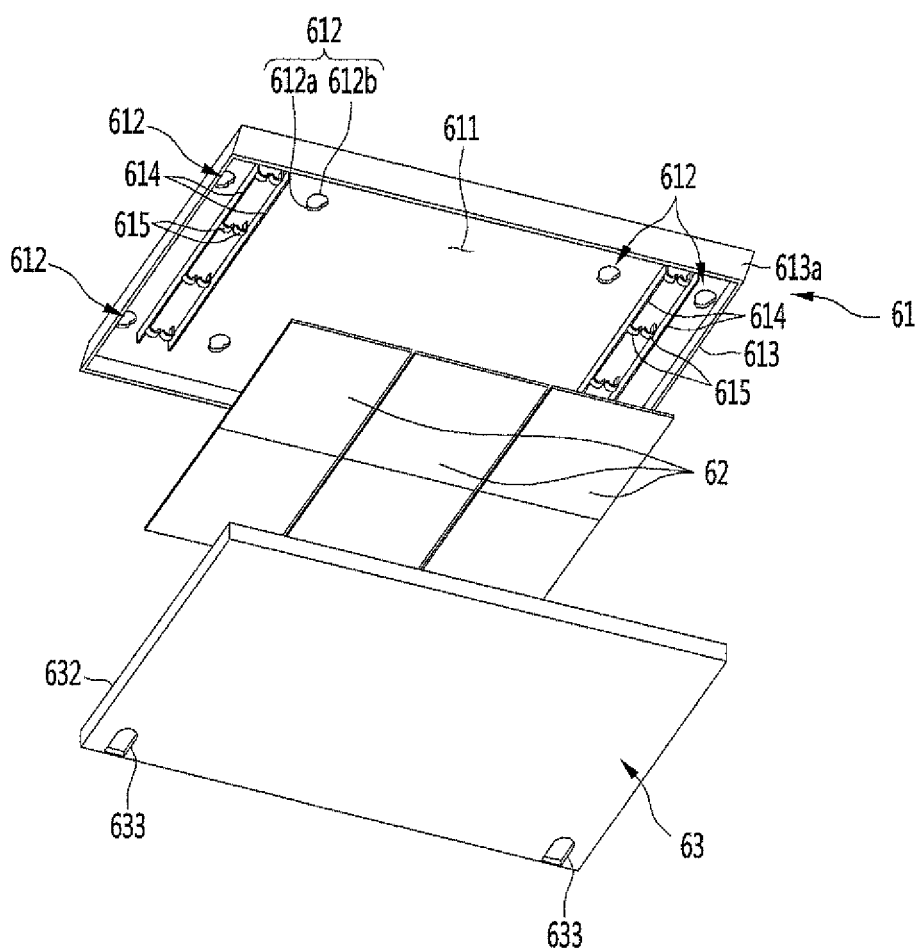
FIG. 32 is an exploded perspective view of the light assembly when viewed below.

FIG. 31 is an exploded perspective view of the light assembly when viewed the light assembly from the top. FIG. 32 is an exploded perspective view of the light assembly when viewed from the bottom.

As illustrated in the drawings, the light assembly 60 may have a size corresponding to the top surface of the cultivating space 11 or the bed 50. Accordingly, the light assembly 60 may uniformly irradiate light to an entire area of the bed 50 disposed below.

The light assembly 60 may include the light case 61 having an open bottom surface and receiving the LED module 62 therein. The light case 61 may include a frame 613 formed in a shape of a rectangular plate shape and extending downward along the circumference of the light case 61. A front surface 613*a* of the frame 613 may be inclined. Accordingly, when the user opens the door 20, exposure of the light assembly 60 may be minimized.

The light cover 63 may include in the top surface thereof with a plurality of case restricting holes 612. The case restriction holes 612, which may be coupled to the light mount 64, may be formed at four corners of the top surface of the light cover 63. In addition, when positions of the light mounts 64 coupled to the introduction/withdrawal guide 56 and the inner upper plate 142 are different from each other, case restriction holes 612 may be further formed at corresponding positions for the coupling of all light mounts 64. Accordingly, as illustrated in FIG. 31, eight case restriction holes may be formed. In addition, when positions of the light mounts 64 are the same, four case restriction holes 612 may be formed.

The case restricting hole 612 may include the insertion portion 612*a* formed in a size corresponding to the mount head 642 and the restriction portion 612*b* formed to be more recessed in front of the insertion portion 612*a*. In this case, the restriction portion 612*b* may be formed to be greater than a thickness of the mount coupling portion 641 and to be less than a size of the mount head 642.

Accordingly, the light case 61 may be moved in the frontward-rearward direction in a state in which the mount head 642 is inserted into the insertion portion 612*a*, so the light assembly 60 may be mounted or separated.

Wire guide ribs 614 may be formed at opposite sides under the light cover 63 to guide wires connected with the LED module 62. The wire guide rib 614 longitudinally extends in the frontward-rearward direction and a pair of wire guide ribs 614 may be disposed at each of lateral sides. The pair of the wire guide ribs 614 may be spaced apart from each other, and a plurality of wire coupling portions 615 may be formed in the space between the wire guide ribs 614.

The wire guide ribs 614 and the wire coupling portions 615 may be disposed at opposite side portions and be prevented from interfering with the LED module 62 when the LED module 62 is mounted. In addition, the wire guide ribs 614 and the wire coupling portions 615 may be interposed between the case restriction holes 612, and thus, be prevented from interfering with the light assembly 60 when the light assembly 60 is mounted.

The wire coupling portion 615 may press and restrict the wires guided along the wire guide ribs 614, and be formed in a substantially ring shape to simultaneously surround a plurality of wires. The wire coupling portions 615 may be disposed in directions of facing each other at lateral sides. A plurality of wire coupling portions 614 may be formed at regular distances along the wire guide rib 614.

The LED module 62 may be mounted on the light case 61. The LED module 62 may be configured such that a plurality of LEDs is mounted on a substrate. The plurality of LEDs may be continuously arranged on the substrate at regular distances. The LED may be configured to have a light quantity (wavelength) similar to sunlight, and may be configured to irradiate light of a color that may promote photosynthesis of the plant.

The LED module 62 may include a plurality of LED modules. For example, the LED module 62 may be arranged in the frontward-rearward direction as illustrated in FIG. 31, or a plurality of the LED modules 62 may be continuously arranged in a lateral direction as illustrated in FIG. 32. In this case, the plurality of LED modules 62 may be configured to provide different outputs, or may be configured to emit light of different outputs or different wavelengths depending on positions of the cultivated plants.

For example, the plants arranged at lateral sides of the bed 50 may receive less light as compared to the plants at a center of the bed 50. Accordingly, outputs of the LED modules 62 disposed at lateral sides may be made higher than the outputs of the LED module 62 at the center, so that the plants of the entire bed may uniformly receive light. If necessary, spacing between or arrangement of the LEDs mounted on the substrate may be adjusted to uniformly irradiate light to all of the beds 50.

The light cover 63 may be provided on the open bottom surface of the light case 61. The light cover 63 may be configured to be mounted on the light case 61 to cover the open bottom surface of the light case 61 and to protect the LED module 62 disposed inside. The light cover 63 may be formed of a transparent material such that light may be transmitted, and a coating or a surface treatment for diffusing light may be added to the bottom surface of the light cover 63.

A frame 632 may be formed around a bottom surface of the light cover 63 to provide a space 631 in which the LED module 62 is received inside the frame 632. The frame 632 may be coupled to the light case 61 such that an inner portion of the light case 61 is air tight. A wire outlet 632*a* may be formed on a rear surface of the light cover 63. The wire outlet 632*a*, which may serve as a passage for introducing or withdrawing internal wires of the light case 61, may be configured to be open rearward and to be directed to connectors 111, 112, and 113 on the rear wall surface of the cultivating space 11 such that the introduced or withdrawn wires are not exposed.

A blower assembly mount 633 on which the blower assembly 80 may be mounted may be formed on opposite sides of a rear end of the light cover 63. The blower assembly mount 633 may be recessed such that a blower bracket 816 provided at opposite sides of an upper end portion of the blower assembly 80 may be inserted.

The display assembly 70 may be provided inside the cultivating space 11, and an operation state of the apparatus 1 for cultivating the plants may be displayed to the outside through the display assembly 70. Hereinafter, the display assembly 70 will be described with reference to the drawings.

Figure 33:
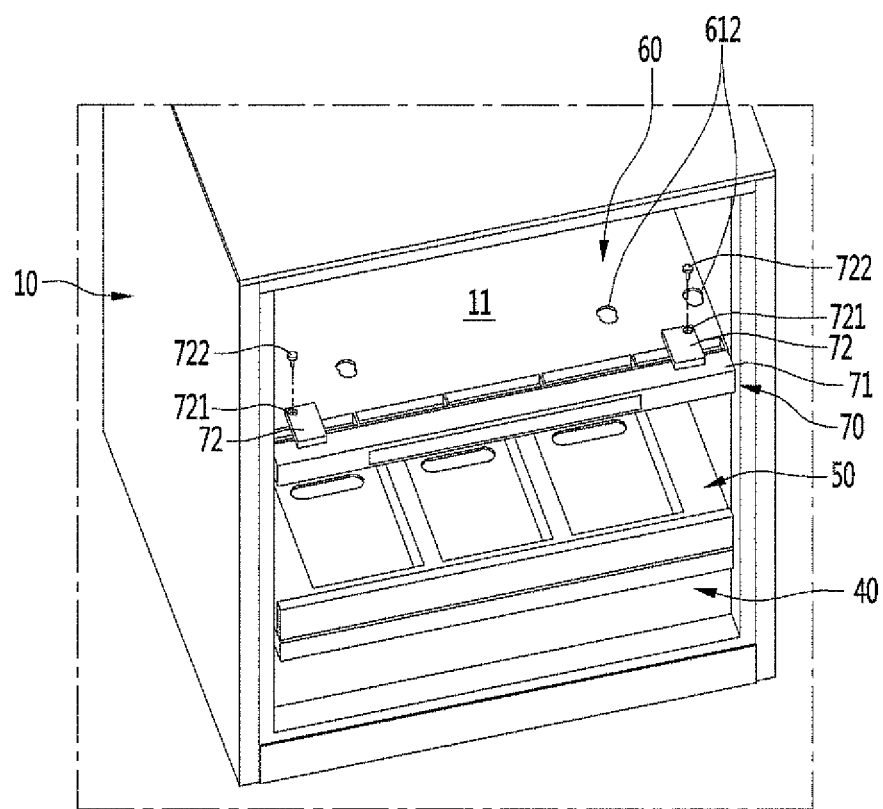
FIG. 33 is a view illustrating the state in which a display assembly, which is one component of the apparatus for cultivating plants according to an embodiment, is mounted.
Figure 34:
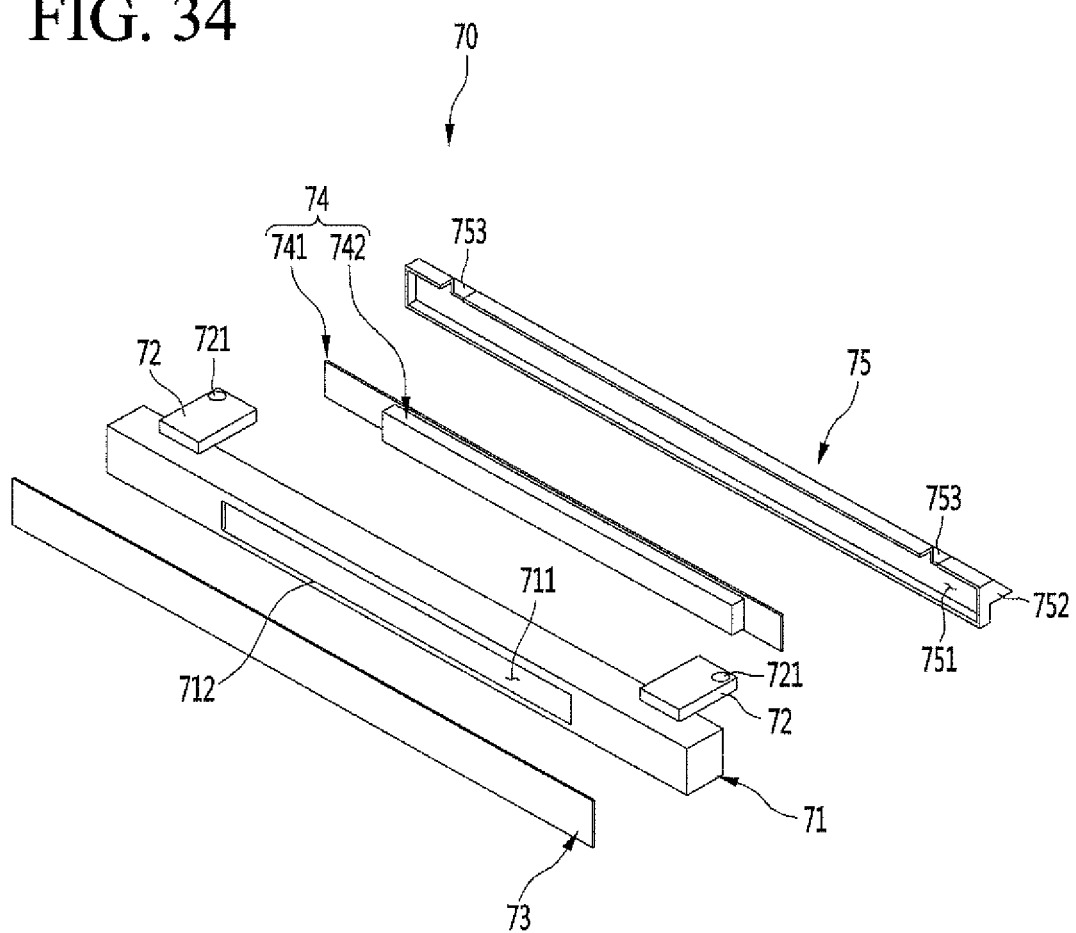
FIG. 34 is an exploded perspective view of the display assembly of FIG. 33.

FIG. 33 is a view illustrating a state in which a display assembly, which is one component of the apparatus 1 for cultivating plants, is mounted. FIG. 34 is an exploded perspective view of the display assembly of FIG. 33.

As illustrated in the drawing, the display assembly 70 may include a display case 71 forming an outer appearance, a display module 74 received in an inner space 711 of the display case 71, and a rear cover 75 that covers the open rear surface of the case 71.

The display case 71 may be provided in front of the light assembly 60. The display case 71 may be mounted on any one of remaining light assemblies 60 except for the light assembly 60, which is mounted on the top surface of the cultivating space 11, in a plurality of light assemblies 60.

The display case 71 may be disposed at a front end portion of the light assembly 60 and may be fixedly mounted on a front end portion of a top surface of the light assembly 60. A lateral length of the display case 71 may correspond to a lateral length of the light assembly 60 and may extend from one end of the cultivating space 11 to an opposite end of the cultivating space 11. A vertical width of the display case 71 may be equal to or slightly greater than a thickness of the light assembly 60. Therefore, a front surface of the light assembly 60 may be obscured or blocked by the display assembly 70, and the light assembly 60 may not be exposed to the outside when viewed from the front.

A display opening 712 may be formed in a front surface of the display case 71. The display opening 712 allows information output from the display module 74 to be viewed to the outside. A display sheet 73 may be provided on the front surface of the display case 71. The display sheet 73 may be formed of a transparent or translucent material such that an output screen of the display module 74 exposed through the display opening 712 may be viewed.

A case mount 72 may be provided on lateral sides of a top surface of the display case 71. The case mount 72 may extend rearward by a predetermined length. The case mount 72 may extend rearward and be seated on a top surface of the light case 61. A screw hole 721 may be formed in the case mount 72 and fixed to the top surface of the light case 61 by a screw 722 fastened to the screw hole 721.

The display module 74 may include a display 742 received inside the display case 71 to output information and a substrate 741 on which the display 742 is mounted. The display 742 may be a touch display having an input manipulatable by a user. In addition, the display 742 may be exposed to the outside through the display opening 712. If necessary, the display case 71 may further include a button for a manipulation input.

The rear cover 75 may be provided on the open rear surface of the display case 71. The rear cover 75 may be formed with a module mount 751 on which the display module 74 may be mounted. A support 752 protruding forward may be formed around the module mount 751, and the support 752 may be coupled to the display case 71.

A wire introduction/withdrawal port 753, through which a wire connected to the display module 74 may be introduced or withdrawn, may be opened in opposite sides of an upper end portion of the module mount 751. The wire passing through the wire introduction/withdrawal port 753 may be guided along with wires of the light assembly 60 through the light case 61. The wire passing through the wire introduction/withdrawal port 753 may be guided rearward through a space between the bed 50 and the display assembly 70, if necessary.

The support 752 protruding rearward may be formed on a back surface of the module mount 751, The support 752 may protrude rearward to make contact with a front surface of the light assembly 60. The support 752 may have an inclined rear surface, and may have a slope corresponding to a slope of the inclined front surface of the light assembly 60. Therefore, when the display assembly 70 is mounted, the support 752 may be completely in close contact with the front surface of the light case 61 to maintain a stable mounting state.

Figure 35:
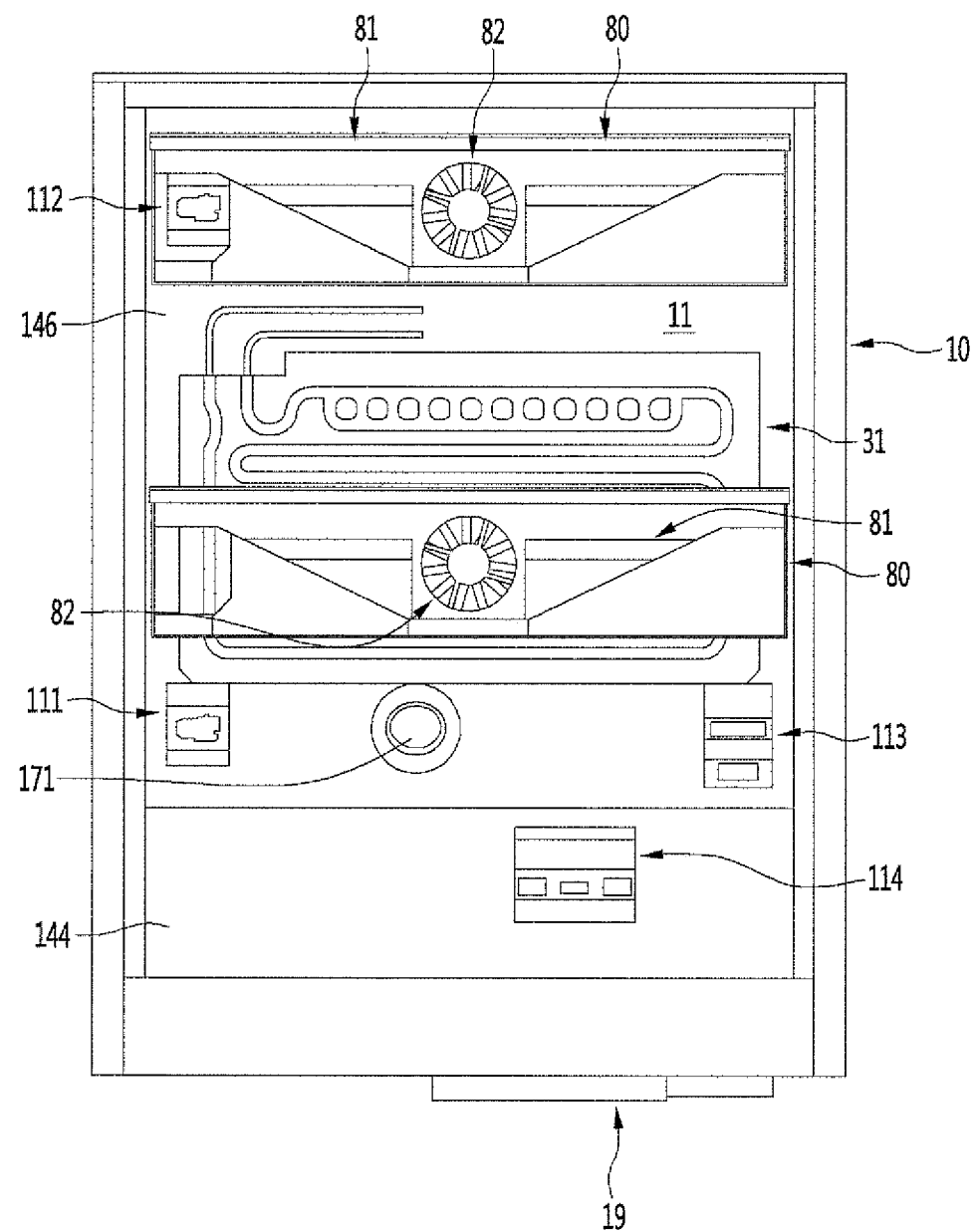
FIG. 35 is a view illustrating a state in which a blower assembly, which is one component of the apparatus for cultivating plants according to an embodiment, is mounted.

FIG. 35 is a view illustrating a state in which a blower assembly, which is one component of the apparatus 1 for cultivating plants, is mounted. As illustrated in the drawing, the evaporator 31 may be provided on a rear wall surface of the cultivating space 11, that is, the inner rear plate 146, and the blower assembly 80 may be provided in front of the evaporator 31.

The blower assembly 80 may be configured to circulate air at the upper portion of the cultivating space 11 partitioned by the bed 50. Accordingly, blower assemblies 80 may be provided in a number corresponding to a number of the beds 50, and may be provided at the lower end of the light assembly 60 and the upper portion adjacent to the bed 50.

Each blower assembly 80 has a structure in which air is circulated inside the cultivating space 11 such that the air heated or cooled by the heater 102 or the evaporator 31 is discharged at the upper end and air is suctioned at a position adjacent to the top surface of the bed 50. The heater 102 and the evaporator 31 may be disposed in an intermediate area of the inner rear plate 146 in the vertical direction and may at least partially overlap with the blower assemblies 80 at the upper portion and the lower portion. The air heated and cooled by the heater 102 and the evaporator 31 may be circulated by the blower assembly 80 to uniformly cool or heat the entire partitioned spaces inside the cultivating space 11 using only one heater 102 and one evaporator 31.

The blower assembly 80 may be spaced apart from the inner rear plate 146 such that the cooled or heated air may be smoothly introduced and be configured not to interfere with the evaporator 31. In addition, the upper end portion of the blower assembly 80 may be configured to be coupled to the rear end portion of the bottom surface of the light assembly 60.

The blower assembly 80 may cover components provided in the inner rear plate 146 in addition to the evaporator 31 in a state in which the blower assembly 80 is installed inside the cultivating space 11, thereby preventing the components from being exposed to the outside. However, FIG. 35 illustrates that a blower cover 84 forming the front surface of the blower assembly 80 is removed for explanation of an arrangement relation between the evaporator 31 and the blower assembly 80.

The blower assembly 80 may longitudinally extend in a lengthwise direction and may be configured corresponding to a length of the inner rear plate 146 in the lengthwise direction. In addition, air blown by a blowing fan 82 provided at the center portion is branched into the both sides by a blower body 81 and may be discharged forward in a uniform air amount at an outlet side. Detailed structure of the blower assembly 80 will be described hereinafter.

An outlet 171 of the supply duct 17 may be opened at a position lower than a lower portion of the inner rear plate 146, more specifically, the blower assembly 80 disposed hereinafter. The supply duct 17 may communicate with the machine compartment 12 to supply carbon dioxide into the cultivating space 11.

The inner rear plate 146 may include a plurality of connectors 111, 112, and 113. The connectors 111, 112, and 113 may be configured to connect wires, which extend from the light assembly 60, the display assembly 70, and the blower assembly 80 in the cultivating space 11. Therefore, it is possible to easily connect electrical components inside the cultivating space 11.

In addition, the second bottom plate 144 may further include a connector 114 to connect electric wires extending from the pump 494, the flow meter 495, and the water supply valve 496. The connector 114 may be disposed inside the water supply case 49 and may be covered by the water supply case 49.

Hereinafter, structure of the blower assembly 80 will be described with reference to the drawings.

Figure 36:
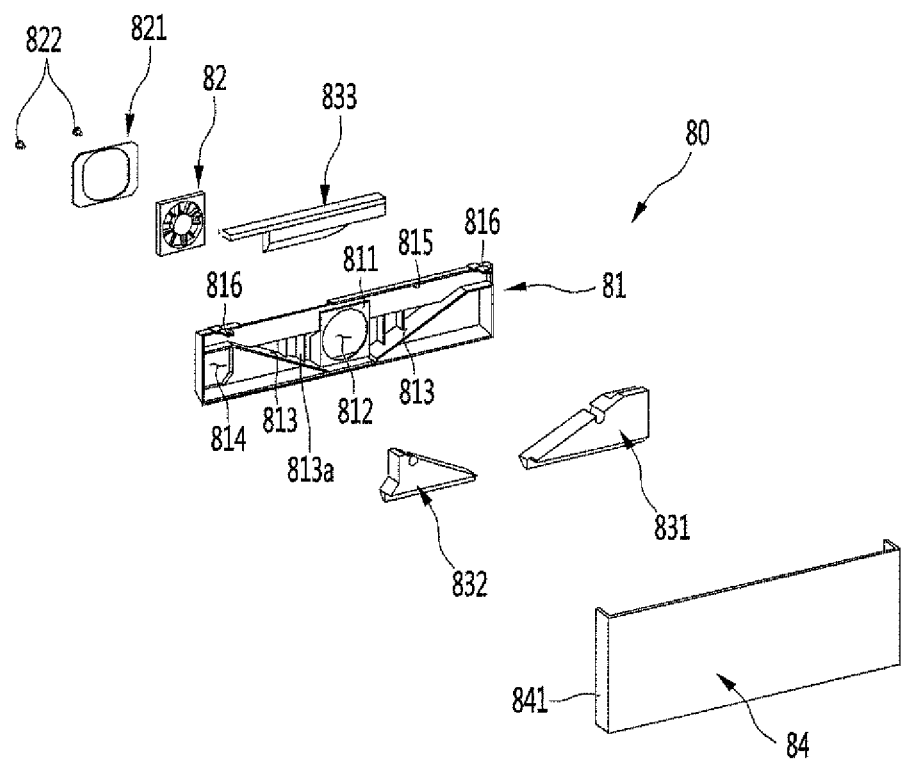
FIG. 36 is an exploded perspective view of the light assembly when viewed from the front.
Figure 37:
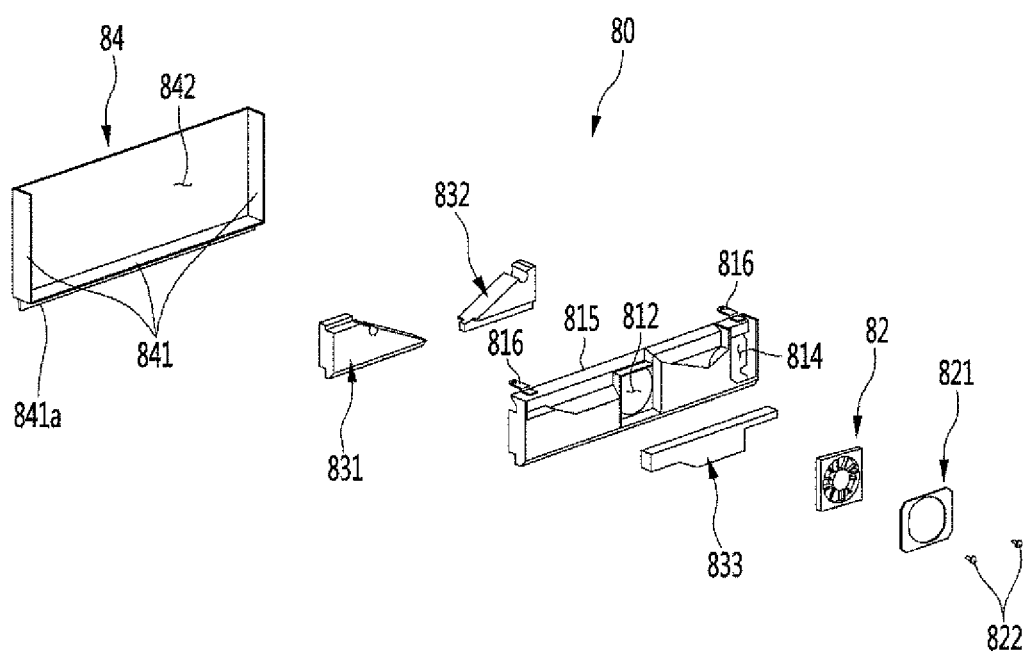
FIG. 37 is an exploded perspective view of the light assembly when viewed from the rear.
Figure 38:
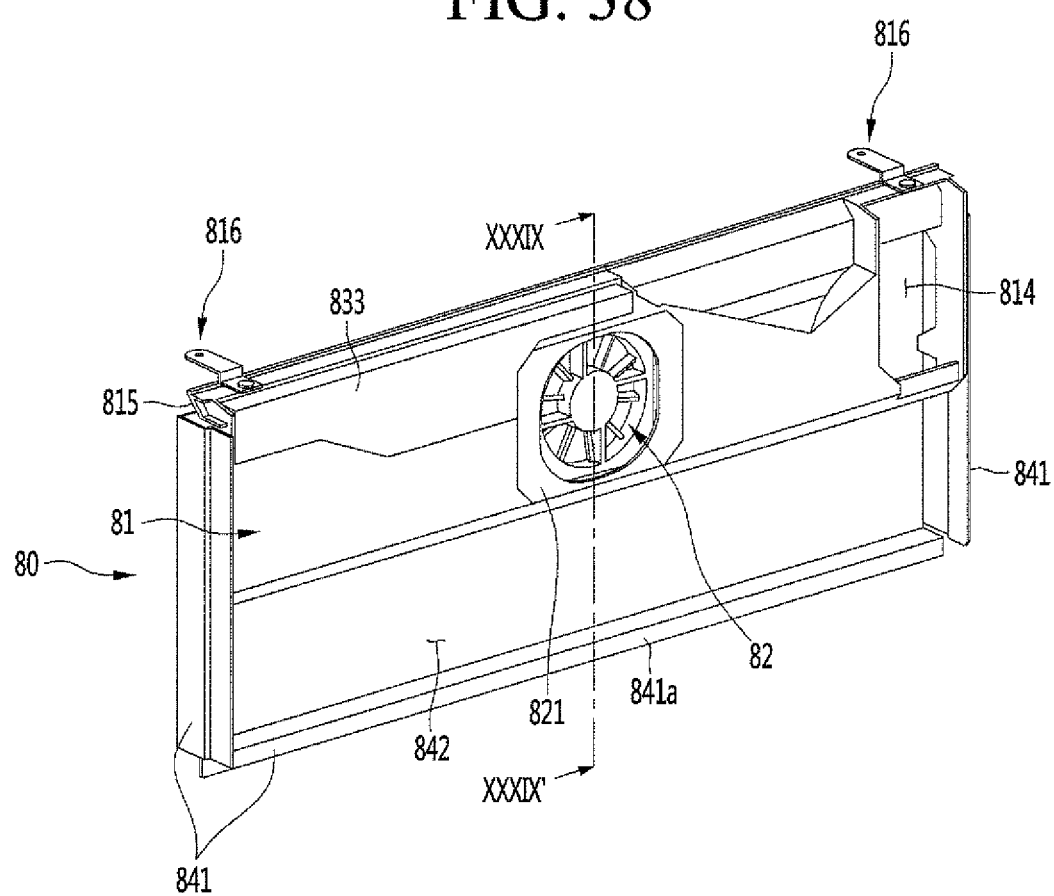
FIG. 38 is an exploded perspective view of the light assembly when viewed from the rear.
Figure 39:
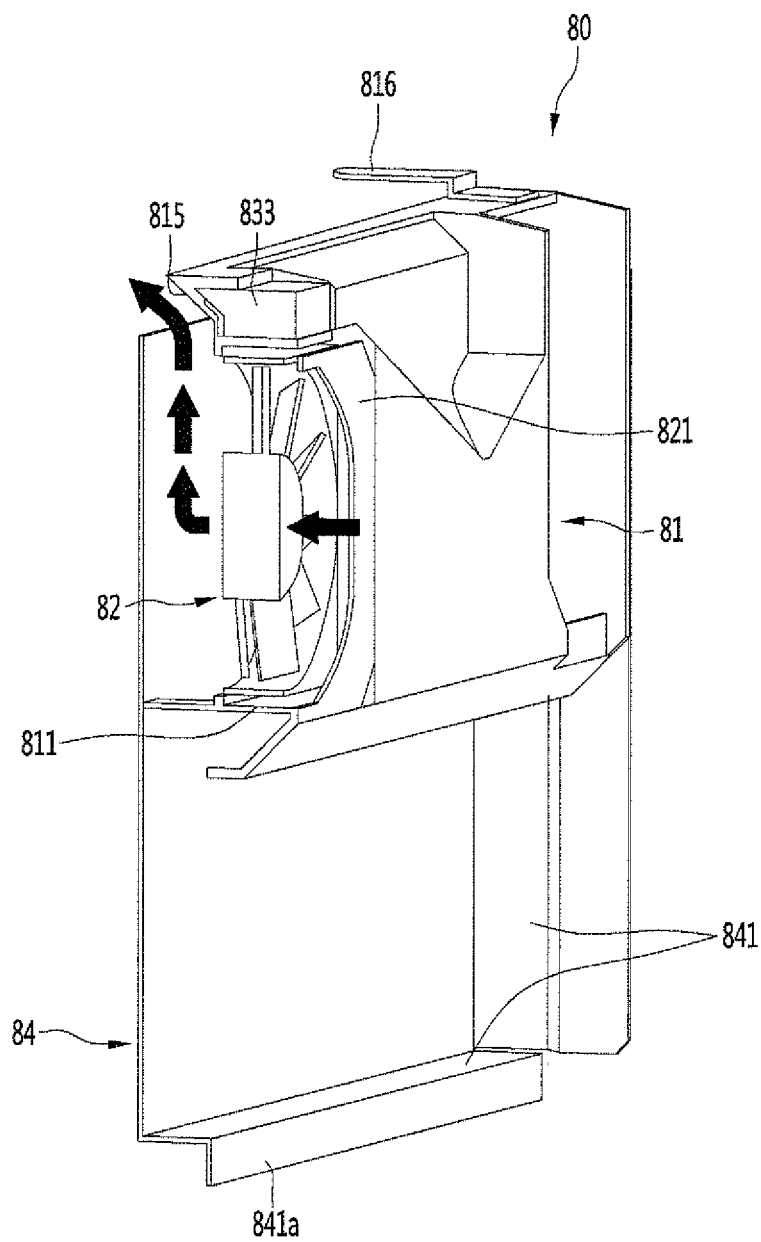
FIG. 39 is a cut-out perspective view of portion of FIG. 38, taken along line XXXIX-XXXIX.

FIG. 36 is an exploded perspective view of the blower assembly when viewed from the front. FIG. 37 is an exploded perspective view of the blower assembly when viewed from the rear. FIG. 38 is a perspective view of the blower assembly when viewed from the rear. FIG. 39 is a perspective view of a portion of FIG. 38, taken along line XXXIX-XXXIX.

As illustrated in the drawing, the blower assembly 80 may include the blowing fan 82, the blower body 81 on which the blowing fan 82 may be mounted, and the blower cover 84 to cover a portion of the inner rear plate 146 including the blower body 81. The blowing fan 82 may be formed in a shape of a box fan and may be provided at a center of the blower body 81. The blowing fan 82 may discharge forward the air introduced from the rear portion of the blower assembly 80.

The blower body 81 may provide a space for mounting the blowing fan 82 and may be configured to guide discharge of the air discharged by the blowing fan 82. The blower body 81 may be, for example, injection molded with a plastic material and a fan mount 811 may be formed at a center of a rear surface of the blower body 81 to be recessed in a shape corresponding to a shape of the blowing fan 82. An air hole 812 may be formed in the fan mount 811 so that air may be introduced into the blowing fan 82 when the blowing fan 82 rotates.

An air guide 813 may be formed on a front surface of the blower body 81 to guide air discharged from the blowing fan 82 upward. The air guides 813 may be provided on lateral sides of a center of the fan mount 811.

The air guides 813 may extend from a lower end portion of the fan mount 811 toward opposite sides of the fan mount 811 and may have an inclined surface having a height gradually increasing in an extending direction. Therefore, air blown by the blowing fan 82 may flow along the inclined surface, and may be closer to a discharge port formed in an upper end portion of the blower body 81 toward the outside.

A rib 813*a* extending upward may be further formed on a top surface of the air guide 813. The rib 813*a* may extend upward from the air guide 813 and may extend in a direction perpendicular to the upper end portion of the blower body 81. The ribs 813*a* may be connected with an inner surface of the blower body 81 to reinforce the air guide 813 while guiding the air flowing along the air guide 813 upward. Due to the structure of the air guide 813 and the rib 813*a*, the air discharged from the air blowing fan 82 may be uniformly discharged from an entire area of the discharge port of the blower body 81.

A discharge guide 815 may be formed at an upper end portion of a front surface of the blower body 81. The discharge guide 815 may guide the air discharged by the blowing fan 82 to be discharged forward of the blower body 81. The discharge guide 815 may form a surface protruding further forward from a lower portion toward an upper portion. In other words, the discharge guide 815 may form an inclined surface or a rounded surface, and guide the air flowing upward from below such that the air is directed forward. In this case, as the end portion of the discharge guide 815 is adjacent to the bottom surface of the light assembly 60, the air discharged from the blower assembly 80 may flow forward from the rear end portion of the bottom surface of the light assembly 60 by the discharge guide 815. When the light assembly 60 emits heat, the light assembly 60 may be cooled due to the air flow.

A connector hole 814 may be formed in one side portion of the blower body 81. Connector holes 814 may be formed at positions corresponding to the connector 811 and 812 mounted on the inner rear plate 146. Accordingly, when the blower assembly 80 is mounted, the connectors 811 and 812 may be inserted into the connector holes 814 so as not to interfere with each other. The electric wire connected to the blowing fan 82 may be connected to the electric wire through the connector hole 814.

The blowing fan 82 may be maintained to be fixed to the fan mount 811 by a fan fixing member 821 having a plate shape and mounted on the fan mount 811 and a screw 822 fastened to the blower body 81 through the fan fixing member 821.

A blower bracket 816 inserted into the blower assembly mount 633 may be provided on lateral sides of the top surface of the blower body 81. The blower bracket 816 may be formed in a vertically bent shape. One or a first end of the blower bracket 816 may be coupled to the top surface of the blower body 81 and an opposite or a second end of the blower bracket 816 may be mounted to the blower assembly mount 633 formed at a rear end of the bottom surface of the light assembly 60. Accordingly, the light assembly 60 and the blower assembly 80 may be coupled to each other in a manner of crossing each other perpendicularly to each other. The blower assembly 80 may discharge air forward from the rear end portion of the light assembly 60.

Recessed spaces may be formed on opposite sides of the blower body 81. A recessed space may be formed below the air guide 813. A first guide insulator 831 and a second guide insulator 832 may be mounted in the recessed spaces. A guide recess 521 may be formed in one side of a rear surface of the fan guide 341 and a third guide insulator 833 may be mounted in the guide recess 521. The cold air generated in the evaporator 31 may be prevented from being directly transmitted forward through the blower assembly 80 by the first to third guide insulators 831, 832, and 833.

The blower cover 84 may be provided in front of the blower body 81 to cover the blower body 81 and components mounted on the blower body 81. The blower cover 84 may form an outer appearance of a rear wall surface of the cultivating space 11 in a state in which the blower assembly 80 is mounted.

The blower cover 84 may be formed of a same metal material as the inner side plate 141, and may be formed by bending a plate-shaped material. The blower cover 84 may have a rim 841 which may be bent along a circumference of the blower body 84. The blower body 84, in which the blowing fan 82 may be mounted, may be received in an inner space 842 defined by the rim 841.

A top surface of the blower cover 84 may be open. The top surface of the blower cover 84 may be positioned at a position corresponding to an upper end portion of the blower body 81. Therefore, air discharged along the discharge guide 815 may be discharged through the top surface of the open blower cover 84.

Opposite side surfaces of the blower cover 84 of the rim 841 may be formed to surround opposite side surfaces of the blower body 81. The blower cover 84 may extend further downward than the blower body 81. The blower cover 84 may extend to the top surface of the bed 50. Accordingly, when the blower assembly 80 is mounted, the rear wall of the space corresponding to the space between the light assembly 60 and the bed 50 is formed. In addition, components mounted on the inner rear plate 146 may be covered to make a neat outer appearance.

A portion, which forms the bottom surface of the blower cover 84, of the rim 84 may have an extending length shorter than opposite side surfaces of the rim 84. Accordingly, the bottom surface of the blower cover 84 may be spaced apart from the inner rear plate 146 to form a space in which air is introduced downward. In other words, in a state in which the blower assembly 80 is mounted, a suction port through which air is suctioned may be formed on the bottom surface of the blower cover 84

An end portion of the rim 841 forming the bottom surface of the blower cover 84 may be bent downward to form a bending portion 841a. The bending portion 841a may extend further downward from the rear portion of the bed 50. Accordingly, the lower end portion of the blower cover 84 may not be exposed while the structure of the inner rear plate 146 is covered, thereby making a neat outer appearance. The bending portion 841a may be spaced apart from the rear end portion of the bed 50 and the inner rear plate 146 to form air inlets for air to be introduced into the blower cover 84.

Hereinafter, an air flowing state inside the cultivating space 11 in a state in which the blower assembly 80 having the above-described structure is mounted will be described again with reference to the drawings.

Figure 40:
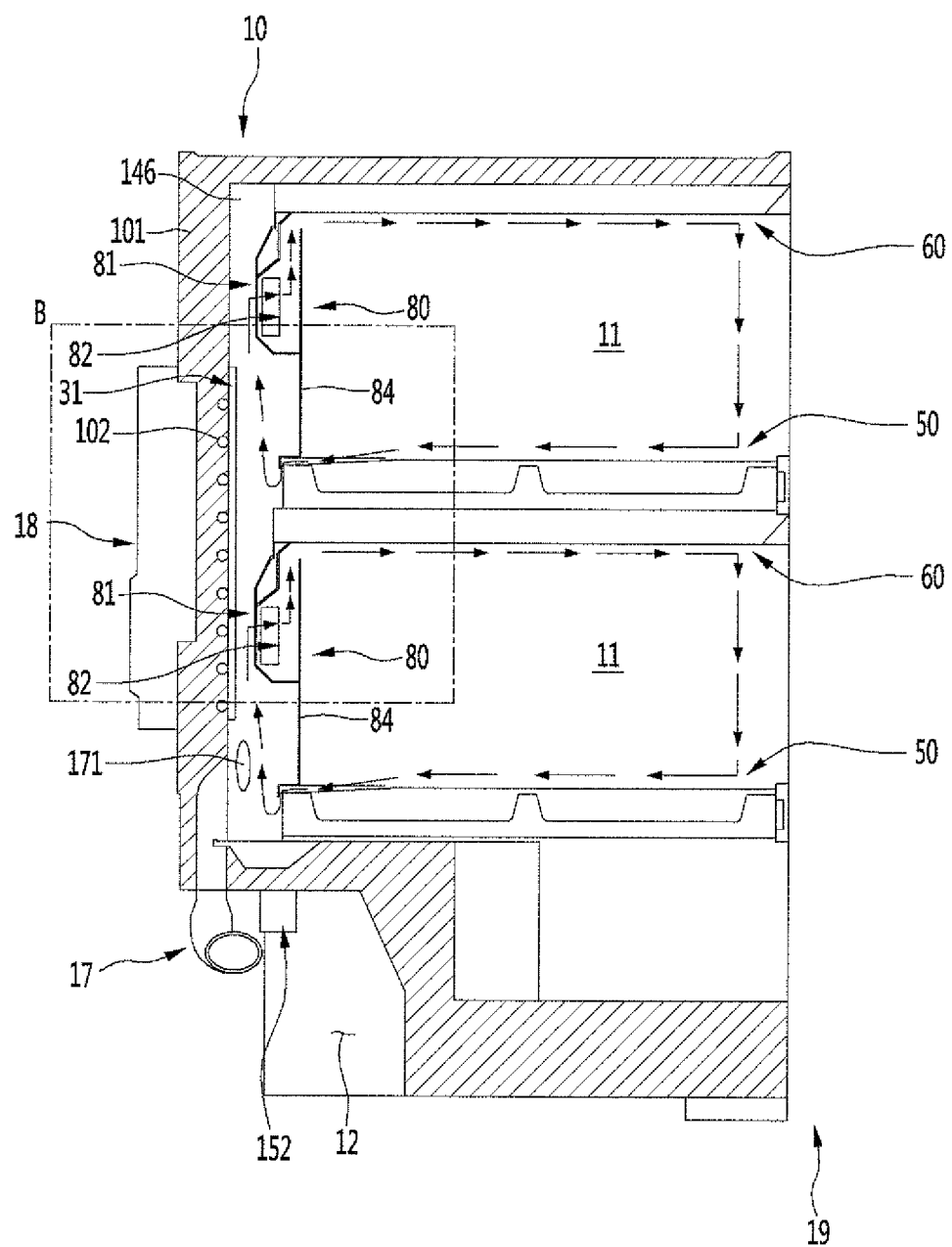
FIG. 40 is a sectional view illustrating an air circulation state in the cabinet.
Figure 41:
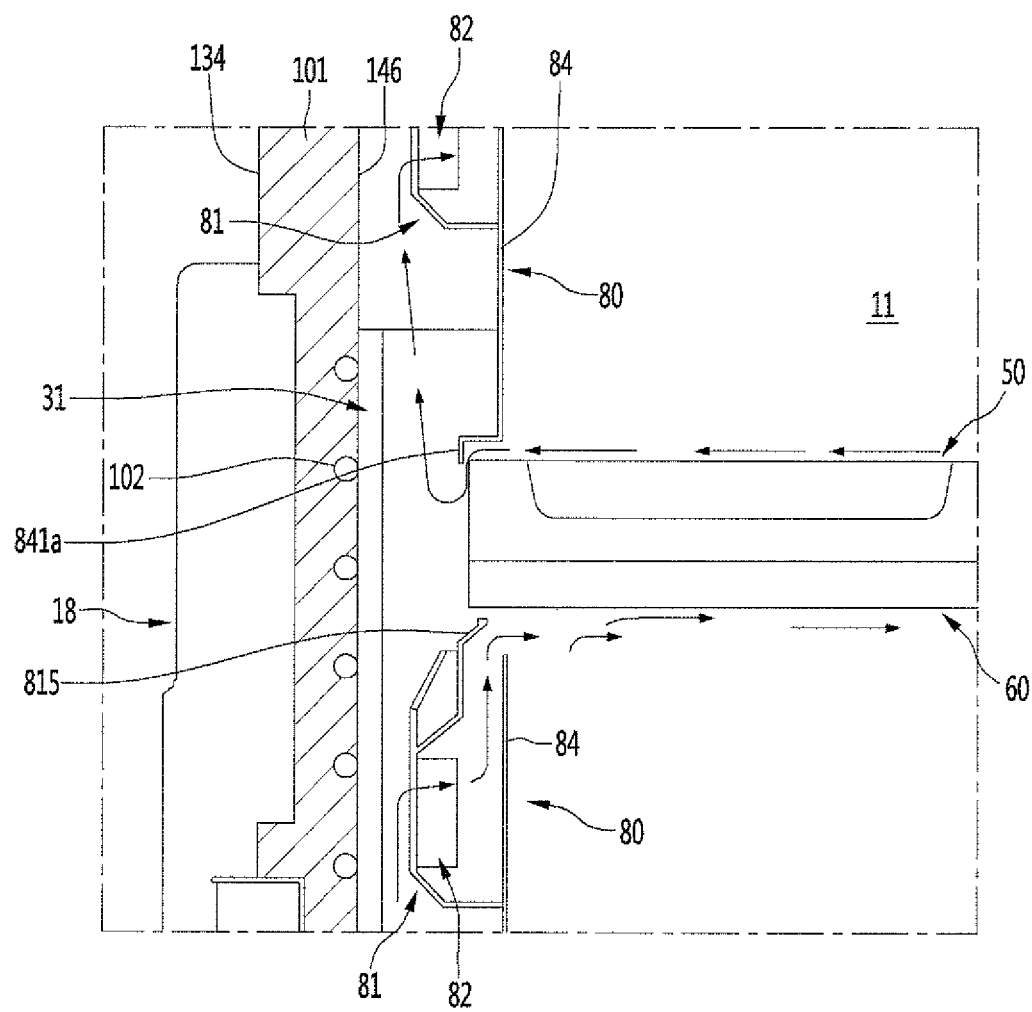
FIG. 41 is an enlarged view of portion B in FIG. 40.

FIG. 40 is a sectional view illustrating an air circulation state in the cabinet. FIG. 41 is an enlarged view of portion B in FIG. 40.

As illustrated in the drawings, the internal temperature of the cultivating space 11 may be sensed by an internal temperature sensor 182, and the set temperature of the cultivating space 11 may be maintained depending on the operation of the heater 102 or the evaporator 31. In addition, the air in the cultivating space 11 may be circulated by driving of the air blowing fan 82 and may be heated or cooled by the heater 102 or the evaporator 31, thereby maintaining a whole temperature of the cultivating space 11 at a uniform temperature.

When the blowing fan 82 is driven, air in the cultivating space 11 flows to the rear end portion of the bed 50 while flowing along the top surface of the bed 50. In this process, plants growing in the bed 50 may be shaken by the flowing air, and plant growth may be promoted by this action. The air blowing fan 82 may maintain a predetermined air flow rate, and periodically vary the air flow rate according to occasions to apply appropriate stress to the plants, thereby allowing the plants to grow more rapidly or improve a growth state.

The air flowing to the rear end portion of the bed 50 may be introduced into the blower cover 84 through a space between the lower end portion of the blower cover 84 and the rear end portion of the bed 50. In this case, the shape of the bent portion 841a at the lower end portion of the blower cover 84 may prevent the space, in which the air in the cultivating space 11 is suctioned, from being exposed while smoothly introducing air.

The air introduced into the blower cover 84 flows upward and is directed to the blowing fan 82. In this process, the flowing air may be cooled while passing through the evaporator 31 or may be heated by the heater 102. The air in the cooled or heated state is forced to flow forward by the blowing fan 82. The air flowing forward is directed upward while flowing to opposite side surfaces by the air guide 813. In this case, the air discharged is uniformly directed to the discharge guide 815 by the inclination of the air guide 813 and rib 813a. More specifically, a distance between the air guide 813 and the discharge guide 815 is increased at a position close to the air blowing fan 82, so the rapidly flowing air flows a longer distance. The distance between the air guide 813 and the discharge guide 815 is shorter as the air guide 813 and the discharge guide 815 are further apart from the air blowing fan 82, so the air flowing more slowly flows a short distance. Accordingly, the air discharged through the discharge guide 815 may be discharged at a constant flow rate in the entire area.

The air discharged through the discharge guide 815 may flow forward along a bottom surface of the light assembly 60, that is, along the light cover 63. In this case, the air flowing along the light cover 63 may lower the heat generated in the operation of the light assembly 60.

The air that flowing forward along the bottom surface of the light assembly 60 may flow to the first half of the cultivating space 11, flow downward, then flow rearward along the bed 50, and then flow into the blower cover 84. The entire cultivating space 11 may be uniformly heated and the cultivating space 11 may be maintained at a constant temperature, by continuously circulating the air, so an optimum condition for growing the plants inside the bed 50 may be created.

$CO_2$ may be indispensably required to actively maintain photosynthesis of plants disposed in the cultivating space 11, A supply duct 17 and a return duct 150 to connect the machine compartment 12 and the inner portion of the cultivating space 11 may be further provided to continuously supply $CO_2$ to the cultivating space 11.

Hereinafter, structure of the supply duct 17 and the return duct 150 will be described with reference to the drawings.

Figure 42:
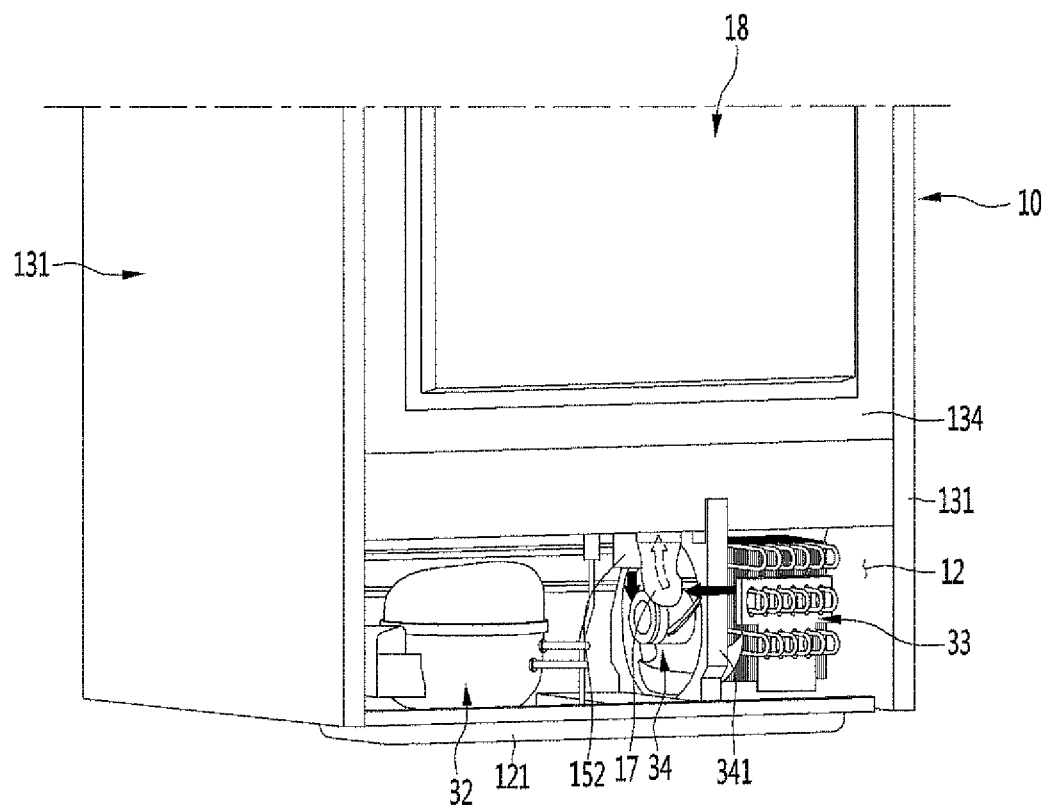
FIG. 42 is a perspective view of a machine compartment of the apparatus for cultivating plants according to an embodiment.
Figure 43:
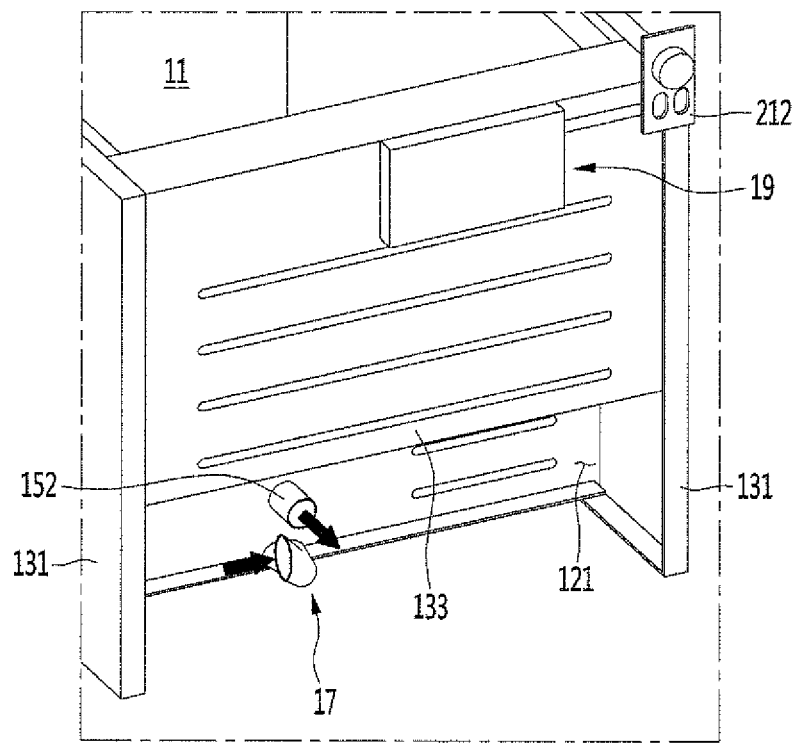
FIG. 43 is a partial perspective view of the cabinet when viewed from the bottom.

FIG. 42 is an open perspective view of a machine compartment of the apparatus 1 for cultivating plants. FIG. 43 is a partial perspective view of the cabinet when viewed from the bottom.

As illustrated in the drawings, the machine compartment 12 is open toward the rear portion of the cabinet 10, and a bottom surface of the machine compartment 12 may be formed by a machine compartment base 121. The compressor 32 and a condenser 33 constituting a cooling cycle may be mounted on the machine compartment base 121. Fan guide 341 may be further provided between the compressor 32 and the condenser 33 and a condenser fan 34 may be provided in the fan guide 341.

External air is suctioned into the condenser 33 as the condenser fan 34 is driven and then flows to the compressor 32 through the condenser fan 34. The condenser fan 34 may force the air flow inside the machine compartment 12 to allow cooling or heat exchange of the condenser 33 and the compressor 32.

The supply duct 17 communicating with the cultivating space 11 may extend to a position adjacent to the condenser fan 34. In this case, the supply duct 17 may extend downward to a space, in which the compressor 32 is disposed, of a space defined by the fan guide 341. In particularly, an open lower end portion of the supply duct 17 may be formed toward the condenser fan 34. Accordingly, a separate fan is not required for the supply of $CO_2$ and the air in the machine compartment 12 may flow into an inlet of the supply duct 17 when the condenser fan 34 rotates. The air in the machine compartment 12 may flow into the cultivating space 11 through the supply duct 17.

One side of the return duct 150 spaced away from the supply duct 17 may extend downward. The discharge pipe 152 of the return duct 150 may extend to a blade area of the condenser fan 34. The open lower end portion 152a of the discharge pipe 152 may be formed to face downward. Therefore, air forcedly blown by the condenser fan 34 rapidly passes through an opening of the discharge pipe 152. Therefore, negative pressure may be formed on an open bottom surface of the discharge pipe 152, and internal air of the cultivating space 11 may be introduced into the return duct 150 and discharged to the machine compartment 12.

The air of the machine compartment 12 may be supplied through the supply duct 17 to the cultivating space 11 by rotation of the condenser fan 34 and forcibly supplied into the cultivating space 11, so $CO_2$ may be supplied into the cultivating space 11. Plants in the cultivating space 11 may perform photosynthesis using the supplied $CO_2$.

The air in the cultivating space 11 may be discharged into the machine compartment 12 by the return duct 150. The forced air flow through the supply duct 17 and the return duct 150 enables continuous supply of $CO_2$ to the cultivating space 11. An amount of air flowing into the cultivating space 11 from the machine compartment 12 may be adjusted according to a kind of a plant to be cultivated and an amount of $CO_2$ supplied in a growing stage.

Although not illustrated, a filter may be provided in the supply duct 17 or the return duct 150. The filter may prevent dust from entering the inside of the machine compartment 12 or the inside of the cultivating space 11 when the air is introduced, if necessary. In addition, if necessary, an opening/closing mechanism, such as a damper, which is opened only in one direction, may be provided in the supply duct 17 and the return duct 150. Only if necessary, the opening/closing mechanism may be opened to adjust the supply amount of $CO_2$.

Figure 44:
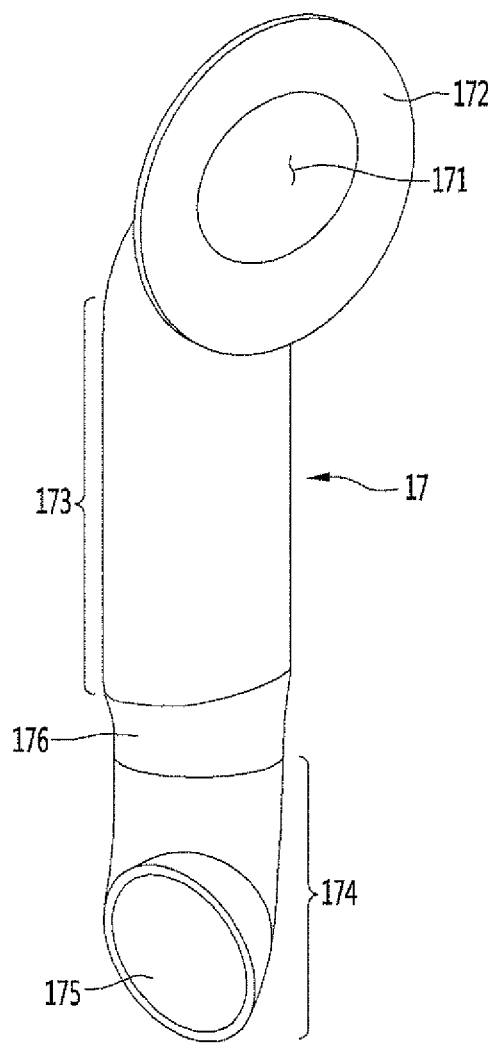
FIG. 44 is a perspective view of a supply duct which is a component of the apparatus for cultivating plants according to an embodiment.

FIG. 44 is a perspective view of a supply duct which is a component of the apparatus 1 for cultivating plants according to an embodiment. Hereinafter, structure of the supply duct 17 will be described.

The supply duct 17 may longitudinally extend in the vertical direction, and an outlet 171 for discharging air may be formed at an upper end portion of the supply duct 17 and an inlet 175 for introducing air may be formed at a lower portion of the supply duct 17. The inlet 175 and the outlet 171 may face in mutually different directions. In other words, the inlet 175 may be disposed to face the condenser fan 34, and the outlet 171 may be formed to face the rear wall surface of the cultivating space 11.

A flange 172 may be formed around the outlet 171. The flange 172 may be bent outward around the outlet 171 and may be fixed in contact with the inner rear plate 146.

The supply duct 17 may include a duct upper portion 173, and a duct lower portion 174. The duct upper portion 173, which may be bent downward from the outlet of the supply duct 17, may be formed in an elliptical shape in cross section. A diameter in the frontward-rearward direction may be formed to be significantly smaller than a diameter in the lateral direction. This structure allows the upper portion of the supply duct 17 to be disposed in a space between the outer case 130 and the inner case 140 where the upper portion of the supply duct 17 is relatively narrow. Although the diameter in the frontward-rearward direction is formed to be smaller, the outlet 171 and the inlet 175 have a same sectional area, so the air passing through the supply duct 17 smoothly flows.

The duct lower portion 174 may extend from a lower end portion of the duct upper portion 173 to the inlet 175. As the duct lower portion 174 is positioned in an inner region of the machine compartment 12, the duct lower portion 174 is relatively free from restriction on thickness. In order to allow the air blown by the condenser fan 34 to flow more smoothly into the supply duct 17 through the inlet 175, the inlet 175 may be formed in a substantially circle shape as compared to a sectional shape of the duct upper portion 173. A duct connecting portion 176 may be further formed between the duct upper portion 173 and the duct lower portion 174 to naturally connect the duct upper portion 173 and the duct lower portion 174.

Hereinafter, an air flow path for supplying $CO_2$ will be described with reference to the drawings.

Figure 45:
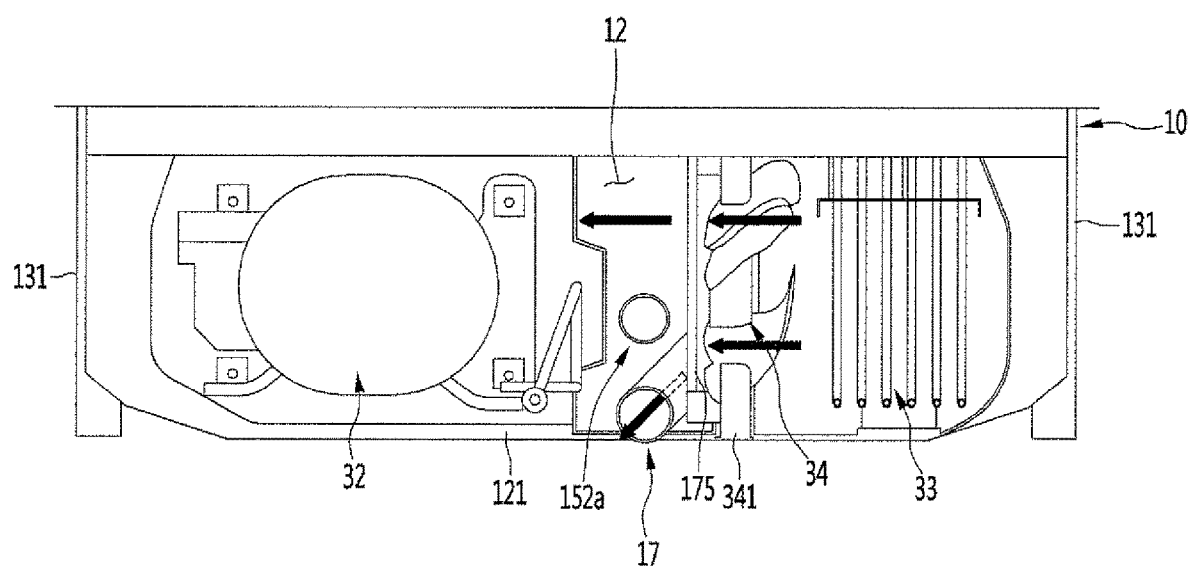
FIG. 45 is a plan view illustrating an arrangement of a supply duct and a return duct in the machine compartment according to an embodiment.
Figure 46:
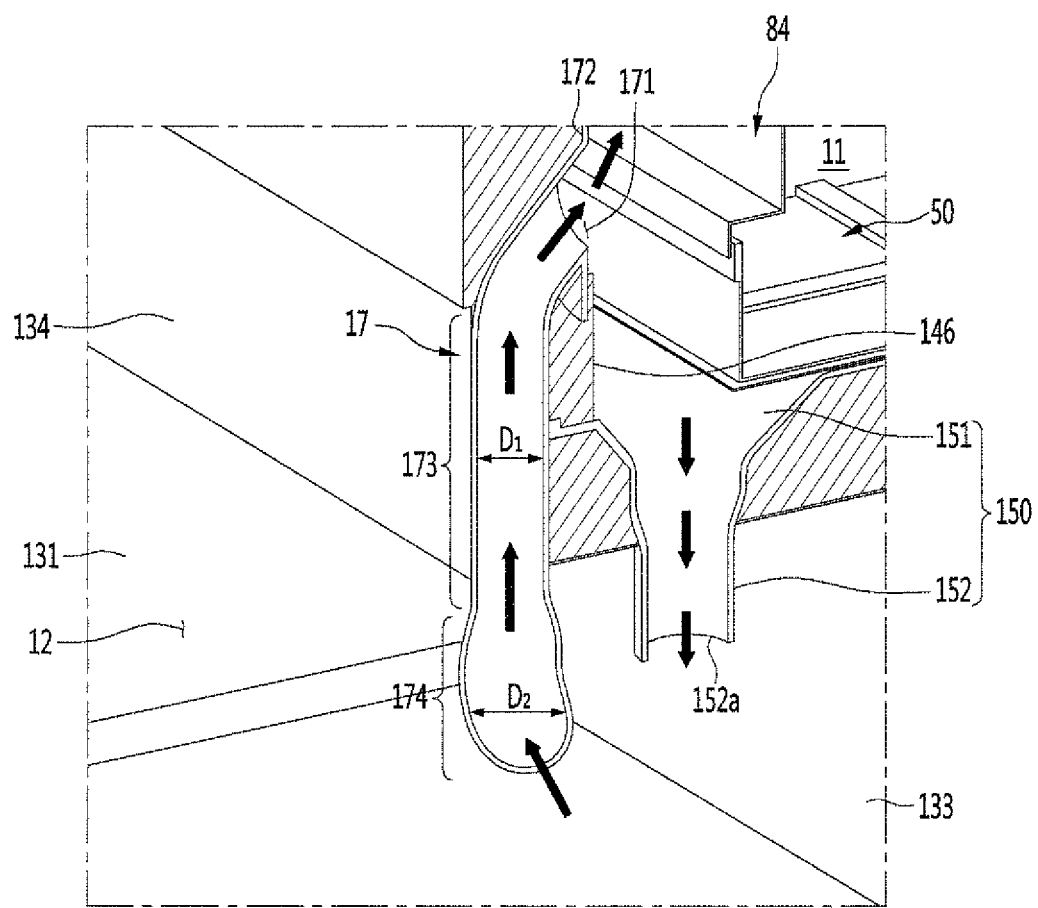
FIG. 46 is a view illustrating supply and discharge states of $CO_2$ through the supply duct and the return duct.

FIG. 45 is a plan view illustrating an arrangement of the supply duct and the return duct in the machine compartment. FIG. 46 is a view illustrating supply and discharge states of $CO_2$ through the supply duct and the return duct.

As illustrated in the drawing, the inlet 175 of the supply duct 17 may be positioned substantially adjacent to one side of the fan guide 341. An open surface of the inlet 175 may be formed to face blades of the blowing fan 82 and be arranged to be parallel to a front surface of the condenser fan 34 (a surface crossing a rotation axis of the condenser fan).

Therefore, when the condenser fan 34 is rotated, air forcedly blown by the condenser fan 34 may be effectively introduced into the inlet of the supply duct 17. In this case, a frontward-rearward direction width D2 of the duct lower portion 174 may be larger than a frontward-rearward direction width D1 of the duct upper portion 173. The air flowing into the duct lower portion 174 may flow upward and flow into the duct upper portion 173. The air may flow through the duct upper portion 173 to the rear portion of the blower assembly 80 through the outlet 171.

In this case, the frontward-rearward direction width of the duct upper portion 173 is relatively smaller than that of the duct lower portion 174, but cross sectional areas of the duct upper portion 173 and the duct lower portion 174 are the same, so loss of an amount of air is not caused.

The air of the machine compartment 12 flowing into the rear portion of the blower assembly 80 may include $CO_2$ and may be uniformly supplied into the cultivating space 11 by the blower assembly 80. The $CO_2$ introduced into the cultivating space 11 may be involved in photosynthesis of the cultivated plants. The $CO_2$ may be used for photosynthesis and the air in the cultivating space 11 having less $CO_2$ may be directed to the machine compartment 12 through the return duct 150.

In this case, the outlet of the return duct may be opened downward, so the air blown by the condenser fan 34 may pass over the outlet 171 of the return duct 150. Accordingly, negative pressure may be formed at the outlet of the return duct 150, and the air in the cultivating space 11 may be introduced into the machine compartment 12.

The return duct 150 may be formed such that a duct mount 151 formed at the upper portion of the return duct 150 has a slope and a wider area. When defrost water is generated, the defrost water may be discharged to the machine compartment 12 through the duct mount 151 and the discharge pipe 152.

A bottom cover 55 may be provided on a bottom surface of the cabinet 10 to receive electrical components. Hereinafter, structure of the bottom case 19 will be described with reference to the drawings.

Figure 47:
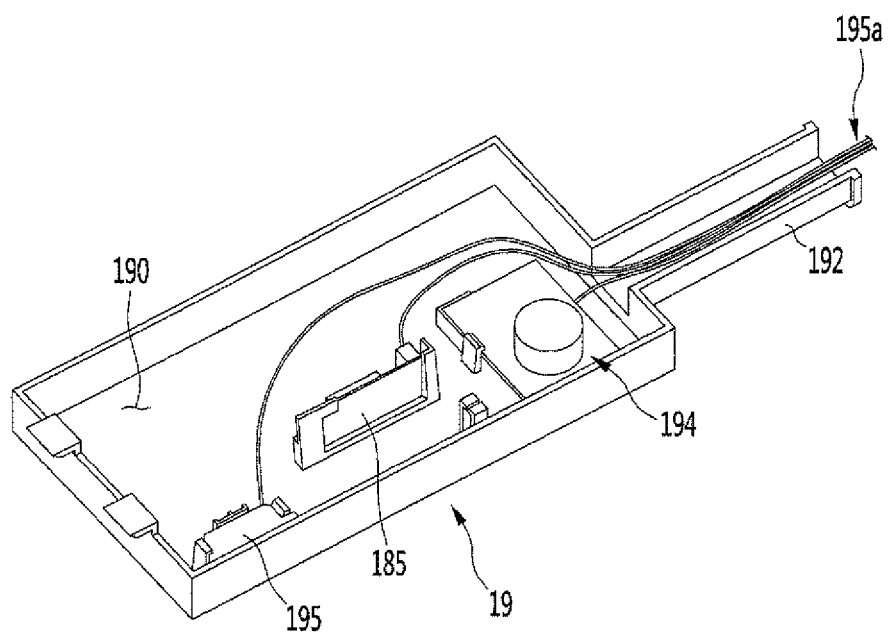
FIG. 47 is a perspective view illustrating an internal structure of the bottom case, which is one component of the apparatus for cultivating plants according to an embodiment.

FIG. 47 is a perspective view illustrating an internal structure of the bottom case, which is one component of the apparatus 1 for cultivating plants. As illustrated in the drawing, the bottom case 19 may have an open top surface, and may be disposed such that the open top surface faces the bottom surface of the cabinet 10. The bottom case 19 may be positioned between the cabinet 10 and a ground surface on which the apparatus 1 for cultivating plants is disposed. The bottom case 19 and electronic components inside the bottom case 19 are not exposed to the outside when viewed from above the apparatus 1 for cultivating plants.

The bottom case 19 may have a frame formed along a circumference of the bottom surface in a plane shape. In addition, the bottom case 19 has an inner space 190 in which electrical components provided in the bottom case 19 are received.

A door switch 195 may be provided in the inner space 190 of the bottom case 19 to sense opening/closing of the door 20. In addition, a communication unit 185 to communicate with an external device may be formed in the bottom case 19. The communication unit 185 may be configured to perform various wireless communications, such as Wi-Fi, ZigBee, NFC, and Bluetooth, to transmit operating information of the apparatus 1 for cultivating plants through a cell phone and/or a computer of a user, to receive a command, and to store and process user information, An external temperature sensor 194 is provided inside the bottom case 19 to sense an outdoor temperature. An external humidity sensor 184 may be further included in the bottom case 19 and an internal humidity sensor 183 may be provided in the cultivating space 11.

A wire guide 192 may extend laterally at one side of the bottom case 19. The wire guide 192 may have an open upper portion to receive wire 195a connected to the door switch 195, the external temperature sensor 194, and the communication unit 185 and may communicate with the space in which the electronic components are received.

Hereinafter, operation of the apparatus 1 for cultivating plants having the above structure according to an embodiment will be described.

Figure 48:
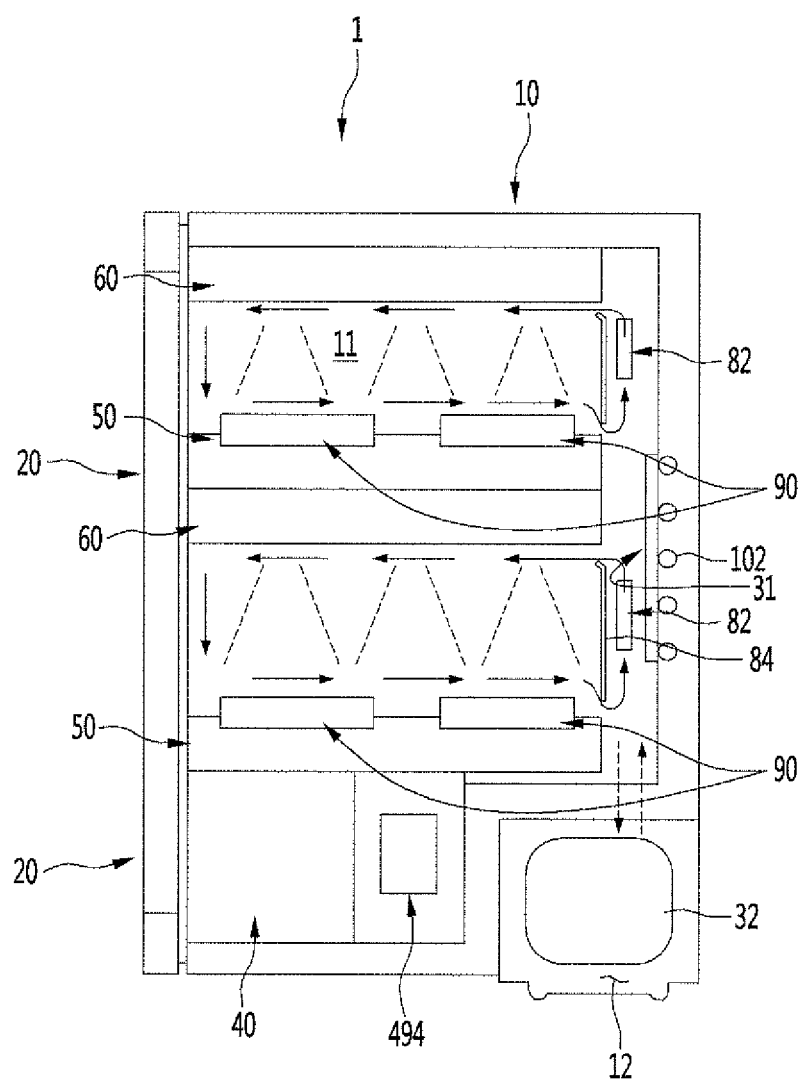
FIG. 48 is a block diagram illustrating a flow of a control signal of the apparatus for cultivating plants according to an embodiment.
Figure 49:
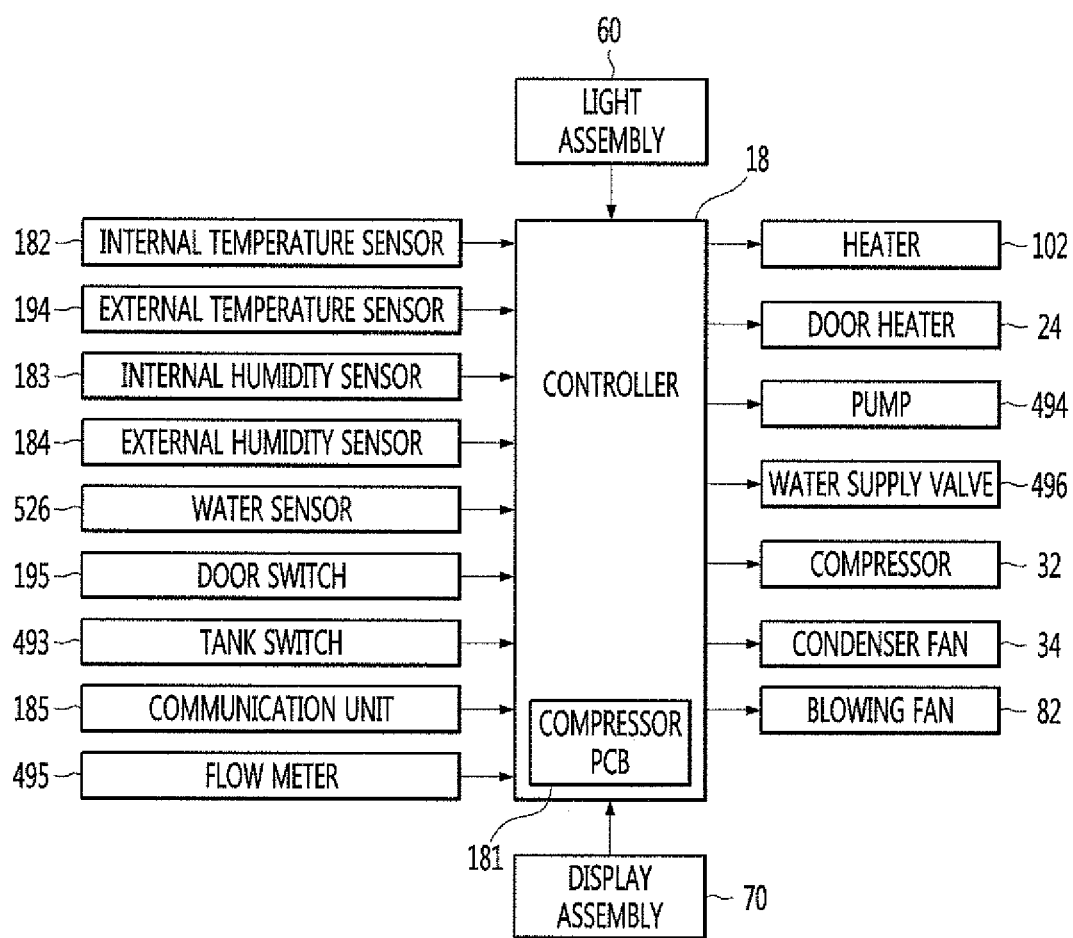
FIG. 49 is a view schematically illustrating an operating state of the apparatus for cultivating plants according to an embodiment.

FIG. 48 is a block diagram illustrating the flow of a control signal of the apparatus 1 for cultivating plants according to an embodiment. FIG. 49 is a view schematically illustrating an operating state of the apparatus 1 for cultivating plants according to an embodiment.

As illustrated in the drawing, the seed package 90 may be mounted on the bed 50, and water in the water tank 40 may be supplied to the bed 50 in a constant amount. In addition, nutrient solution contained in the seed package 90 may be supplied to plants inside the seed package 90 together with water supplied to the bed 50.

The light assembly 60 may irradiate light toward the plant growing in the bed 50 through operation of the light assembly 60. The light assembly 60 may be turned on and off for an appropriate time period depending on a growth condition and environment of the plant. The light assembly 60 may be turned on and off according to an actual amount of sunlight according to a season, thereby providing an environment similar to that in which the plants in the apparatus 1 for cultivating plants grow in an external natural environment.

Plants in the bed 50 may be subject to photosynthesis by the light provided by the light assembly 60, and receive a required amount of carbon dioxide through the supply duct 17 in this process. In particular, $CO_2$ may be supplied to the cultivating space using the condenser fain 34 without an additional dedicated fan. The air in the cultivating space 11 may be recovered to the machine compartment 12 and may be circulated between the machine compartment 12 and the cultivating space 11.

When the internal temperature of the cultivating space 11 is excessively low, the heater 102 may be driven. When the internal temperature of the cultivating space 11 is excessively high, the cooling cycle may be driven and the evaporator 31 cooled.

The air heated or cooled by the heater 102 or the evaporator 31 may be discharged forward through the blower assembly 80. In this case, the air may flow forward from the rear end portion of the light assembly 60, and the bottom surface of the light assembly 60 may be cooled during the air flow.

The air flowing forward may move downward and then flow from the front end portion of the bed 50 to the rear end portion of the bed 50. A stem and leaf of the plant growing in the bed 50 may be shaken by the flow of air flowing from the top surface of the bed 50, thereby significantly improving a state of the plant to be cultivated.

The air introduced into the rear end portion of the bed 50 may pass through the space in which the evaporator 31 and the heater 102 are disposed and may be discharged toward the light assembly 60 by the blowing fan 82.

The air flowing by the driving of the air blowing fan 82 may circulate inside the cultivating space 11. In this circulation process, the light assembly 60 may be air-cooled and growth of the plant on the bed 50 may be promoted.

The air passing through the evaporator 31 and the heater 102 may be heated or cooled during repeated air circulation, and the inner portion of the cultivating space 11 may be continuously and uniformly heated and cooled. Accordingly, the entire portion of the cultivating space 11 may be maintained to a preset or predetermined temperature.

Various embodiments may be possible in addition to the above-described embodiments. For example, the cabinet may have a vertically long structure, and a larger number of beds and light assemblies may be provided.

Hereinafter, additional embodiments will be described with reference to the drawings. In these embodiments, the same or like reference numerals are used for the same or like elements as those of the previous embodiment, and repetitive discussion has been omitted.

FIG. 50 is a view illustrating internal structure of an apparatus 1 for cultivating plants according to another embodiment. As illustrated in the drawing, the apparatus 1 for cultivating plants according to this embodiment has a long structure in the vertical direction. The cultivating space 11 is formed inside the cabinet 10 and a plurality of beds 50 and light assemblies 60 corresponding to the beds 50 may be provided.

In addition, the water tank 40 may be provided at the front most portion of the lowest portion of the cabinet 10, a water supply assembly, such as the valve of a pump 494, may be disposed at the rear portion, the machine compartment 12 divided by a partition may be provided at the rear portion of the water supply assembly, and the compressor 32 may be disposed inside the machine compartment 12.

The plurality of beds 50 and the light assembly 60 may be provided inside the cultivating space 11. Only the light assembly 60 is provided on an uppermost surface of the cultivating space 11, and the bed 50 at the lowermost portion of the cultivating space 11 may be configured to cover the water tank 40 and the pump 494. The light assembly 60 and the bed 50 may be disposed in a vertical direction in the space between the uppermost portion and the lowermost portion of the cultivating space 11.

In addition, a length of the cabinet 10 may be increased. In this case, when the evaporator 31 and the heater 102 are provided only at any one side, the entire inner portion of the cabinet 10 may not be cooled or heated. Accordingly, the blower assembly 80 may be provided on the rear side of the space between the bed 50 and the light assembly 60 above. The evaporator 31 and the heater 102 may be subsequently disposed in the rear portion of the blower assembly 80. The evaporator 31 and the heater 102 may be formed in each space formed by the bed 50 and the light assembly 60. Even in the situation that the length of the cabinet 10 is increased, each space of the bed 50 may be effectively maintained to a set temperature due to the above-described structure.

A plurality of heaters 102 and evaporators 31 may be provided in the respective spaces to independently adjust temperatures of the corresponding spaces. Accordingly, the spaces defined by the beds 50 may be maintained at different temperatures, thereby providing an optimal temperature environment suitable for various plants.

Embodiments disclosed herein provide an apparatus for cultivating plants, in which carbon dioxide may be efficiently supplied and circulated in a cultivation space. Embodiments disclosed herein further provide an apparatus for cultivating plants, having a simple external appearance and internal configuration because a configuration for supplying carbon dioxide is not exposed to the inside and outside.

Embodiments disclosed herein provide an apparatus for cultivating plants, that may increase productivity and reduce manufacturing costs because a configuration for supplying carbon dioxide is simple. Embodiments disclosed herein also provide an apparatus for cultivating plants, that may supply carbon dioxide into a cultivation space using a safe structure.

Embodiments disclosed herein may include a supply duct that connects a cultivation space and a machine compartment such that air in the machine compartment is supplied to the cultivation space, and a return duct that returns air in the cultivation space to the machine compartment so that air including carbon dioxide may be continuously supplied. The air duct may have an inlet open toward a discharge side of a condenser fan, so the air in the machine compartment may be forcibly supplied when the condenser fan is operated. The inlet may be open toward blades of the condenser fan.

The return duct may be disposed vertically under an evaporator disposed on a rear wall surface of the cultivation space. The return duct may have an outlet disposed at a discharge side of the condenser fan and may be open toward a bottom of the machine compartment, so air in the cultivation space may flow into the machine compartment.

An outlet of the supply duct may be disposed closer to a blower assembly than an inlet of the return duct. The outlet of the supply duct may be open on the rear wall surface in the apparatus and may be closed at a front by the blower assembly.

The outlet of the supply duct may be open toward an inlet of the blower assembly. The inlet of the air duct and the outlet of the return duct may be open so as cross each other.

The supply duct may extend to the machine compartment through a space between an inner case and an outer case. The supply duct may have a duct upper portion that passes between the inner case and the outer case and a duct lower portion that passes under the machine compartment. A frontward-rearward width of the duct upper portion may be formed smaller than a frontward-rearward width of the duct lower portion, and cross-sectional areas of the duct upper portion and the duct lower portion may be the same.

The apparatus for cultivating plants according to an embodiment may have at least the following advantages.

According to embodiments disclosed herein, a supply duct and a return duct that connect a cultivation space and a machine compartment may be provided, so carbon dioxide may be continuously supplied by circulating air between the machine compartment and the cultivation space, whereby it is possible to promote growth of plants. Further, the inlet of the supply duct may be disposed at a discharge side of a condenser fan, so that air in the machine compartment may be forcibly supplied to the cultivation space when the condenser fan is operated. That is, there is the advantage that it is possible to effectively supply carbon dioxide when the condenser fan is operated, without a separate fan or controller for supplying carbon dioxide. There is the advantage that it is possible to improve productivity and remarkably reduce manufacturing costs through this structure.

Further, the outlet of the supply duct may be disposed adjacent to the blower assembly, so it is possible to effectively supply the air flowing in the cultivation space from the machine compartment into the entire cultivation space. Accordingly, there is the advantage that efficiency of supplying carbon dioxide may be improved.

Furthermore, the outlet of the return duct may be open toward the bottom of the machine compartment, so air in the cultivation space may be effectively discharged to the machine compartment by negative pressure generated by airflow when the condenser fan is operated. Accordingly, there is the advantage that air for supplying carbon dioxide may be more efficiently circulated.

The outlet of the supply duct may be covered by the blower assembly, and the inlet of the supply duct and the outlet of the return duct may be positioned in the machine compartment, so that the external appearance may be further improved by preventing exposure of the supply duct and the return duct at any place inside and outside the apparatus for cultivating plants.

As it is possible to supply carbon dioxide using the air in the machine compartment without a separate configuration, such as a tank, there is the advantage that it is possible to secure safety and operation reliability. Also, as the supply duct and the return duct are disposed between the inner case and the outer case, there is the advantage that a loss of the cultivation space may be prevented.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for cultivating plants, comprising:
a cabinet having a cultivation space;
a door that opens and closes the cultivation space;
at least one bed disposed in the cultivation space and on which plants are cultivated;
at least one light assembly that radiates light toward the at least one bed for photosynthesis;
a water tank that stores water to be supplied to the at least one bed;
an evaporator provided in the cultivation space at an inner rear wall of the cabinet;
a machine compartment separated from the cultivation space at a lower portion in the cabinet, that communicates with an outside of the apparatus, and that accommodates a compressor and a condenser;
at least one blower assembly disposed between the at least one light assembly and the at least one bed, wherein an outlet that discharges air toward a bottom surface of the at least one light assembly is formed at an upper end of the at least one blower assembly, and an inlet that suctions air from a top surface of the at least one bed is formed at a lower end of the at least one blower assembly;
a fan disposed in the machine compartment to suction external air of the apparatus into the machine compartment and force the air to flow inside of the machine compartment;
an air duct that connects the machine compartment and the cultivation space and guides air in the machine compartment to the cultivation space; and
a return duct that connects the cultivation space and the machine compartment and guides air in the cultivation space to the machine compartment, wherein an inlet of the air duct is disposed adjacent to the fan in a discharge direction of the fan, and the external air suctioned into the machine compartment flows into the inlet of the air duct when the fan rotates to be supplied to the cultivation space after passing through the machine compartment where the external air exchanges heat with the condenser and the compressor.

2. The apparatus of claim 1, wherein the air duct is disposed closer to the at least one blower assembly than the return duct.

3. The apparatus of claim 1, wherein an outlet of the air duct is open toward the inlet.

4. The apparatus of claim 1, wherein an outlet of the air duct is disposed on a rear wall surface of the cultivation space.

5. The apparatus of claim 4, further comprising: wherein the at least one blower assembly is disposed upstream of the outlet of the air duct and covers the outlet.

6. The apparatus of claim 1, wherein an inlet of the return duct is disposed on a floor of the cultivation space that corresponds to a top surface of the machine compartment.

7. The apparatus of claim 1, wherein the evaporator is disposed above the return duct.

8. The apparatus of claim 7, wherein the return duct includes:
a duct mount disposed on a floor of the cultivation space and having a slope such that a width thereof decreases downward; and
a discharge pipe that extends through a top surface of the machine compartment from a lower end of the duct mount.

9. The apparatus of claim 1, wherein the fan forcibly blows air for heat exchange of the condenser.

10. The apparatus of claim 1, wherein the inlet of the air duct is disposed in a blade area of the condenser fan.

11. The apparatus of claim 10, wherein an outlet of the return duct is formed to face a bottom surface of the machine compartment.

12. The apparatus of claim 10, wherein a fan guide that accommodates the fan is disposed in the machine compartment, and wherein an outlet of the air duct extends in parallel to the fan guide.

13. The apparatus of claim 1, comprising:
an inner case that forms an inner side surface of the cultivation space;
an outer case spaced apart from the inner case and forming an external appearance of the cabinet; and an insulating material that fills a space between the inner case and the outer case, wherein the air duct extends to the machine compartment between the inner case and the outer case.

14. The apparatus of claim 13, wherein the air duct includes:
a duct upper portion that passes between the inner case and the outer case; and
a duct lower portion that passes through a lower portion of the machine compartment, and wherein a frontward-rearward width of the duct upper portion is formed smaller than a frontward-rearward width of the duct lower portion, and cross-sectional areas of the duct upper portion and the duct lower portion are the same.

15. The apparatus of claim 14, wherein the duct upper portion is formed in an elliptical shape and wherein a cross-section of the duct lower portion is formed in a circular shape.

16. The apparatus of claim 15, comprising:
a duct connecting portion formed to be inclined or rounded between the duct upper portion and the duct lower portion and connecting the duct upper portion and the duct lower portion.

17. The apparatus of claim 1, wherein the return duct includes:
a duct mount disposed on a floor of the cultivation space and having a slope such that a width thereof decreases downward; and
a discharge pipe that extends through a top surface of the machine compartment from a lower end of the duct mount.

* * * * *